US012774129B2

(12) United States Patent
Aubusson et al.

(10) Patent No.: US 12,774,129 B2
(45) Date of Patent: Oct. 27, 2026

(54) STORAGE SYSTEM AND STORAGE CONTAINER

(71) Applicant: Ocado Innovation Limited, Hatfield (GB)

(72) Inventors: Alastair Aubusson, Hatfield (GB); Nicholas Mclarney, Hatfield (GB); Ian Parks, Hatfield (GB); David Holt, Hatfield (GB)

(73) Assignee: Ocado Innovation Limited, Hatfield (GB)

( * ) Notice: Subject to any disclaimer, the term of this patent is extended or adjusted under 35 U.S.C. 154(b) by 27 days.

(21) Appl. No.: 18/557,409

(22) PCT Filed: Apr. 29, 2022

(86) PCT No.: PCT/EP2022/061612
§ 371 (c)(1),
(2) Date: Oct. 26, 2023

(87) PCT Pub. No.: WO2022/229453
PCT Pub. Date: Nov. 3, 2022

(65) Prior Publication Data

US 2024/0217699 A1 Jul. 4, 2024

(30) Foreign Application Priority Data

Apr. 29, 2021 (GB) ..................................... 2106170
Feb. 11, 2022 (GB) ..................................... 2201849

(51) Int. Cl.
*B65G 1/04* (2006.01)
*B65D 1/22* (2006.01)
(Continued)

(52) U.S. Cl.
CPC ................. *B65D 7/08* (2013.01); *B65D 1/22* (2013.01); *B65D 21/0213* (2013.01);
(Continued)

(58) Field of Classification Search
CPC ........ B65D 1/22; B65D 7/08; B65D 11/1866; B65D 11/1873; B65D 21/0213;
(Continued)

(56) References Cited

U.S. PATENT DOCUMENTS 1,462,640 A * 7/1923 Hoffman .................. B65D 1/22 220/604
2,265,618 A 12/1941 Adams
(Continued)

FOREIGN PATENT DOCUMENTS

CN 105667946 A 6/2016
CN 107284793 A 10/2017
(Continued)

OTHER PUBLICATIONS

Office Action issued on Apr. 18, 2024, by the Great Britain Patent Office in corresponding Great Britain Patent Application No. GB2106170.0. (4 pages).
(Continued)

*Primary Examiner* — Gideon R Weinerth
(74) *Attorney, Agent, or Firm* — Gregory Matt McCloskey

(57) ABSTRACT

A storage container for storage of one or more items in a storage and retrieval system containing a track system including first and second sets of horizontal parallel tracks forming a grid pattern having a plurality of grid spaces and stacks of storage containers located beneath the track system, wherein each stack occupies a single grid space. The storage container includes a metallic container body including a base portion formed as a single unitary body and having a container bottom wall and upwardly standing base sidewall and end wall parts to define a tray, and a separate upper portion having upper sidewall and end wall parts upwardly extending from and connected to respective base
(Continued)

sidewall and end wall parts to form a box-like structure with an open end for receiving items within the box-like structure.

21 Claims, 32 Drawing Sheets

(51) Int. Cl.

| | |
|---|---|
| ***B65D 6/04*** | (2006.01) |
| ***B65D 21/02*** | (2006.01) |
| ***B65D 25/14*** | (2006.01) |
| ***B65D 25/30*** | (2006.01) |
| ***B65G 1/02*** | (2006.01) |
| ***B65G 21/02*** | (2006.01) |
| ***B65G 53/36*** | (2006.01) |
| *B65G 47/90* | (2006.01) |

(52) U.S. Cl.
CPC ............. *B65D 25/14* (2013.01); *B65D 25/30* (2013.01); *B65G 1/0464* (2013.01); *B65G 1/0478* (2013.01); *B65G 1/02* (2013.01); *B65G 47/90* (2013.01); *B65G 2201/0235* (2013.01); *B65G 2201/025* (2013.01)

(58) Field of Classification Search
CPC ...... B65D 25/14; B65D 25/30; B65G 1/0492; B65G 1/02; B65G 1/026; B65G 1/0464; B65G 1/0478; B65G 1/065; B65G 1/1373; B65G 1/1378; B65G 1/0407; B65G 47/90; B65G 2201/0235; B65G 2201/025; B65G 2201/0258; G06Q 10/087; G06Q 10/08; G06Q 10/08741; G06Q 10/0877
USPC .......................................................... 206/503
See application file for complete search history.

(56) References Cited

U.S. PATENT DOCUMENTS

| | | | | |
|---|---|---|---|---|
| 2,522,161 | A | 9/1950 | Gustave | |
| 3,266,656 | A | 8/1966 | Kridle | |
| 3,374,915 | A | 3/1968 | Donald et al. | |
| 3,670,912 | A * | 6/1972 | Dunbar | B66C 1/66 414/420 |
| 3,968,895 | A * | 7/1976 | Barnes, Jr. | B65D 7/24 217/15 |
| 5,529,199 | A | 6/1996 | Foster | |
| 5,642,830 | A * | 7/1997 | Foster | B65D 7/24 220/4.28 |
| 5,667,095 | A * | 9/1997 | Riedel | B66C 1/66 220/640 |
| 6,155,446 | A | 12/2000 | Alexander et al. | |
| 7,365,268 | B2 * | 4/2008 | Collins | B65D 7/28 439/535 |
| 9,498,568 | B2 * | 11/2016 | Nicoletti | B65D 5/4612 |
| 11,939,156 | B1 * | 3/2024 | Kalm | B65G 61/00 |
| 12,252,335 | B2 * | 3/2025 | Austrheim | B65D 9/12 |
| 12,312,170 | B2 * | 5/2025 | Lindbo | B65D 21/02 |
| 2003/0136781 | A1 | 7/2003 | Rumpel | |
| 2003/0214143 | A1 * | 11/2003 | Walker | B65D 90/0026 294/81.53 |
| 2006/0144607 | A1 | 7/2006 | Collins et al. | |
| 2012/0152947 | A1 | 6/2012 | Orgeldinger | |
| 2016/0129587 | A1 * | 5/2016 | Lindbo | B25J 9/0096 700/218 |
| 2016/0185487 | A1 | 6/2016 | Meers et al. | |
| 2018/0037411 | A1 * | 2/2018 | Lindbo | A62C 3/002 |
| 2018/0142947 | A1 * | 5/2018 | Bates | F25D 25/005 |
| 2019/0031399 | A1 * | 1/2019 | Shaikh | B65D 21/0209 |
| 2019/0047787 | A1 * | 2/2019 | Fosnight | B66C 1/445 |
| 2020/0016770 | A1 * | 1/2020 | Kamranzadeh | B25J 9/06 |
| 2020/0017302 | A1 * | 1/2020 | Lindbo | C12C 11/006 |
| 2020/0062444 | A1 * | 2/2020 | Tsai | B65D 7/16 |
| 2020/0118065 | A1 * | 4/2020 | Li | B65D 21/0233 |
| 2020/0148471 | A1 | 5/2020 | Lindbo et al. | |
| 2020/0216263 | A1 * | 7/2020 | Fjeldheim | B65G 1/0464 |
| 2021/0032034 | A1 | 2/2021 | Kalouche | |
| 2021/0123653 | A1 * | 4/2021 | Kieling | B65D 11/1826 |
| 2022/0002076 | A1 * | 1/2022 | Austrheim | B65G 1/04 |
| 2022/0135324 | A1 | 5/2022 | Whelan et al. | |
| 2022/0194705 | A1 * | 6/2022 | Hatteland | B65G 1/0485 |
| 2022/0363470 | A1 * | 11/2022 | Austrheim | B65D 9/34 |
| 2023/0109767 | A1 * | 4/2023 | Heggebø | B65D 21/0213 700/218 |
| 2023/0331478 | A1 * | 10/2023 | Chatain | B65G 1/0464 |
| 2023/0347770 | A1 * | 11/2023 | Benfold | B60L 53/34 |
| 2024/0010426 | A1 * | 1/2024 | Mayadeen | B65G 1/04 |
| 2024/0010427 | A1 * | 1/2024 | Parks | B65G 1/0464 |
| 2024/0017922 | A1 * | 1/2024 | Farr | B65G 1/0464 |
| 2024/0092529 | A1 * | 3/2024 | Austrheim | B65D 7/32 |
| 2024/0092570 | A1 * | 3/2024 | Newbold | B25J 15/0047 |
| 2024/0217117 | A1 * | 7/2024 | Fjeldheim | B25J 15/0047 |
| 2024/0217739 | A1 * | 7/2024 | Fjeldheim | B65G 1/0464 |
| 2024/0217740 | A1 * | 7/2024 | Heggebø | B65G 1/0464 |
| 2024/0308762 | A1 * | 9/2024 | Johannisson | B65G 1/0464 |
| 2024/0343505 | A1 * | 10/2024 | Dalipaj | B25J 15/0293 |
| 2024/0367890 | A1 * | 11/2024 | Saravia-Ugarte | B65D 43/022 |
| 2025/0128889 | A1 * | 4/2025 | Johannisson | B65G 47/901 |
| 2025/0214470 | A1 * | 7/2025 | Hoyle | B60L 53/53 |
| 2025/0282545 | A1 * | 9/2025 | Clark | B65G 1/026 |
| 2025/0289657 | A1 * | 9/2025 | Kim | B65G 1/0464 |
| 2025/0296774 | A1 * | 9/2025 | Kinsman | B65G 1/0464 |
| 2025/0313405 | A1 * | 10/2025 | Austrheim | B65G 1/0464 |
| 2025/0346393 | A1 * | 11/2025 | Hörnlund | B65D 21/0217 |
| 2025/0381589 | A1 * | 12/2025 | Aubusson | B21D 22/206 |
| 2026/0125215 | A1 * | 5/2026 | Meakin | B65G 1/0464 |
| 2026/0145873 | A1 * | 5/2026 | Heggebø | B65G 1/0464 |

FOREIGN PATENT DOCUMENTS

| | | | |
|---|---|---|---|
| GB | 195512 | A | 4/1923 |
| GB | 700501 | A | 12/1953 |
| JP | 2020500503 | A | 1/2020 |
| KR | 200295652 | Y1 | 11/2002 |
| WO | 2014203126 | A1 | 12/2014 |
| WO | 2015019055 | A1 | 2/2015 |
| WO | 2015140216 | A1 | 9/2015 |
| WO | 2015185628 | A2 | 12/2015 |
| WO | 2016193419 | A1 | 12/2016 |
| WO | 2018060504 | A1 | 4/2018 |
| WO | 2018210952 | A1 | 11/2018 |
| WO | 2019238702 | A1 | 12/2019 |
| WO | 2020094339 | A1 | 5/2020 |
| WO | 2020170037 | A2 | 8/2020 |
| WO | 2022229453 | A1 | 11/2022 |

OTHER PUBLICATIONS

Office Action issued on Jun. 17, 2024, by the Great Britain Patent Office in corresponding Great Britain Patent Application No. GB2201849.3. (4 pages).

Office Action (Examination Report No. 1) issued on Nov. 5, 2024, by the Australian Patent Office in corresponding Australian Patent Application No. 2022267027. (5 pages).

Office Action issued on Aug. 4, 2023, by the Great Britain Patent Office in corresponding Great Britain Patent Application No. GB2206320.0. (5 pages).

Office Action issued on Oct. 18, 2022, by the Great Britain Patent Office in corresponding Great Britain Patent Application No. GB2206320.0. (8 pages).

Office Action issued on Sep. 17, 2024, by the Great Britain Patent Office in corresponding Great Britain Patent Application No. GB2201849.3. (4 pages).

Office Action issued on Sep. 6, 2024, by the Great Britain Patent Office in corresponding Great Britain Patent Application No. GB2106170.0. (3 pages).

(56) References Cited

OTHER PUBLICATIONS

Office Action issued on Dec. 20, 2023, by the Great Britain Patent Office in corresponding Great Britain Patent Application No. GB2201849.3. (4 pages).

Office Action issued on Dec. 7, 2023, by the Great Britain Patent Office in corresponding Great Britain Patent Application No. GB2206320.0. (4 pages).

International Search Report (PCT/ISA/210) and Written Opinion (PCT/ISA/237) mailed on Aug. 25, 2022 by the European Patent Office as the International Searching Authority for International Application No. PCT/EP2022/061612. (14 pages).

Patents Act 1977: Search Report under Section 17 dated Oct. 4, 2022, issued by the United Kingdom Intellectual Property Office in corresponding Great Britain Application No. GB2201849.3. (3 pages).

Patents Act 1977: Search Report under Sections 17 dated Jun. 16, 2021, issued by the United Kingdom Intellectual Property Office in corresponding Great Britain Application No. GB2106170.0. (4 pages).

Combined Search and Examination Report issued on Jul. 10, 2025 by the UK Intellectual Property Office in corresponding GB Application No. 2504995.8 (7 pages) corresponding to Applicant's U.S. Appl. No. 18/557,409.

Office Action issued on Jul. 17, 2025 by the Chinese Patent Office in corresponding Chinese Application No. 202280046485.0 (11 pages) corresponding to Applicant's U.S. Appl. No. 18/557,409.

Office Action issued on Aug. 18, 2025 by the Korean Patent Office in corresponding Korean Application No. 10-2023-7041266 (12 pages) corresponding to Applicant's U.S. Appl. No. 18/557,409.

Extended Search Report issued on Aug. 25, 2025 by the European Patent Office in corresponding European Application No. 25166430.6 (14 pages) corresponding to Applicant's U.S. Appl. No. 18/557,409.

Office Action issued on Feb. 12, 2025 by the Japanese Patent Office in corresponding Japanese Application No. 2023-565937 (4 pages) corresponding to Applicant's U.S. Appl. No. 18/557,409.

Office Action issued on May 19, 2025 by the European Patent Office in corresponding European Application No. 22727049.3 (4 pages) corresponding to Applicant's U.S. Appl. No. 18/557,409.

Partial Search Report issued on Jun. 4, 2025 by the European Patent Office in corresponding European Application No. 25166430.6 (18 pages) corresponding to Applicant's U.S. Appl. No. 18/557,409.

* cited by examiner (a)

(b)

(a)

(b)

(a)

(b)

(c)

(d)

(e)

(a)

(b)

(a)

(b)

(a)

(b)

(a)

(b)

STORAGE SYSTEM AND STORAGE CONTAINER

TECHNICAL FIELD

The present invention relates to the field of storage systems comprising load handling devices operative on tracks located on a grid framework structure for handling storage containers stacked in the grid framework structure, and storage containers for use in such storage systems.

BACKGROUND

Some commercial and industrial activities require systems that enable the storage and retrieval of a large number of different products. One known type of system for the storage and retrieval of items in multiple product lines involves arranging storage containers (also known as bins or totes) in stacks on top of one another, the stacks being arranged in rows. The storage containers are removed from the stacks and accessed from above by load handling devices, removing the need for aisles between the rows and thereby allowing a large number of containers to be stored in a given space.

WO2015/185628A describes a storage and fulfilment system in which stacks of storage containers are arranged within a grid framework structure. The containers are accessed by load handling devices operative on tracks located on the top of the grid framework structure.

The storage containers in such storage systems are typically made of a thermoplastic material and may be formed by injection moulding or blow moulding, for example. Examples of thermoplastic materials include polypropylene, polyethylene (e.g. high density polyethylene (HDPE)), acrylonitrile butadiene styrene (ABS) and polycarbonate.

A problem with using thermoplastic storage containers in the storage systems described above is that they can be highly flammable and emit toxic fumes, and given that the storage system may contain hundreds or thousands of storage containers, the storage containers pose a significant risk in the event of a fire.

This application claims priority from GB application number 2106170.0 filed 29 Apr. 2021 and GB application number 2201849.3 filed 11 Feb. 2022, the contents being herein incorporated by reference.

SUMMARY OF THE INVENTION

The present invention has mitigated the above problem by fabricating the storage container from metal. In comparison to plastic material, the use of metal in the fabrication of the storage containers allows the storage containers to withstand much higher temperatures before disintegrating and emit very little or no toxic fumes in an event of a fire. In addition, more of the material of the storage containers is easily recyclable, making the storage containers of the present invention more environmentally friendly. The use of metal in the fabrication of the storage containers also provides a sturdy structure that allows the storage containers to be stacked one above the other in a storage and retrieval system. The present invention provides a storage container for the storage of one or more items in a storage and retrieval system comprising a first set of parallel rails or tracks and a second set of parallel rails or tracks running transversely to the first set of parallel tracks in a substantially horizontal plane to form a grid pattern comprising a plurality of grid spaces or grid cells and a plurality of stacks of storage containers located beneath the track system and wherein each stack of the plurality of stacks of storage containers occupies a single grid space or grid cell. The storage container comprises a metallic container body comprising a base portion formed as a single unitary body having a container bottom wall and upwardly standing base sidewall and end wall parts to define a tray, and a separate upper portion having upper sidewall and end wall parts upwardly extending from and connected to the respective base sidewall and end wall parts of the base portion to form a box-like structure with an open end for receiving the one or more items within the box-like structure.

In accordance with the present invention, a plurality of stacks of storage containers are provided, each storage container of the plurality of stacks of storage containers comprising a metallic container body comprising container bottom wall and upwardly standing opposing sidewalls and end walls. Each stack of the plurality of stacks of metallic storage containers is located below the track system and occupies a single grid space or grid cell. The metallic container body can form an integral part of the storage container in the sense that the metallic container body is the storage container or can be a separate part of the storage container in the sense that the metallic container body forms part of the storage container, e.g. a metallic lining.

Typically, storage containers in the art are formed from plastic material as a single unitary body and considering that thousands of storage containers are needed in a typical storage and retrieval system, the storage containers represents are significant bulk when transporting the storage containers, which ultimately results in significant transport costs. Making the storage containers fire resistant and easily transportable at lower costs represents a challenge in the industry. The present invention has mitigated this problem by providing a metallic container body, wherein the metallic body of each of a plurality of storage containers has a base portion formed as a single unitary body and a separate upper portion connected to the base portion to form a box-like structure. To disassemble the metallic container, the upper portion may be separated from the base portion. This allows for easier packing of the storage containers and when disassembled, the metallic containers occupy a smaller volume than when they are in an assembled state. In particular, the base portion is stackable by virtue of its structure of a container bottom wall and upwardly standing base sidewall and end wall parts defining a tray. Therefore, when a metallic container is disassembled, at least a portion of the metallic container body can be stacked.

One or more robotic load handling devices comprising a container receiving space operative on the track system is able to lift and lower a storage container such that, when positioned above the at least one stack of the plurality of stacks of storage containers occupying a grid cell, the lifting mechanism is configured to lift the at least one storage container from the at least one stack of the plurality of stack of storage containers into the container-receiving space. Optionally, the lifting mechanism comprises a grabber device configured, in use, to releasably grip the storage container and lift the storage container from the at last one stack of the plurality of stacks of metallic storage containers into the container-receiving space. To enable the grabber device to releasably grip the storage container, optionally the grabber device comprises at least two gripper elements engageable with a peripheral rim surrounding the open end of the storage container. Preferably, the rim comprises one or more openings or depressions such that each of the one or more gripper elements is receivable into the one or more openings or depressions of the rim of the storage container. Preferably, the peripheral rim, also termed a rim portion, extends around at least a portion of the periphery of the open end of the box-like structure, the rim portion comprising one or more openings or depressions for engagement with a grabber device of a load handling device. The rim portion may be positioned on an upper edge of the upper sidewall parts and/or upper end wall parts. As well as allowing for attachment of one or more gripper elements to the storage container, the rim portion also increases the structural rigidity of the storage container. Optionally, the rim portion is separately connected to the upper sidewall and/or the end wall parts. This allows the metallic container to be assembled into a modular way and also allows the rim portion to be formed of a different material to the rest of the upper sidewall parts and/or upper end wall parts to optionally provide greater weight saving.

The terms 'upper sidewall parts', 'upper sidewall portions' and 'upper sidewalls' are used interchangeably throughout this patent application. Similarly, the terms 'upper end wall parts', 'upper end wall portions' and 'upper end walls' are used interchangeably through this patent application. The terms 'lower sidewall parts', 'upwardly standing base sidewall parts' and 'base sidewall parts' are used interchangeably through this patent application. Similarly, the terms 'lower end wall parts', 'upwardly standing base end wall parts' and 'base end wall parts' are used interchangeably through this patent application.

The single unitary body of the base portion provides a leak proof tray so as to prevent juices from one or more items stored in the storage containers, which are largely grocery items, from contaminating one or more items stored in adjacent storage containers in a stack.

To enable a plurality of storage containers to be stacked one on top of the other, optionally, the rim portion comprises an inwardly and/or outwardly turned projecting lip from the upper sidewall and/or the end wall parts for supporting the container bottom wall of an adjacent storage container above in a stack. Each storage container of the plurality of stacks of storage containers is therefore stackable. The inwardly and/or outwardly turned projecting lip enables the container bottom wall of a vertically adjacent storage container above in a stack to rest on the projecting lip without the problem of the contents of the storage container below being crushed or damaged or fouled by the bottom container wall of the vertically adjacent storage container. Depending on whether the projecting lip projects inwardly or outwardly from the sidewalls and the end walls of the storage container, the projecting lip provides a supporting surface for the container bottom wall of an adjacent storage container immediately above the storage container to be supported on the rim of the storage container.

The upper portion of the storage container is separate to the base portion, so at least one of the opposing upper sidewalls and/or end walls are separable so that at least a portion of the metallic container body is more easily packable. Separation of the opposing upper sidewalls and/or end walls includes but is not limited to at least one edge or end of the opposing upper sidewalls and end walls being physically separated from each other. This includes the opposing upper sidewalls and/or end walls being physically separated from the container bottom wall. The separable nature of the opposing upper sidewalls and/or end walls also enables different parts of the storage container to be replaceable should any one of the walls are damaged. This not only saves costs of the need to replace the whole storage container should any of the walls become damaged but is also environmentally friendly since any portion of the storage container can be replaced with spare parts. Optionally, the upper sidewall parts are separately fixed to the end wall parts.

Similarly, to enable one or more of the storage containers to be stacked one on top of the other without fouling the contents of the storage container below in the stack, the metallic container body of the storage container may comprise a plurality of stops protruding into the mouth of the storage container and located at diagonal opposing corners of the storage container for supporting the bottom container wall of an adjacent storage container in a stack, said plurality of stops are spaced apart above the container bottom wall so as to prevent fouling one or more items in the storage container by the container bottom wall of an adjacent storage container above in the stack. For example the storage container may comprise two or more stops at diagonal opposing corners of the storage container. The two or more stops protrude inwardly into the mouth of the storage container and are shaped for supporting the bottom container wall of an adjacent storage container in a stack. The two or more stops may be spaced apart above the container bottom wall and at the diagonal opposed corners of the metallic container body to prevent an adjacent storage container immediately above the storage container from crushing or fouling the contents of the storage container. Typically, a fully loaded storage container weighs up to 35 kg. 30 kg represents the weight of the stock or items and 5 kg is the typical weight of the storage container. For a stack comprising twenty fully loaded storage containers, the load a storage container in a stack would have to bear would be 700 kg (6,867 Newtons). To increase the support of adjacent storage containers in a stack, all four corners of the storage container may comprise a stop. The stops can be integrally formed into the metallic container body, e.g. indentations at the diagonally opposed corners of the storage container.

In some implementations of the storage and retrieval system, there can be a very large number of robotic load handling devices running on the track system where the grid framework structure comprises a large number of storage containers in stacks. The significant number of storage containers used within the storage and retrieval system can prevent air circulation at or proximal to the centre of the storage and retrieval system. Additionally, it may be advantageous to cool the storage containers and their contents whilst being stored within the storage and retrieval system. This may due to the contents of the storage containers and/or to prevent the contents of the storage containers from overheating. To mitigate this problem, optionally, at least one of the upwardly standing opposing sidewalls and/or end walls comprises a plurality of vent openings. The one or more vent openings in the at least one of the upwardly standing opposing sidewalls and/or end walls permits cool air to circulate within the storage containers when held in a stack. For example, in a chilled zone where chilled air is circulated around the plurality of stacks of storage containers, to keep the contents of the storage containers chilled the one or more vent holes within the at least one of the upwardly standing opposing sidewalls and/or end walls circulate the chilled air within the storage containers. In addition, the high thermal conductive nature of metal allows heat to be transferred easily through the sidewalls and end walls of the storage containers. This helps to keep the internal space within the storage container at the same temperature as the temperature externally of the storage container. Thus, any cooling exterior of the stacks of storage containers is rapidly conducted to the interior space of the storage containers due to the relatively high thermal conductivity of the sidewalls and end walls of the storage container in comparison with storage containers composed of an insulating plastic material. However, the presence of one or more vent holes in the upwardly standing opposing sidewalls and/or end walls is optional. Having solid upwardly standing sidewalls and end walls has advantages in preventing the spread of fire between one or more stacks of storage containers in a storage and retrieval system.

Ideally, the weight of the storage container should represent a small proportion of the weight of the contents of the storage container. Typically, the weight of a storage container in the art is about 5 kg. This is to prevent the lifting mechanism comprising a lifting motor being burdened by the weight of the storage container and also, allows a greater weight of contents to be stored in the storage container. Typically, the lifting motor is sized to lift a predetermined weight beyond which the lifting motor will struggle to lift the weight of the storage container. To keep the weight of the storage container relatively low, optionally at least a portion of the metallic container body is formed from a folded sheet metal blank such that the least a portion of the metallic container body is collapsible in the sense that is can be easily transportable and erected for use. The collapsible nature of at least a portion of the metallic container body also permits multiple storage containers to be packed and transportable, e.g. from a supplier or another storage and retrieval system, and erected for use. To enable the storage container to be erected from a blank metallic sheet, optionally, at least one of the upwardly standing sidewalls is pivotally connected to at least one of the upwardly standing end walls by a living hinge.

Alternatively, the sidewalls and the end walls can be separately assembled together to form the walls of the storage container having a box-like structure having an open top or mouth. To separately assemble at least one of the sidewalls and end walls together, the at least one of the upper sidewall parts is connected to the at least one of the upper end wall parts. To fixedly connect the at least one of the upper sidewall parts to the at least one of the upper end wall parts, optionally, the at least one of the upper sidewall parts and/or the at least one of the upper end wall parts comprises at least one flange for fixedly connecting the at least one of the upper sidewall parts to the at least one of the upper end wall parts. Each flange may be configured to either overlay or underlay an adjacent flange. The flange of the at least one of the upper sidewall parts may be fixedly connected to the flange of the at least one of the upper end wall parts by the use of an adhesive, or by welding or riveting. In particular, the flanges of the upper sidewall parts and/or the upper end wall parts may be fastened together by a mechanical clinching process. Alternatively, the at least one upper sidewall parts can be releasably connected to the at least one upper end wall parts by a snap-fit joint or interlocking joint. For example, the snap fit joint can be based on a cantilever joint. Equally, the interlocking joint can be a toggle latch. Optionally, each corner of the metallic container body comprises a plurality of overlapping layers. The plurality of overlapping layers reinforces the corners of the metallic container body for bearing the load from one or more storage containers being placed on top, particularly when the storage container comprising the metallic container body is placed in a stack of storage containers. Thus there is rigidity through the corners of the metallic storage container from the overlapping layers. There may be two, three, or four overlapping layers at each corner.

Optionally, the storage container further comprises guides at each corner of the storage container for alignment of a grabber device of a load handling device. The guides allow easier alignment of the grabber device with the openings or depressions in the rim portion of the metallic container. The guides may be formed by elongated vertical depressions in the flanges of the upper sidewall parts and/or end wall parts. To grab a storage container, the grabber device uses guide pins nearby or at each corner of the grabber device which mate with corresponding openings or depressions formed at four corners of the storage container.

Optionally, at least a portion of the metallic container body is formed from a deep drawn sheet metal blank in which a sheet metal blank is drawn into a forming die by the mechanical action of a punch.

Alternatively, only a portion of the metallic container body is formed from a deep drawn sheet metal blank. This allows the remaining portion of the metallic container body to be collapsible as discussed above allowing for easy transport. At least one of the upwardly standing opposing sidewalls comprises an upper sidewall part and a lower sidewall part and/or at least one of the upwardly standing opposing end walls comprises an upper end wall part and a lower end wall part. Preferably, the deep drawn sheet metal blank forms a shallow part of the metallic container body such that the upwardly standing opposing sidewalls and end walls of the shallow part of the metallic container body form opposing lower sidewall parts and lower end wall parts of the metallic container body. Optionally, at least one of the upper sidewall parts is pivotally attached to a respective lower sidewall part of the metallic container body and/or at least one of the upper end wall parts is pivotally attached to a respective lower end wall part of the metallic container body. The opposing sidewalls and end walls of the deep drawn metal blank respectively form a lower sidewall part and a lower end wall part of the metallic container body. The height of the lower sidewall parts and lower end wall parts together with the height of the upper sidewall parts and upper end wall parts represents the full height of the opposing sidewalls and end walls of the metallic container body. Thus, the sidewall of the metallic container can be a combination of the lower sidewall part and the upper sidewall part. Similarly, the end wall of the metallic container body can be combination of the lower end wall part and the upper end wall part.

Optionally, at least one of the upper sidewall parts is removably attached to a respective lower sidewall part of the metallic container body and/or at least one of the upper end wall parts is removably attached to a respective lower end wall part of the metallic container body. For example, the walls of the deep drawn sheet metal blank can be used to support the upwardly standing opposing sidewalls and end walls of the metallic container body by accommodating the upwardly standing opposing sidewalls and end walls within the deep drawn sheet metal blank.

To prevent any one of the upwardly standing opposing sidewalls and/or the upwardly standing opposing end walls from collapsing under the weight of one or more adjacent storage containers in a stack, optionally, the metallic container body comprises one or more wall stiffeners configured to support at least one of the upwardly standing opposing sidewalls and/or at least one of the upwardly standing opposing end walls of the metallic container body. For example, the one or more sidewall stiffeners and/or end wall stiffeners can function as inserts to reinforce any one of the upstanding opposing sidewalls and/or upstanding opposing end walls, and therefore improve the structural integrity of the storage container to resist the weight of a stack of adjacent storage containers above it. To provide the necessary structural integrity to the upstanding opposing sidewalls and/or upstanding opposing end walls of the storage container, preferably the one or more sidewall stiffeners and/or end wall stiffeners are cast, e.g. die cast.

Alternatively, any one of the container bottom wall, the upwardly standing opposing sidewalls and/or the upwardly standing opposing end walls and/or the upper wall parts is cast. For example, the container bottom wall, the upwardly standing opposing sidewalls and/or end walls and/or the upper sidewalls and/or upper end walls can be cast into panels that are assembled together to form the metallic container body.

Alternatively, any one of the container bottom wall and/or the upwardly standing opposing sidewalls and/or the upwardly standing opposing end walls comprises at least a hollow portion and a filler material disposed in the hollow portion. This has the advantage of using a secondary material for improving the properties of the walls of the metallic container body, e.g. acoustic properties and/or fire resistant properties. Optionally, the filler material is an insulation material and/or a fire resistant material.

When the one or more items stored in the storage containers are grocery or food items, it is essential that the grocery items are protected from contamination from the metallic storage containers. To prevent contamination of the grocery items, the metallic container body comprises an inner surface and an outer surface, and preferably the inner surface comprises a polymeric coating. The polymeric coating protects the grocery items stored in the storage container from any underlying corrosion of the metallic container body. The polymeric coating or lining minimizes any interaction between the metallic container body and the food items stored therein as well as meeting worldwide food storage regulations. The polymeric coating also provides a hermetic coating to the inner surface of the storage container to prevent any leakage from the storage container as a result of spillages. Examples of polymeric coatings include but are not limited to resinous based coatings, acrylic based coatings and/or vinyl based coatings or a combination thereof.

To reinforce any one of the container bottom wall and/or opposing sidewalls and/or opposing end walls of the metallic container body, preferably, at least a portion of the container bottom wall and/or opposing sidewalls and/or opposing end walls is reinforced by one or more ribs. Each of the one or more ribs can either protrude outwardly and/or inwardly from the surface of the walls of the metallic container body so as to reinforce the walls of the metallic container body. The one or more ribs can be integrated into the bottom container wall and/or opposing sidewalls and/or end walls of the metallic container body such that the bottom container wall and/or opposing sidewalls and/or end walls are corrugated. Alternatively, the upper sidewall parts and/or upper end wall parts comprise ribs or beaks to minimise movement of the upper sidewall parts and/or upper end wall parts. Preferably, the base portion comprises one or more patterns embossed within the container bottom wall to increase the rigidity of the base portion.

The present invention may further provide a collapsible stackable container constructed to be stacked in a storage and retrieval system, said storage and retrieval system comprising a track system comprising a first set of parallel rails or tracks and a second set of parallel rails or tracks running transversely to the first set of parallel tracks in a substantially horizontal plane to form a grid pattern comprising a plurality of grid spaces or grid cells, the collapsible stackable container comprising a metallic container body comprising a container bottom wall and upwardly standing opposing sidewalls and end walls, and a rim comprising an inwardly and/or outwardly turned projecting lip at the mouth of the storage container such that one or more of the collapsible stackable containers can be stacked one above the other: wherein at least a portion of the metallic container body is formed from an unitary blank of a foldable sheet metal. For the purpose of the present invention, the foldable sheet metal blank may have a thickness in the range 0.5 mm to 2 mm, preferably, in the range between 0.5 mm to 1 mm, for example 0.55 mm. 0.6 mm. 0.7 mm. 0.8 mm or 0.9 mm. Forming at least a portion of the metallic container body from a unitary blank of a foldable sheet metal allows the metallic container body of the storage container to be easily transportable, since it does not present itself as a bulk item for transport in comparison to the existing moulded plastic storage container in the art. Thus, a greater number of the metallic container bodies can be tightly packed and transported to a fulfilment centre housing the storage and retrieval system of the present invention, where the containers can be erected for use in the storage and retrieval system.

To provide a collapsible stackable container, the present invention may further provide a collapsible stackable container constructed to be stacked in a storage and retrieval system, said storage and retrieval system comprising a track system comprising a first set of parallel rails or tracks and a second set of parallel rails or tracks running transversely to the first set of parallel tracks in a substantially horizontal plane to form a grid pattern comprising a plurality of grid spaces or grid cells, the collapsible stackable container comprising a metallic container body comprising a container bottom wall and upwardly standing opposing sidewalls and end walls, and a rim comprising an inwardly and/or outwardly turned projecting lip at the mouth of the storage container such that one or more of the collapsible stackable containers can be stacked one above the other: wherein at least a portion of the metallic container body is cast. Casting allows the walls (container bottom wall, opposing sidewalls and/or end walls) to be made robust providing a sturdy metallic container body to bear the weight of vertically adjacent storage containers in a stack. Optionally, the metallic container body can be die cast or investment cast. The metallic container body can be cast from aluminium or steel.

Preferably, the storage container may comprise a liner formed from a food grade material. The metallic container body of the storage container is non-combustable and therefore allows any type of food grade material to be used for the liner of the storage container. The liner of the storage container is therefore not restricted to being non-combustible. Optionally, the liner comprises a food grade plastic material and/or cellulose base material. To make the cellulose material resistant to moisture and/or oils, optionally, the cellulose is coated or impregnated with a wax material. Optionally, the cellulose material is paper or cardboard. One way of providing a paper or cardboard liner is forming the liner from a folded paper or cardboard blank. As the liner comprises paper or cardboard, optionally, the liner is disposable. The liner may be a shallow base or tray to provide a covering for at least a portion of the interior surface of the box-like structure of the storage. Alternatively, the liner can extend throughout the interior surface of the box-like structure. To prevent leakage of juices from food items from a storage container contaminating food items in a storage container below in a stack, preferably, the liner is leak proof container. Optionally, the leak proof container is a one piece thermoformed container, e.g. by a blow moulding or a deep drawn moulding process.

The invention further provides a kit for assembling the storage container, the kit comprising:

i) a base portion formed as a single unitary body and having a container bottom wall and upwardly standing base sidewall and end wall parts to define a tray;
ii) a separate upper portion comprising upper sidewall parts and upper end wall parts.

Since the storage container comprises a separate upper portion and base portion, this can advantageously be supplied as a kit of parts and can be assembled together by utilising, for example, toggle latches, snap-fit joints etc. and/or spot welding the upper portion to the base portion. The storage container of the kit may comprise any of the features described above. The kit may further comprise two or more rim portions separately connectable to the upper sidewall part and/or end wall parts.

BRIEF DESCRIPTION OF DRAWINGS

Further features and aspects of the present invention will be apparent from the following detailed description of an illustrative embodiment made with reference to the drawings, in which:

FIG. 7(*b*) is a schematic perspective view of the grabber device engaging with the storage container.

FIG. 14(*c*) is a schematic perspective view of an assembled storage container showing the connection of the upper wall parts by a releasable toggle latch.

FIG. 14(*d*) is a perspective view of the releasable toggle latch for connecting the upper wall parts together of the metallic container body shown in FIG. 14(*c*).

FIG. 14(*e*) is a perspective view of the separate parts of the metallic container body shown in FIG. 14(*b*) and FIG. 14(*b*) in a stack.

FIGS. 15(*c*) and 15(*d*) are schematic perspective views of upper side walls and upper end walls respectively of the storage container according to the eighth embodiment of the present invention.

FIG. 15(*e*) is a schematic perspective view of a corner of an upper portion of a storage container according to the eighth embodiment of the present invention.

DETAILED DESCRIPTION

Figure 1:
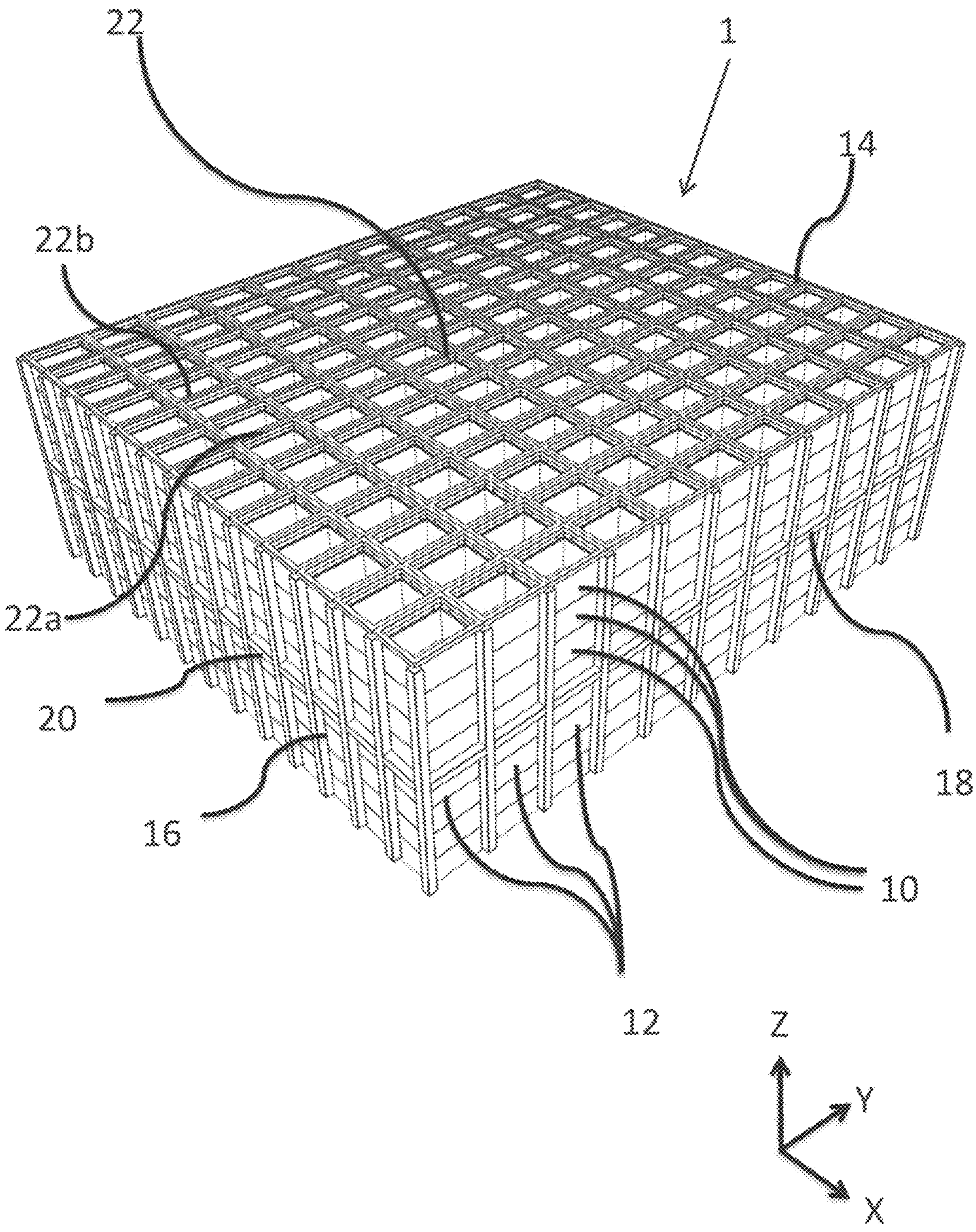
FIG. 1 is an illustration of an automated storage and retrieval system according to an exemplary embodiment of the present invention.
Figure 2:
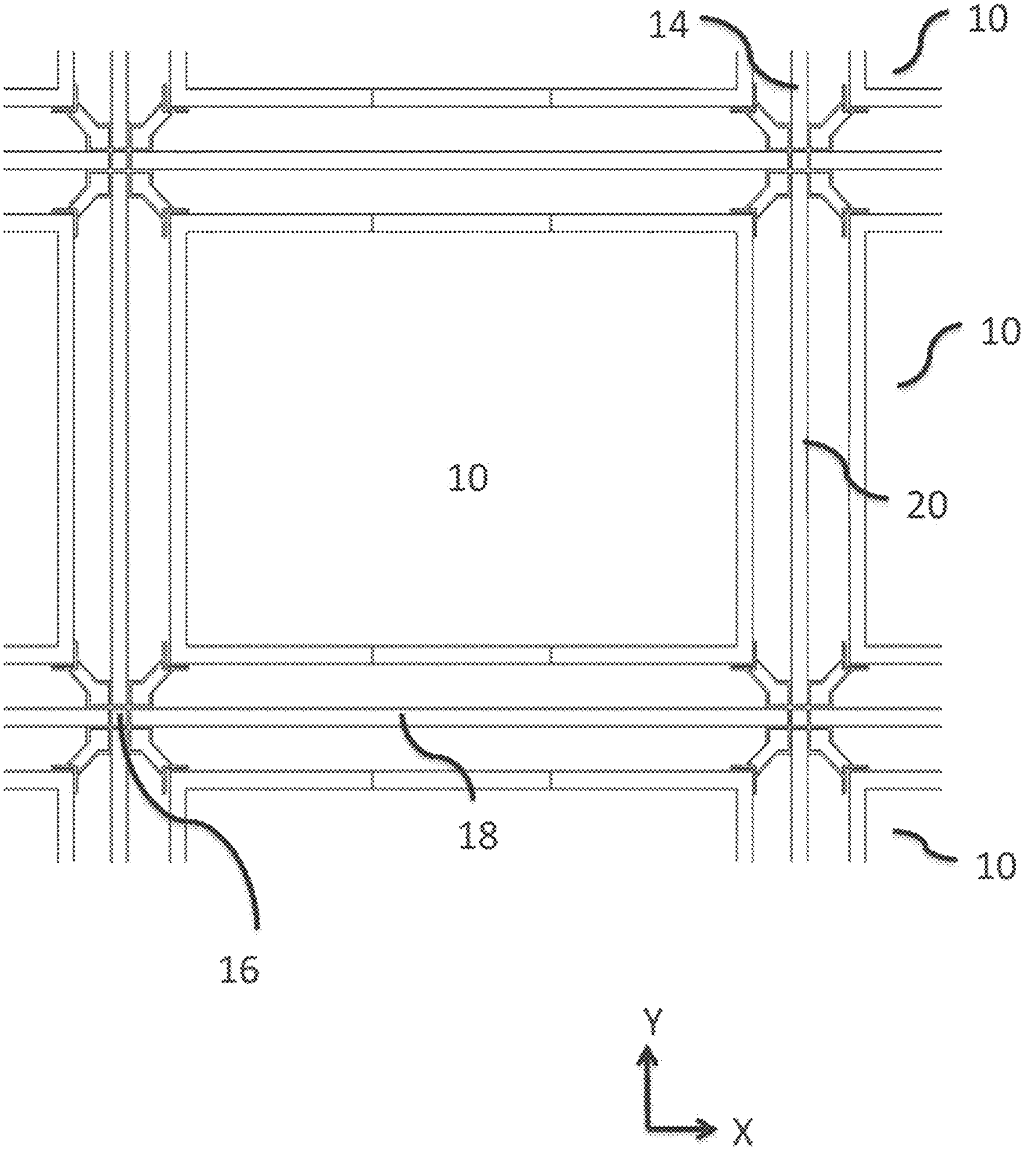
FIG. 2 is a schematic diagram of a top down view showing a stack of bins arranged within the framework structure of FIG. 1.

As shown in FIGS. 1 and 2, storage containers 10, also known as bins or totes, are stacked on top of one another to form stacks 12. The stacks 12 are arranged in a grid framework structure 14 in a warehousing or manufacturing environment. The grid framework is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a single stack 12 of containers 10 arranged within the framework structure 14. Each container or bin typically holds a plurality of product items (not shown), and the product items within a container 10 may be identical, or may be of different product types depending on the application. Each container 10 may be used to store grocery items (i.e. food items), for example. Furthermore, the bins 10 may be physically subdivided to accommodate a plurality of different inventory items.

In the description below, bins 10 will be used to denote the storage containers intended for the storage of inventory items, whilst delivery containers DT will be used to denote containers filled or intended to be filled to fulfil customer orders placed by customers. It will be appreciated that this terminology is used for ease of reference and explanation within this document. However, it should be noted that the bins 10 and the containers DT may be of the same shape and configuration. Furthermore, delivery containers DT may be stored in bins 10 within the storage system or any part thereof.

The grid framework structure 14 comprises a plurality of upright members or upright columns 16 that support horizontal members 18, 20. A first set of parallel horizontal grid members 18 is arranged perpendicularly to a second set of parallel horizontal grid members 20 to form a plurality of horizontal grid structures supported by the upright members 16. The members 16, 18, 20 are typically manufactured from metal and typically welded or bolted together or a combination of both. The containers 10 are stacked between the members 16, 18, 20 of the grid framework structure 14, so that the grid framework structure 14 guards against horizontal movement of the stacks 12 of containers 10, and guides vertical movement of the containers 10.

The top level of the grid framework structure 14 includes rails 22 arranged in a grid pattern across the top of the stacks

Figure 3:
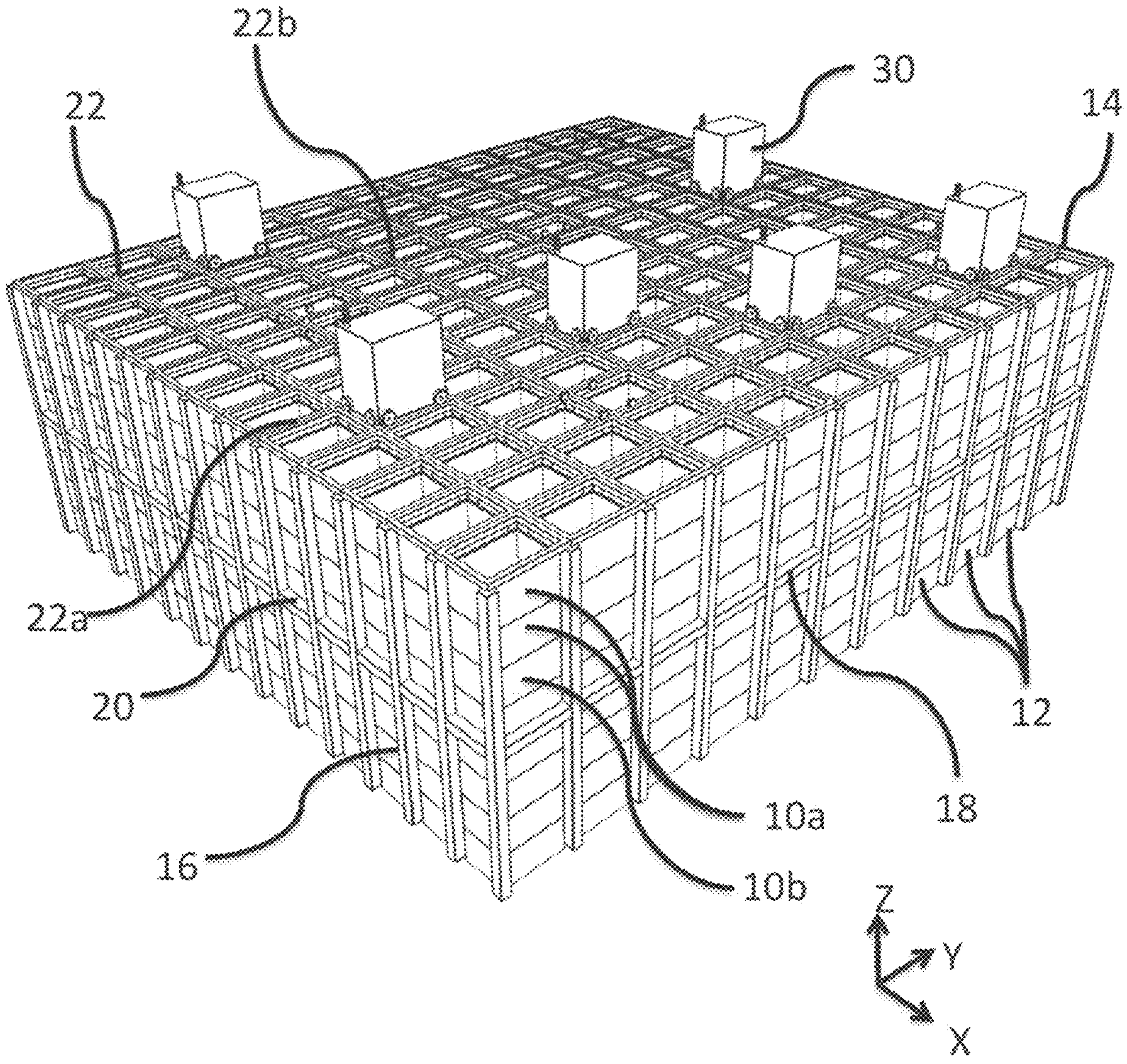
FIG. 3 is a schematic diagram of a system of a known load handling device operating on the grid framework structure.

12. Referring additionally to FIG. 3, the rails 22 support a plurality of load handling devices 30. A first set 22*a* of parallel rails 22 guide movement of the robotic load handling devices 30 in a first direction (for example, an X-direction) across the top of the grid framework structure 14, and a second set 22*b* of parallel rails 22, arranged perpendicular to the first set 22*a*, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

Figure 4:
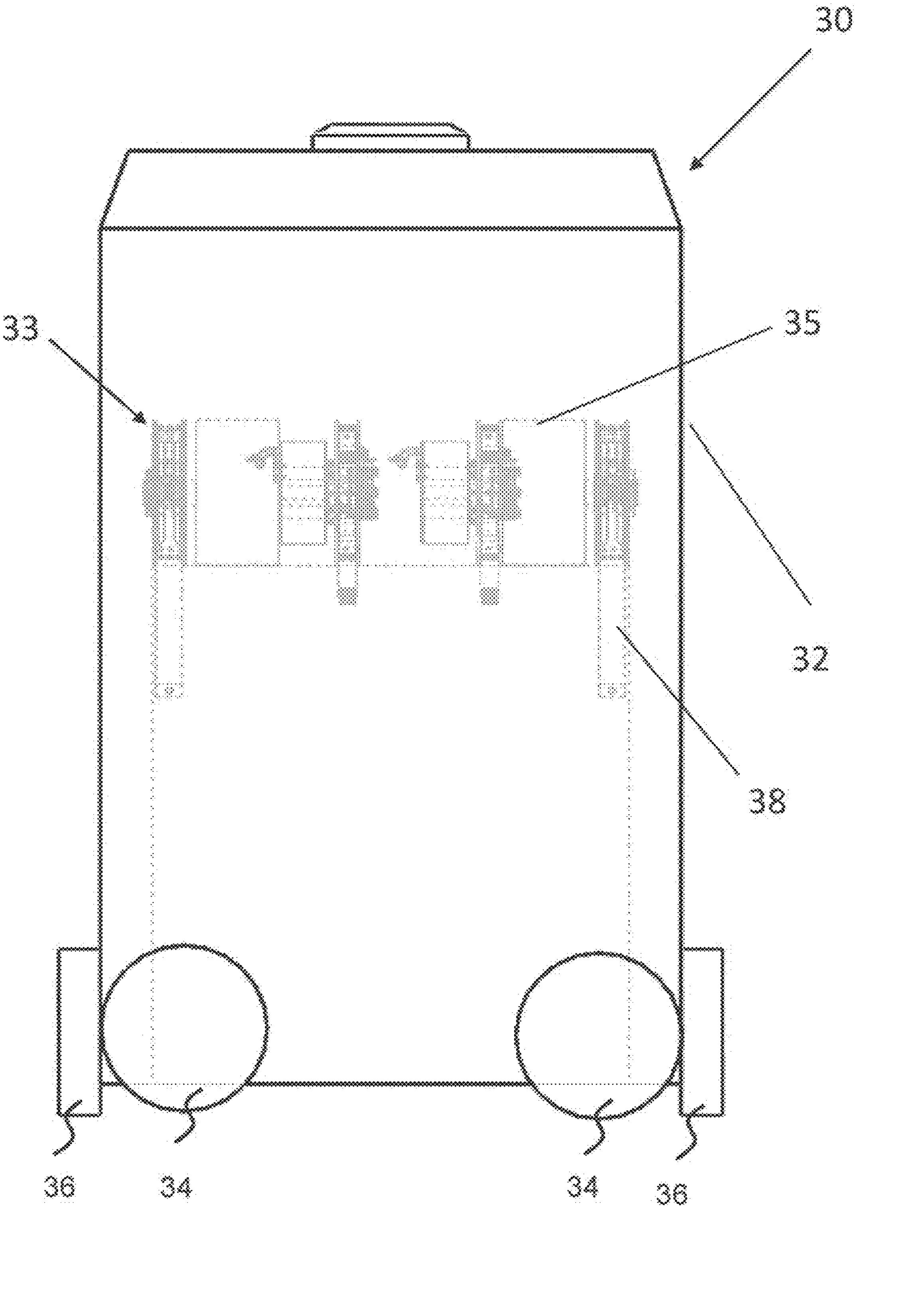
FIG. 4 is a schematic perspective view of the load handling device showing the container receiving space within the body of the load handling device.
Figure 5:
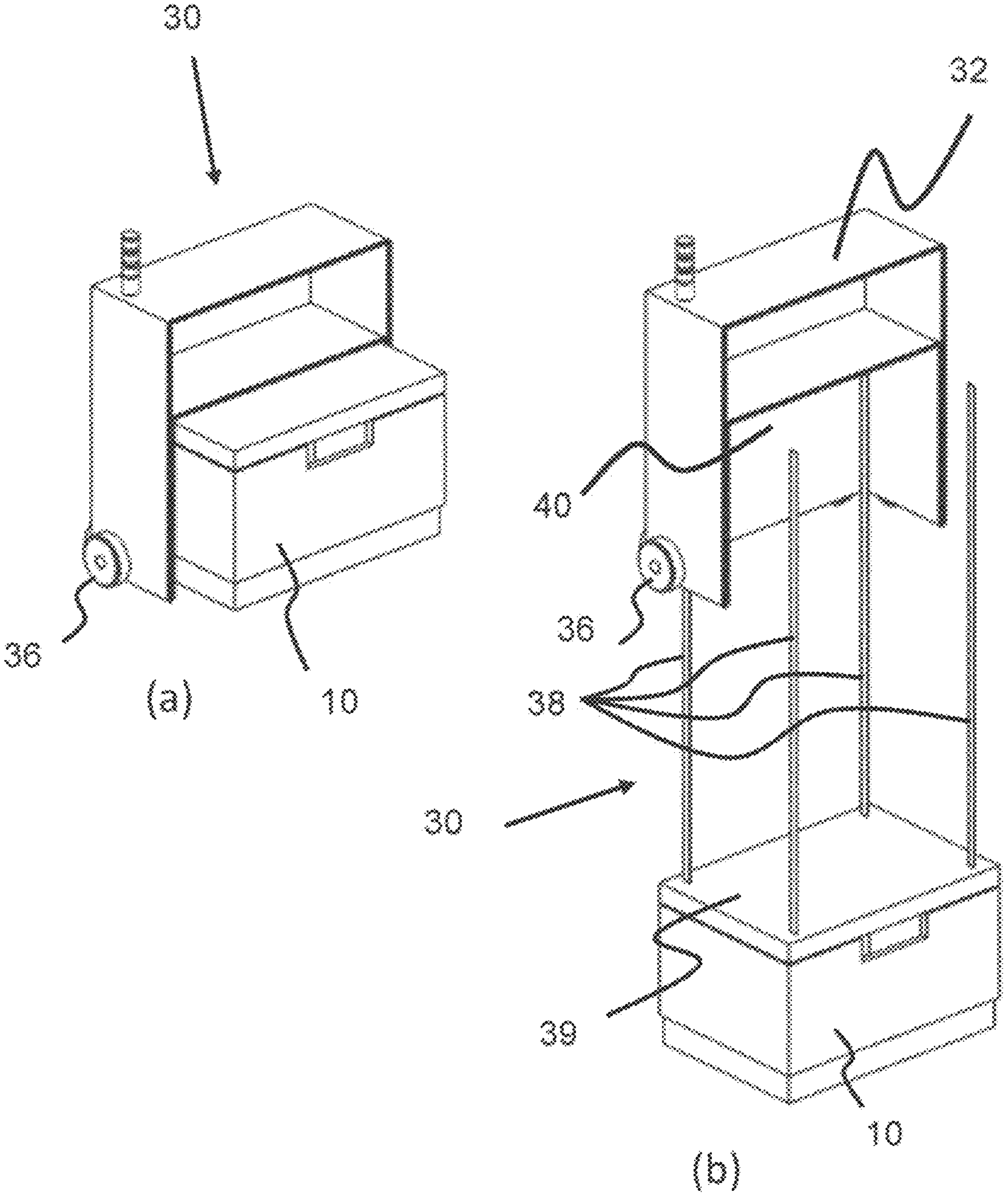
FIGS. 5(*a* and *b*) are schematic perspective cut away views of the load handling device of FIG. 4 showing (a) a container accommodating a container receiving space of the load handling device and (b) the container receiving space of the load handling device.

Each load handling device 30 comprises a vehicle 32 which is arranged to travel in the X and Y directions on the tracks or rails 22 of the grid frame structure 14, above the stacks 12 (see FIG. 4). FIGS. 4 and 5 shows a load handling device 30 according to an embodiment of the present invention and described in PCT Patent Publication No. WO2015/019055 (Ocado Innovation Limited) and International patent application WO 2015/140216 (Ocado Innovation Limited), the contents of which are incorporated herein by reference. The load handling device 30 comprises a vehicle body 32 equipped with a lifting mechanism 33 (see FIG. 4) comprising a winch or a crane mechanism 35 to lift a storage container or bin 10, also known as a tote, from above. The crane mechanism 35 comprises a winch cable 38 wound on a spool or reel and a grabber device 39. Typically, the lifting device comprises a set of lifting tethers 38 extending in a vertical direction and connected nearby or at the four corners of the grabber device 39 (one tether near each of the four corners of the grabber device) for releasable connection to a storage container 10. The grabber device 39 is configured to grip the top of the storage container 10 and lift it from a stack of containers in a storage system of the type shown in FIGS. 1 and 2. Typically, the grabber device 39 is configured as a lifting frame. Further details of the grabber device is discussed below.

The vehicle body 32 comprises an upper part and a lower part (see FIG. 5 (*a* and *b*)). The lower part is fitted with two sets of wheels 34, 36, which run on rails at the top of the framework structure of the storage system. The upper part of the vehicle body 32 may house a majority of the bulky components of the load handling device. Typically, the upper part of the vehicle body houses a driving mechanism for driving both the wheels and the lifting mechanism together with an on-board rechargeable power source for providing the power to the driving mechanism and the lifting mechanism.

The lower part of the vehicle body 32 comprises a wheel assembly that is are driven to enable movement of the vehicle in X and Y directions respectively along the rails. A first set of wheels 34, consisting of a pair of wheels 34 on the front of the vehicle 32 and a pair of wheels 34 on the back of the vehicle 32, are arranged to engage with two adjacent rails of the first set 22*a* of rails 22. Similarly, a second set of wheels 36, consisting of a pair of wheels 36 on each side of the vehicle 32, are arranged to engage with two adjacent rails of the second set 22*b* of rails 22. One or both sets of wheels can be moved vertically to lift each set of wheels clear of the respective rails, thereby allowing the vehicle to move in the desired direction. When the first set of wheels 34 is engaged with the first set of tracks or rails 22*a* and the second set of wheels 36 are lifted clear from the tracks or rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the tracks or rails 22, and the second set of wheels 36 are lowered into engagement with the second set of tracks or rails 22*a*. The drive mechanism can then be used to drive the second set of wheels 36 to achieve movement in the Y direction. One or both sets of wheels can be moved vertically to lift each set of wheels clear of the respective rails, thereby allowing the vehicle to move in the desired direction on the track system.

The wheels are arranged around the periphery of a cavity or recess, known as a container-receiving recess 40, in the lower part. The recess 40 is sized to accommodate the storage container or bin 10 when it is lifted by the crane mechanism, as shown in FIG. 5 (*a* and *b*). When in the recess, the container is lifted clear of the rails beneath, so that the load handling device can move laterally to a different location. On reaching the target location, for example another stack, an access point in the storage system or a conveyor belt, the bin or storage container can be lowered from the container receiving space and released from the grabber device 39. In this way, one or more robotic load handling devices 30 can move around the top surface of the stacks 12 on the frame structure 14, as shown in FIG. 3 under the control of a centralised control utility (not shown). Each robotic load handling device 30 is provided with a lifting mechanism 38 for lifting one or more bins 10 from the stack 12 to access the required items stored therein.

The body of the vehicle 32 can comprise the container receiving space in the form of a cavity 40 for accommodating a bin 10 (see FIG. 5). The cavity 40 being of a size capable of holding a bin or storage container 10. The lifting mechanism comprising a set of lifting tethers 38 extending in a vertical direction are connected at the four corners of a lifting frame (not shown), otherwise known as the grabber device (one tether near each of the four corners of the grabber device) for releasable connection to a storage container. The grabber device is configured to releasably grip the top of a storage container to lift it from a stack of containers in a storage system of the type shown in FIGS. 1 and 3. The lifting mechanism lifts a bin 10 from the stack 12 to within the cavity 40 within the body of the vehicle 32. Whilst the container receiving space 40 for accommodating a bin 10 when it is lifted by the winch means is arranged within the vehicle body 32 shown in FIG. 4, the present invention is not limited to the container receiving space 40 being located within the vehicle body 32. The present invention is also applicable to the container receiving space being located below a cantilever such as in the case where the vehicle body of the load handling device has a cantilever construction as described in WO2019/238702 (Autostore Technology AS). For the purpose of the invention, the term “vehicle body” is construed to optionally cover a cantilever such that the grabber device is located below the cantilever. However, for ease of explanation of the present invention, the container receiving space for receiving a container is arranged within a cavity or recess within the vehicle body. The container receiving space allows multiple products to be accessed from multiple locations in the grid and stacks at any one time.

The robotic load handling devices 30 remove bins 10 containing inventory items (not shown) therein and transport the bins 10 to pick stations (not shown) where the required inventory items 28 are removed from the bins 10 and placed into bins 10 comprising delivery containers DT. It is important to note that a delivery container DT may fit within a bin 10. The bins 10 may comprise inventory items or may comprise delivery containers DT. Furthermore, the delivery containers DT may comprise at least one bag, the inventory items being picked directly in to a bag at a pick station (not shown).

The empty bins 10 or the bins comprising delivery containers DT or the bins comprising delivery containers DT and bags may all be stored within the stacks 12. It will be appreciated that all the bins 10 have substantially the same external shape and configuration.

FIG. 3 shows a typical storage and retrieval system as described above, the system having a plurality of load handling devices 30 active on the grid above the stacks 12. FIGS. 1 and 3 show the bins 10 in stacks 12 within the storage system. It will be appreciated that there may be a large number of storage containers or bins 10 in any given storage system and that many different items may be stored in the bins 10 in the stacks 12, each bin 10 may contain different categories of inventory items within a single stack 12.

In one storage and retrieval system described above and further in UK Patent Application Number GB1410441.8 (Ocado Innovation Limited), hereby incorporated by reference, the storage and retrieval system comprises a series of bins 10 that may further comprise delivery containers DT with customer orders contained therein or may further comprise bins 10 with inventory items awaiting picking contained therein. These different bins 10 and combinations thereof may be contained in the storage system and be accessed by the robotic load handling devices 30 as described above.

Figure 6:
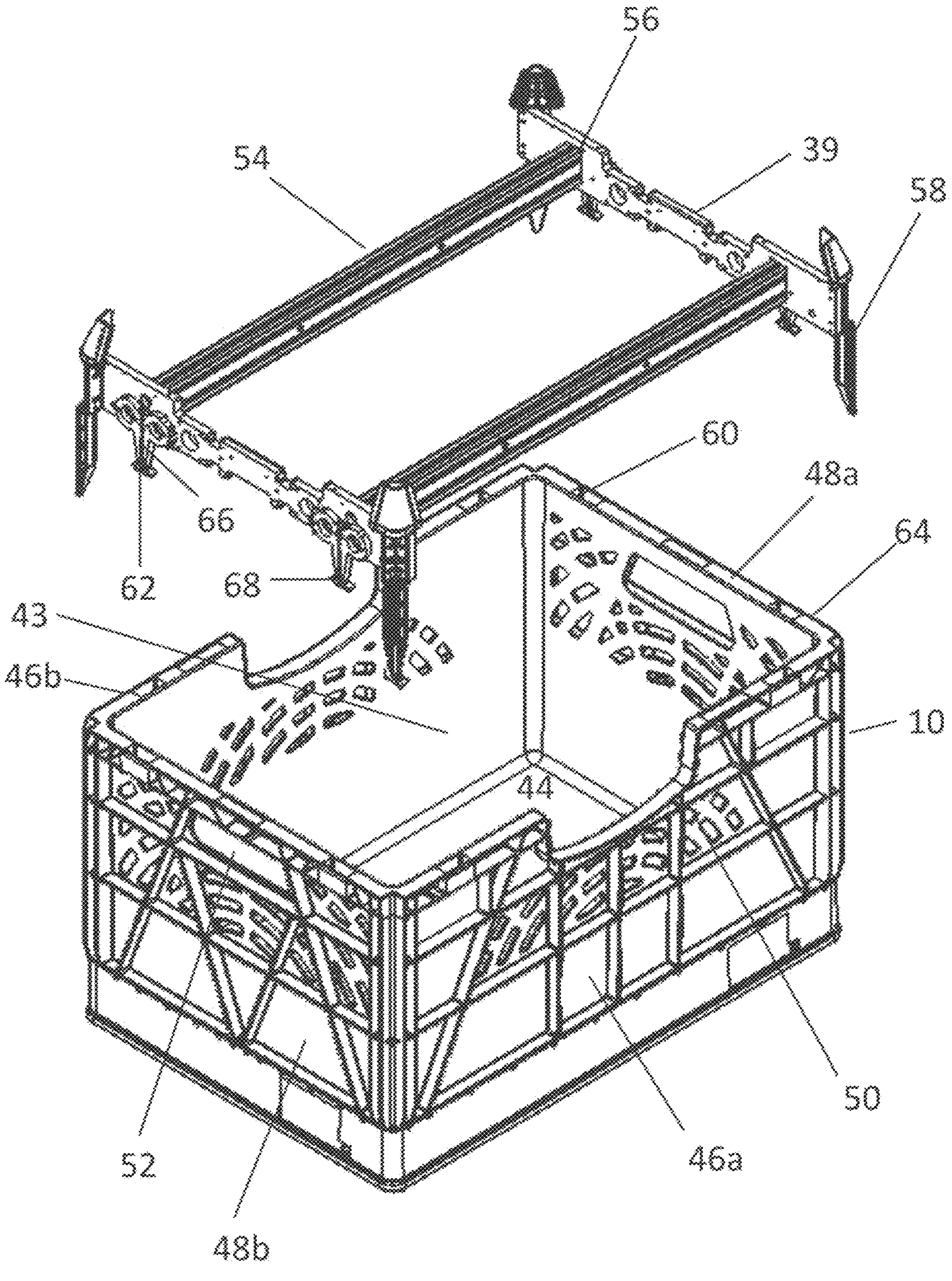
FIG. 6 is a schematic perspective view of the grabber device positioned above the storage container.

FIG. 6, show a grabber device positioned above one form of bin 10 for use within the storage and retrieval system of FIGS. 1 to 3. The storage container or bin 10 comprises a substantially box type structure having an open top 43, a container bottom wall 44, and opposing sidewalls 46 (*a* and *b*) and end walls 48 (*a* and *b*). In the particular example shown in FIG. 6, the bin 10 has a substantially rectangular shaped container bottom wall 44 such that the length of the opposing sidewalls 46 (*a* and *b*) are longer than the length of the opposing end walls 48 (*a* and *b*). The opposing sidewalls 46 (*a* and *b*) and end walls 48 (*a* and *b*) of the bin comprises one or more ribs to reinforce the sidewalls and end walls of the storage container. A plurality of the bins 10 may be stacked in a self-supporting stack 12, a plurality of stacks 12 being disposed within the grid framework structure 14 as described above. In storage facilities of the type described with reference to FIGS. 1 to 3, it will be appreciated that there may be a large number of bins 10, in some cases hundreds of thousands. Typically, each bin 10 must be able to bear the load of multiple bins 10 in a stack. The bin stack load is carried by the maximum load of twenty fully loaded bins. The weight of a fully loaded bin is about 35 kg, of which 5 kg represents the weight of the bin alone. For example, a stack of twenty bins 10 would represent a load of 700 kg or 6,867N. The one or more ribs on the opposing sidewalls and end walls strengthens the sidewalls and end walls so as to prevent sidewalls and end walls buckling under such a load in a stack.

To allow air to flow within the bins 10 when held in a stack, the sidewalls 46 (*a* and *b*) and/or end walls 48 (*a* and *b*) of the bins 10 comprise one or more slots or openings or vent holes 50. The slots or openings 50 in the sidewalls 46 (*a* and *b*) and/or end walls 48 (*a* and *b*) allow air circulating within and around the storage and retrieval system to flow within the bins 10. This is particularly important in the case where the bins 10 are located in a chilled zone of the storage and retrieval system where cool air from a refrigerated or air conditioning unit is circulated around at least a portion of the grid framework structure for keeping items such as grocery items at a chilled temperature. Cooling systems such as that described in International Patent Publication No. WO2016/193419 (Ocado Innovation Limited) require air to flow within the storage system and through the bins 10 and stacks 12 of bins 10. The system described in this International Patent Application is hereby incorporated by reference and discloses a storage system comprising one or more heater and/or one or more chiller for generating temperature controlled gas, one or more fans for circulating the temperature controlled gas through the storage system: and a plenum for receiving the temperature controlled gas. Should a portion of the storage and retrieval system require cooling to a lower temperature, for example to enable storage of items requiring chilling, such as fruit and vegetables, it is more important that the air flow through the system cools the items to be stored. Whilst the embodiments herein are described with reference to cooling the storage system, it will be appreciated that, using the same method described, the items stored in the storage system may be heated in a similar manner. Furthermore, whilst the description above refers to air flow; it will be appreciated that any suitable gas may be circulated to heat or cool the system as required.

In addition to allowing air to circulate within the bins, the slots 50 in the bins 10 enable the same amount of storage volume to be utilised, whilst maintaining the structural integrity of the bin 10 yet reducing the weight of the bin 10. Advantageously, providing apertures 50 in the containers DT or bins 10 also reduces the cost of each container DT or bin. In a storage and retrieval system 1 comprising hundreds of thousands of containers and bins this can represent a significant saving. In the drawing of the bin 10 shown in FIG. 6, two sides of the container or bin comprise openings or holes 50. One or more handles 52 are integrally formed into the end walls 48 (*a* and *b*) of the bin 10 to enable the storage container to be manually picked up by an operative. The openings or vent holes 50 in the sidewalls 46 (*a* and *b*) and/or end walls 48 (*a* and *b*) are located at a predetermined height above the bottom wall 44 of the storage container 10 so as to provide a leak proof base, and thereby prevent escape of fluid that has accidently escaped from the contents of the storage container contaminating the contents of adjacent storage containers in a stack.

Also shown in FIG. 6 is the grabber device 39, which forms part of the lifting mechanism 33 of the robotic load handling device, positioned above the bin 10. The lifting mechanism 33 used to lift the containers into the container receiving space can take any suitable form and comprises a winch or a crane mechanism (see FIG. 4). The crane mechanism comprises a winch cable 38 wound on a spool or reel and a grabber device 39. The grabber device 39 is configured to grip the top of the container 10 to lift it from a stack of containers in a storage system of the type shown in FIGS. 1 and 2. Typically, the grabber device 39 is configured as a frame 54 and four lifting tethers 38 are fixed to each corner of the grabber device 39 (see FIG. 5*b*). For maximum stability and load capacity, commonly four lifting tethers 38 are used to winch the grabber device 39, with one tether disposed nearby or at each of the corners of the grabber device 39, but a different arrangement, for example with fewer tethers, could be used if desired. One end, e.g. first end, of each of the tethers is wound on the spool in the load handling device and the other end, e.g. second end, is fixed to the grabber device 39, typically at each corner of the grabber device, by a suitable bracket (not shown). The number of tethers attached to the grabber device is dependent on the ability to maintain the grabber device horizontal during operation when picking up a container 10 and the ability to withstand the tension applied to the tethers when lifting containers, which could weigh up to 40 kg, without extending or stretching, i.e. be inextensible under a predetermined applied tensile stress. To possess the necessary physical properties (Young's Modulus), the tethers are generally in the form of a tape, but other tethers with the necessary physical properties to winch containers are permissible to winch the bin from a stack.

In the particular embodiment shown in FIG. 6, the frame 54 of the grabber device has four corner sections 56, a top side and a bottom side. To grab a container 10, the grabber device 39 comprises four locating pins or guide pins 58 nearby or at each corner of the grabber device 39 which mate with corresponding cut outs or holes 60 formed at four corners of the container 10 and four gripper elements 62 arranged at the bottom side of the grabber device 39 to engage with the rim 64 of the bin 10 (see FIG. 7*a*). The locating pins 58 help to properly align the gripper elements 62 with corresponding holes 60 in the rim 64 of the container. In the particular embodiment shown in FIG. 7*a*, each of the gripper elements 62 comprises a pair of wings 66 that are collapsible to be receivable in corresponding holes 60 in the rim 64 of the container and an open enlarged configuration having a size greater than the holes 62 in the rim 64 of the container 10 in at least one dimension so as to lock onto the container 10 (see FIG. 7*b*). The wings are driven into the open configuration by a drive gear (not shown). More specifically, the head of at least one of the wings comprises a plurality of teeth that mesh with the drive gear such that when the gripper elements 62 are actuated, rotation of the drive gear causes the pair of wings to rotate from a collapsed configuration (FIG. 7*a*) to an open enlarged configuration (FIG. 7*b*).

Figure 7A:
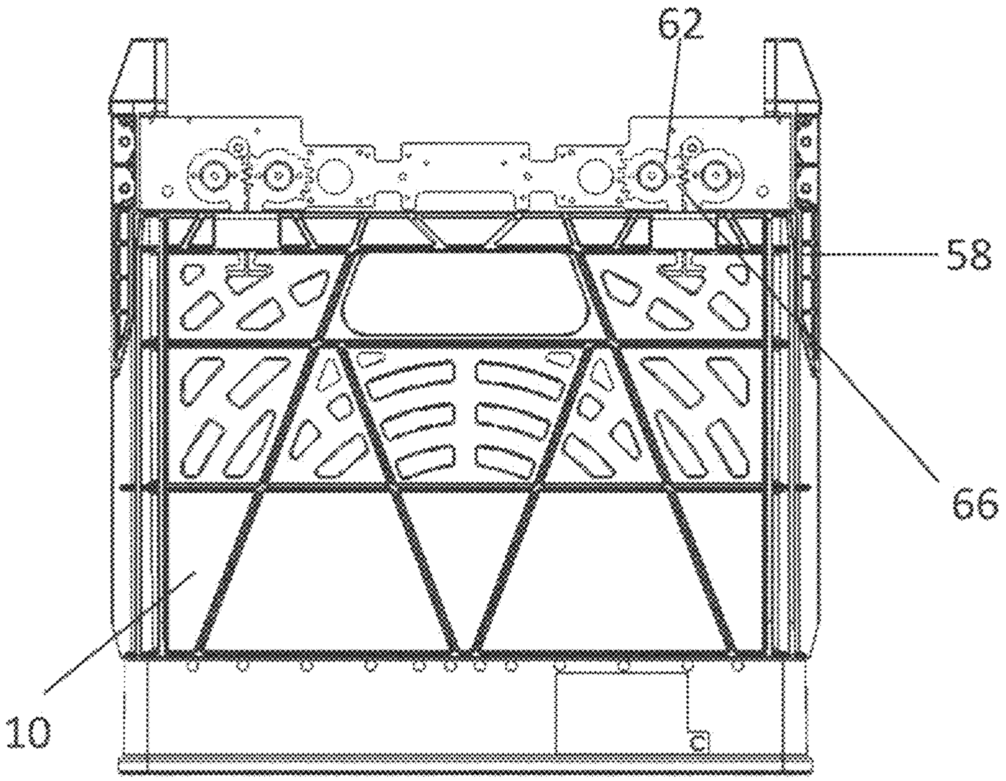
FIG. 7(*a*) is a schematic perspective view of the grabber device mounted on the storage container.
Figure 7B:
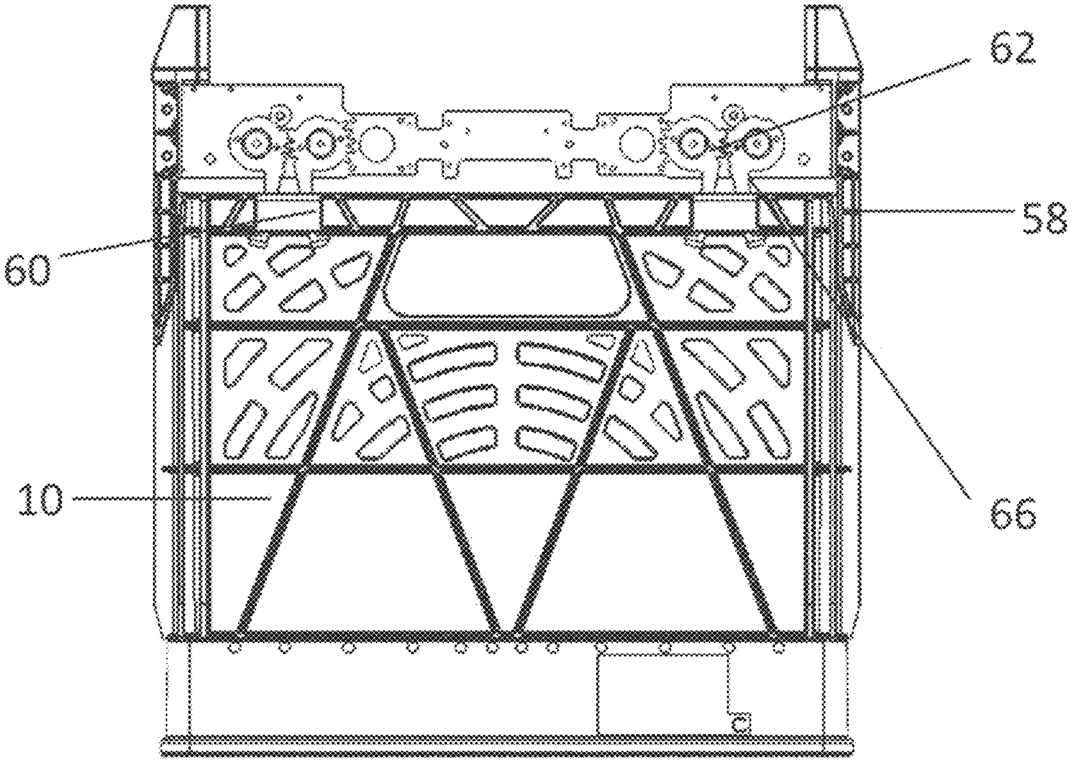

When in the collapsed or closed configuration, the gripper elements 62 are sized to be receivable in corresponding holes 60 in the rim 64 of the container 10 as shown in FIG. 7*a*. The foot of each of the pair of wings comprises a stop 68 (see FIG. 6), e.g. a boss, such that when received in a corresponding hole 60 in the rim 64 of the container 10, the stop 68 engages with an underside of the rim 64 when in an enlarged open configuration to lock onto the container when the grabber device 39 is winched upwards towards the container-receiving space of the load handling device. FIG. 7*b* shows the configuration of the gripper elements in an enlarged configuration for lifting the bin 10 into the container receiving space of the robotic load handling device.

The gripper elements 64 are received in the holes 60 in the rim 64 of the container 10 when the grabber device 39 is at a predetermined height above the rim of the container as measured by one or more depth sensors (not shown) mounted to the underside of the grabber device. At this depth, the gripper elements 64 are actuated to grab the bin 10 in response from a signal from the one or more of the depth sensors (not shown) mounted to the underside of the grabber device 39.

Typically, the bins 10 are largely composed of a thermoplastic material and are either injected moulded or blow moulded. Known thermoplastic material commonly used in the moulding of the storage containers comprises a polyolefin, e.g. polypropylene or polyethylene, (e.g. high density polyethylene (HDPE)), acrylonitrile butadiene styrene (ABS) and polycarbonate including copolymers thereof. However, the problem with such plastic materials is that they are flammable and emit toxic fumes. Once a fire has started within the storage and retrieval system, the flammable and exothermic nature of the material of the bins 10 would result in the fire spreading throughout the storage and retrieval system with a danger to life. Not only are the bins 10 flammable but the combustion fumes emitted from the burning thermoplastic material are highly toxic comprising benzene, which is a known carcinogen. Inhalation of fine particles as a result of the burning debris may cause respiratory irritation. As a result, extreme fire precaution methods and systems are incorporated into the storage and retrieval system to prevent the rapid spread of fire, such as sprinklers and smoke/heat detection units. Whilst efforts have been made to prevent the rapid spread of fire, of which the bins 10, play a major role in the spread of the fire, there is still the problem of fire spreading throughout the storage and retrieval system.

The present invention has mitigated the above problem by providing a storage container comprising a metallic container body comprising a container bottom wall and opposing sidewalls and opposing end walls. In the examples of the different types of storage containers discussed below with reference to FIGS. 8 to 25, the entirety of the storage container is formed from the metallic container body in the sense that the metallic container body is the storage container. However, the storage container of the present invention is not limited to being entirely formed from a metallic container body and at least a portion of the storage container can comprise other materials, e.g. plastic material. For example, the metallic container body can form a metallic lining of the storage container. The storage container comprising the metallic container body is also applicable to delivery containers, DT, in the sense that the delivery container can also comprise a metallic container body of the present invention comprising a container bottom wall and opposing sidewalls and opposing end walls.

The storage containers described below with reference to FIGS. 8 to 25 relate to the storage container being formed from a metallic container body. For ease of explanation, the metallic container body in the forthcoming examples can be referred to as storage containers. The metallic container body of the present invention can have a similar shape to the storage containers currently in existence for storing items in the grid framework structure, e.g. having a substantially rectangular container bottom wall and opposing side walls and end walls. The metallic storage containers can be used amongst the traditional plastic storage containers in the storage and retrieval systems described above with reference to FIG. 3. The flame resistant behaviour of the metallic storage containers can be used to form a flame resistant barrier wall in the grid framework structure. For example, a plurality of stacks of metallic storage containers can be arranged to form one or more flame resistant barrier walls surrounding the plurality of stacks of plastic storage containers. One or more flame resistant barrier walls comprising the metallic storage containers can be used to contain any flames within the grid framework structure.

There are numerous methods to fabricate the storage containers comprising the metallic container body according to the present invention. For use in an automated storage and retrieval system, a key feature of the storage containers is lightness having a weight below 8 kg, preferably below 6 kg, more preferably below 5 kg. The storage container comprising the metallic container body should also have sufficient structural rigidity to withstand loads being applied to them when placed in a stack. The grid framework structure can hold stacks of storage containers as much as twenty storage containers high. Considering that each of the storage containers can weigh up to 35 kg, this amounts to a weight of 700 kg. Below are the different examples according to the present invention of the different storage containers comprising a metallic body according to the present invention. Where the storage container comprising the metallic container body is used for storage of grocery items, it is important that the storage container is leak proof to prevent leakage of food items escaping the storage container and contaminating other food items stored in adjacent storage containers in a stack. Since fluid tends to settle at the base of the storage container, the base of the metallic container body is made leak proof and any vent holes in the sidewalls and/or end walls of the metallic container body are located a predetermined height above the container bottom wall to prevent escape of fluid through the vent holes.

Figure 8:
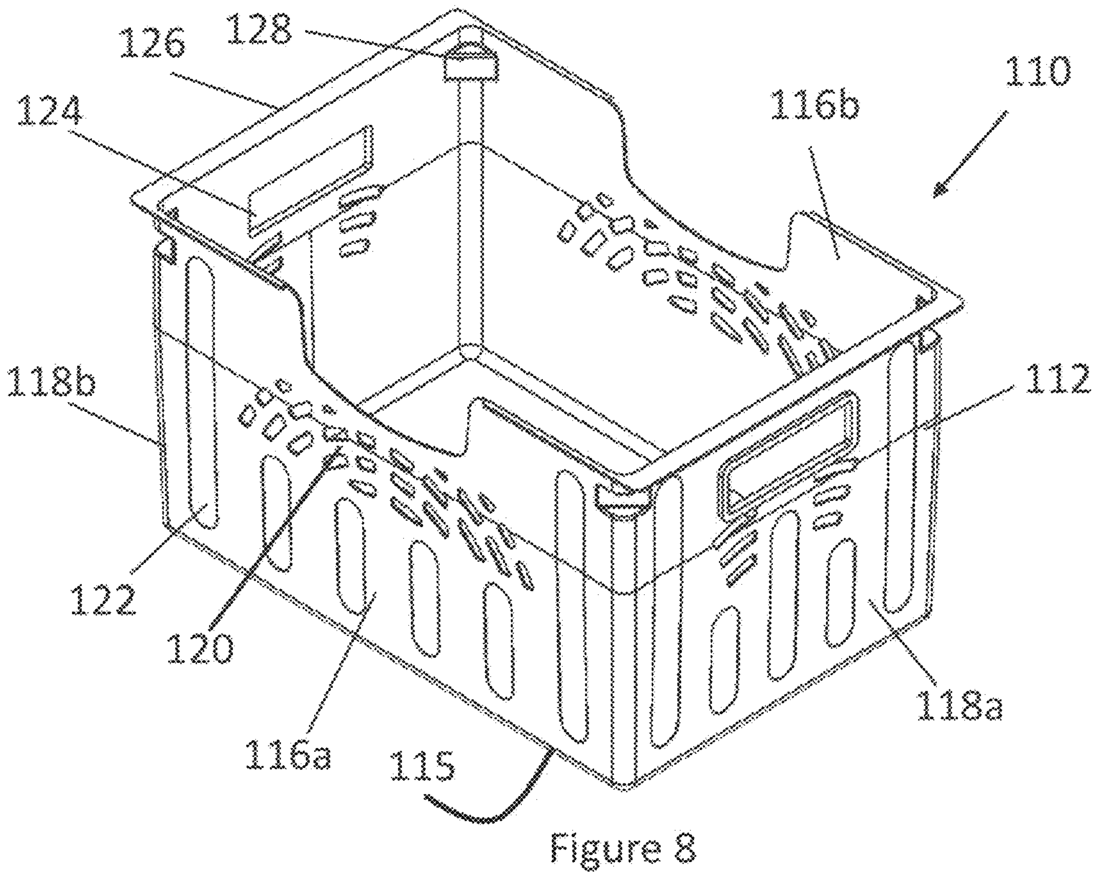
FIG. 8 is a schematic perspective view of a storage container formed by a deep drawn process according to a first embodiment of the present invention.
Figure 9:
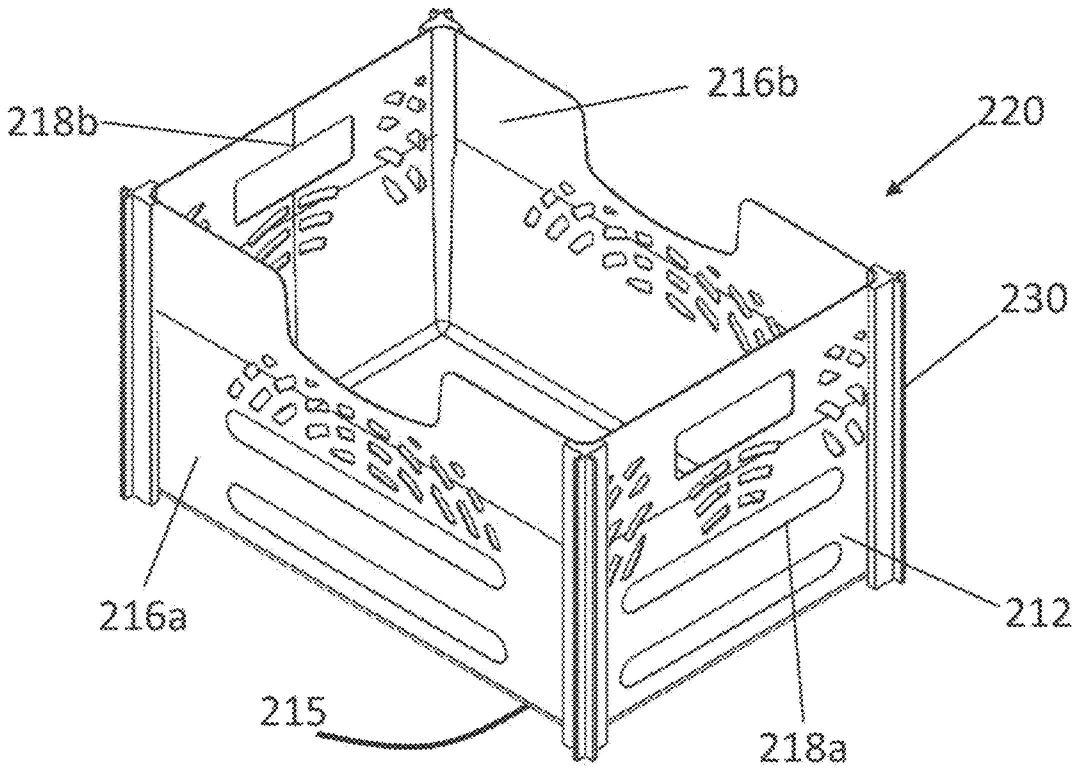
FIG. 9 is a schematic perspective view of a storage container formed by a deep drawn process according to a second embodiment of the present invention.

FIG. 8 is an example of a storage container 110 comprising the metallic container body 112 according to a first embodiment of the present invention where the storage container 110 is formed from a deep drawn presswork of a sheet metal blank comprising a container bottom wall 115 and opposing sidewalls 116 (*a* and *b*) and opposing end walls 118 (*a* and *b*). A sheet metal blank is mechanically drawn into a forming die which resembles the shape of the storage container by the mechanical action of a punch. The advantage of the deep drawn process over other metal forming process is the ability to create a leak proof storage container. The storage container 110 can be fabricated from stainless steel sheet metal having a thickness in the range 0.5 mm to 2.0 mm, for example the thickness may be 0.55 mm, 0.6 mm, 0.7 mm, 0.8 mm, 0.9 mm and 1 mm. However, other metals can be used in the fabrication of the metallic container body including but not limited to aluminium. To provide the necessary structural rigidity of the walls of the storage container, preferably the thickness of the sheet metal blank is about 2 mm. The storage container 110 shown in FIG. 8 is an example where the storage container is formed from a full deep drawn process using a single or unitary sheet metal blank. Like the storage container discussed above, the opposing sidewalls 116 (*a* and *b*) and end walls 118 (*a* and *b*) of the storage container 110 comprise one or more slots or openings or vent holes 120 to permit the flow of air within the storage container 110. The one or more slots 120 can be cut into the sheet metal blank prior to the deep drawn process, or alternatively the one or more slots can be cut out or stamped into the opposing sidewalls and/or end walls of the storage container after the deep drawn process. Similarly, one or more ribs 122 can be stamped into the sidewalls 116 (*a* and *b*) and end walls 118 (*a* and *b*) of the storage container 110 to reinforce the walls of the storage container, and thereby improve the structural integrity or sturdiness of the formed storage container. Similarly to the storage container in the art, one or more handles 124 are formed in the sidewalls and/or end walls of the storage container. To enable the grabber device of the lifting mechanism to engage with the rim of the storage container and lift the storage container into the container receiving space of the robotic load handling device, at least a portion of the rim is formed with a lip or flange 126 to enable a grabber device to engage with the rim. To create the lip or flange 126, the upper edges of the opposing sidewalls and/or opposing end walls are turned or bent inwardly and/or outwardly. In the particular example of the first embodiment of the present invention, the rim at the upper edge of the opposing end walls of the metallic container body are outwardly turned to form a flange or lip 126 for the grabber device, in particular the gripper elements to engage with the rim of the storage container. The lip or flange 126 can have one or more openings (not shown) to receive a gripper element within the one or more openings.

To enable the storage containers of the first embodiment of the present invention to be stacked one on top of the other in the storage and retrieval system, the storage container comprises one or more stops 128 at the corners of the storage container 110. The container bottom wall of an adjacent storage container above in a stack butts up or is supported by the one or more stops of a storage container below, and thereby prevents the container bottom wall of the adjacent storage container from fouling or crushing the contents of the storage container below in a stack. In the particular embodiment of the present invention shown in FIG. 8, the stops 128 are formed by one or more indentations that extend inwardly from the corners into the interior space of the metallic container body 112.

To provide further structural support to the deep drawn storage container in the first embodiment of the present invention shown in FIG. 8 for bearing a load when placed in a stack, one or more corner posts 230 can be mounted either externally or internally at the corners of the storage container 220. In a second exemplary embodiment of the present invention shown in FIG. 9, a corner post 230 is mounted externally at each of the corners of the storage container 220. Each of the corner posts 230 at the corners of the storage container extend along the full height or depth of the storage container 220 such that the corner posts 230 bear the full weight of an adjacent storage container above in a stack and the metallic container body 212 simply provides the function of containment of items within the storage container. In other words, the corners posts 230 provide a resting surface for adjacent storage containers in a stack. To provide the necessary structural rigidity, the corner posts are cast from metal, preferably die cast. Considering that the thickness of the corners posts is greater than the walls of the metallic container body, which is fabricated from a sheet metal blank, other lightweight materials can be used in the fabrication of the corner posts such as plastic material. As a result, the material of the storage container can be a combination of metal forming the metallic container body and the plastic corner posts at the corners of the metallic container body. The use of plastic corner posts helps to keep the overall weight of the storage container low, e.g. less than 6 kg, preferably less than 5 kg.

Figure 10:
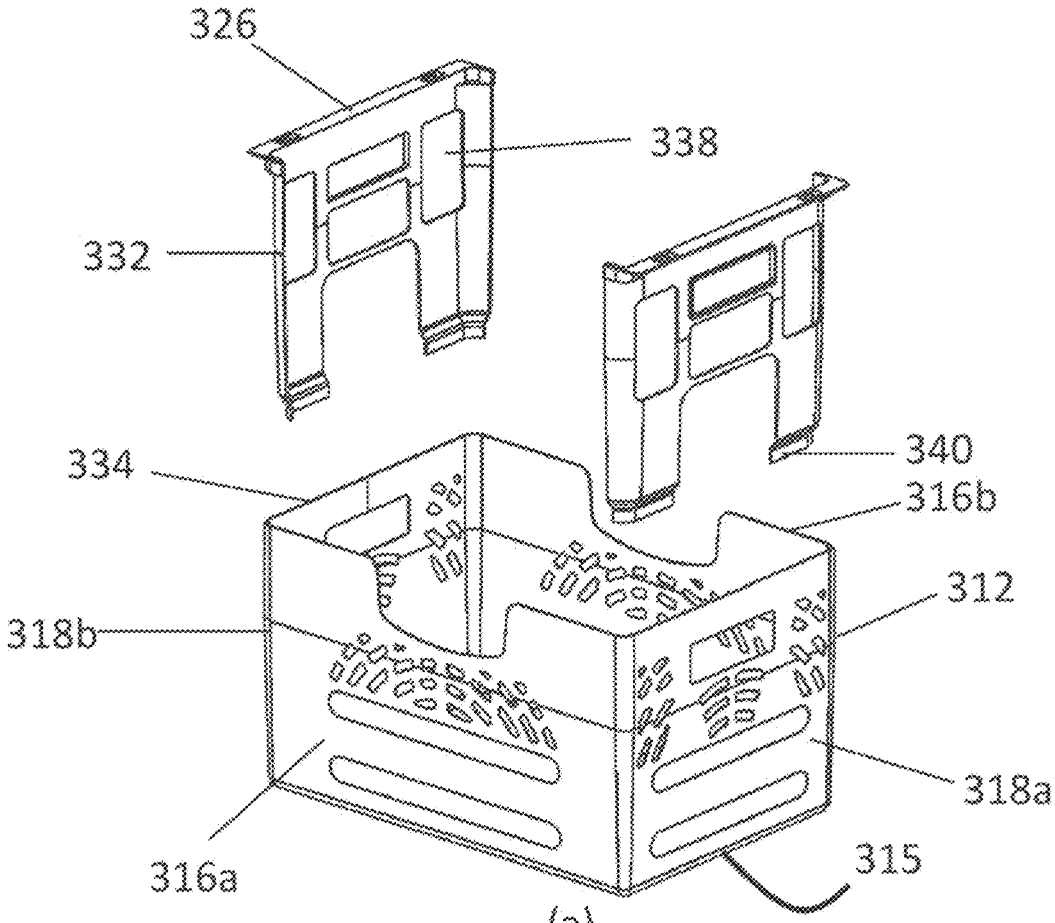
FIGS. 10(*a* and *b*) are schematic perspective of a storage container formed by a deep drawn process and showing (a) an exploded view of the assembly components of the storage container; and (b) assembled storage container according to a third embodiment of the present invention.
Figure 10:
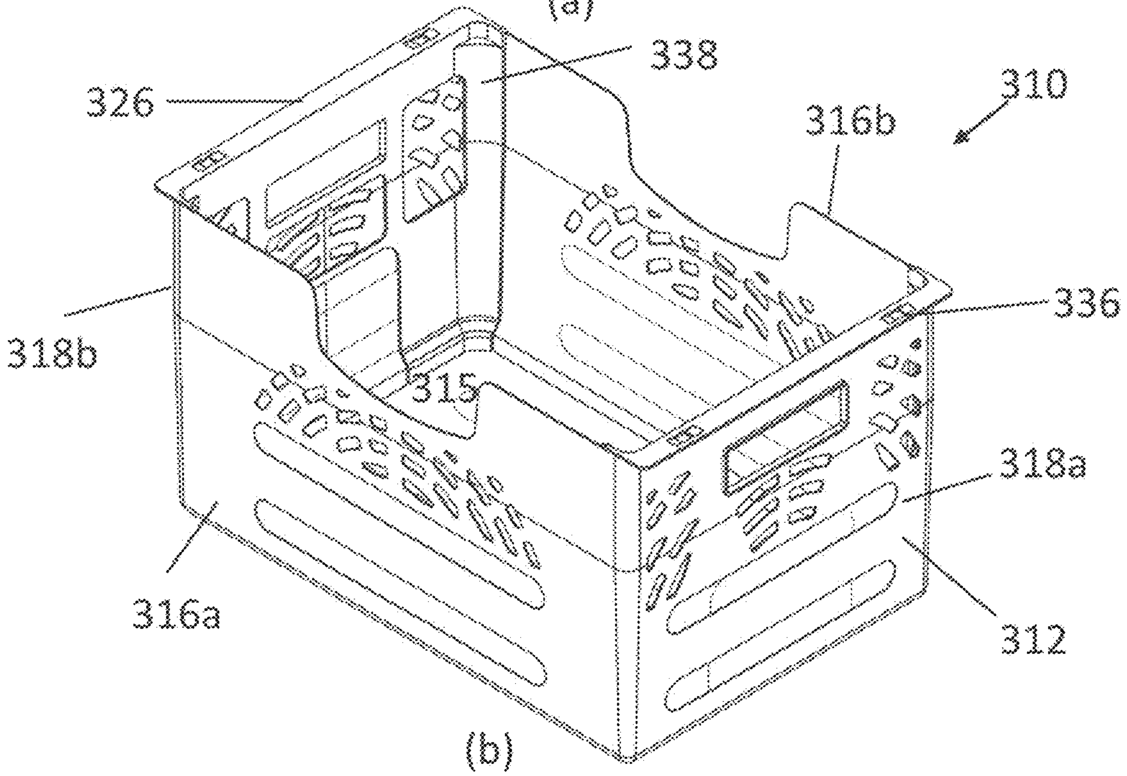

In a third exemplary embodiment of the present invention shown in FIG. 10 (*a* and *b*), one or more of the opposing sidewalls 316 (*a* and *b*) and/or opposing end walls 318 (*a* and *b*) of the deep drawn metallic container body 312 of the storage container 310 can be reinforced by one or more inserts or wall stiffeners 332. As shown in FIG. 10, the wall inserts 332 are placed against each of the opposing end walls 316 (*a* and *b*) of the metallic container body 312 and extend from the container bottom wall 315 to the rim 334 at the upper edge of the metallic container body 312. To provide a support surface to facilitate stacking of adjacent storage containers in a stack, the upper edge of the wall insert 332 is outwardly turned to form a lip 326 at the rim of the metallic container body. The outwardly turned lip 326 comprises one or more openings 336 to enable a grabber device to engage with the rim of the metallic container body and lift the storage container from its stack. The wall stiffeners or inserts 332 can be cast into plates, preferably die cast to provide the necessary structural integrity to the walls of the storage container 310 to bear the weight of adjacent storage container in a stack. Whilst metal, e.g. steel or aluminium, is preferably used to cast the wall stiffeners 332, other structural integral materials such as plastic can be used to fabricate the wall stiffeners. The wall stiffeners 332 can optionally comprise one or more recesses 338 in close proximity to the rim or mouth of the storage container 310 to facilitate stacking of the storage containers, i.e. the one or more recesses 338 in the wall stiffeners provide one or more stops that are configured to provide a support surface that cooperates with the container bottom wall of an adjacent storage container above in a stack. The lower edge of the wall stiffener 332 can either butt up against the container bottom wall 315 of the metallic container body 312 or comprise one or more tabs 340 that are received in slots in the bottom container wall 315. The walls namely the opposing sidewalls 316 (*a* and *b*) and the opposing end walls 318 (*a* and *b*) of the metallic container body 312 are outwardly inclined from the container bottom wall 315 such that the metallic container body 312 is tapered. The tapered body permits the metallic container body to fit inside another metallic container body such that a plurality of storage containers can be stacked neatly within each other and thereby, occupy less storage space. In use, the wall stiffeners 332 can be inserted against the one or more of the sidewalls 316 (*a* and *b*) and/or end walls 318 (*a* and *b*) of the metallic container body 312 so as to enable one or more storage containers to be supported on top of each other. In transit, the wall stiffeners 332 can be stored separately so as to allow a plurality of the metallic container bodies 312 to be neatly stacked together.

Figure 11:
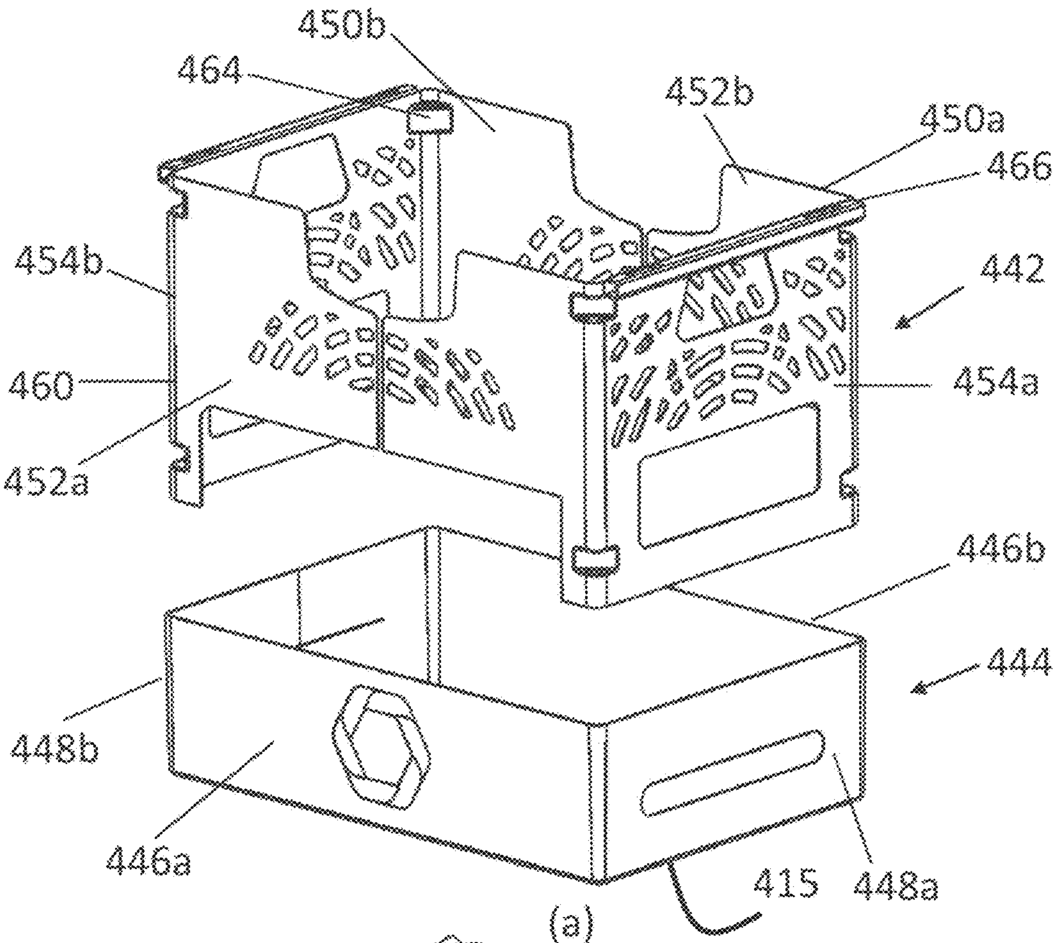
FIGS. 11(*a* and *b*) are schematic perspective of a storage container partially formed by a deep drawn process and showing (a) an exploded view of the assembly components of the storage container; and (b) assembled storage container according to a fourth embodiment of the present invention.
Figure 11:
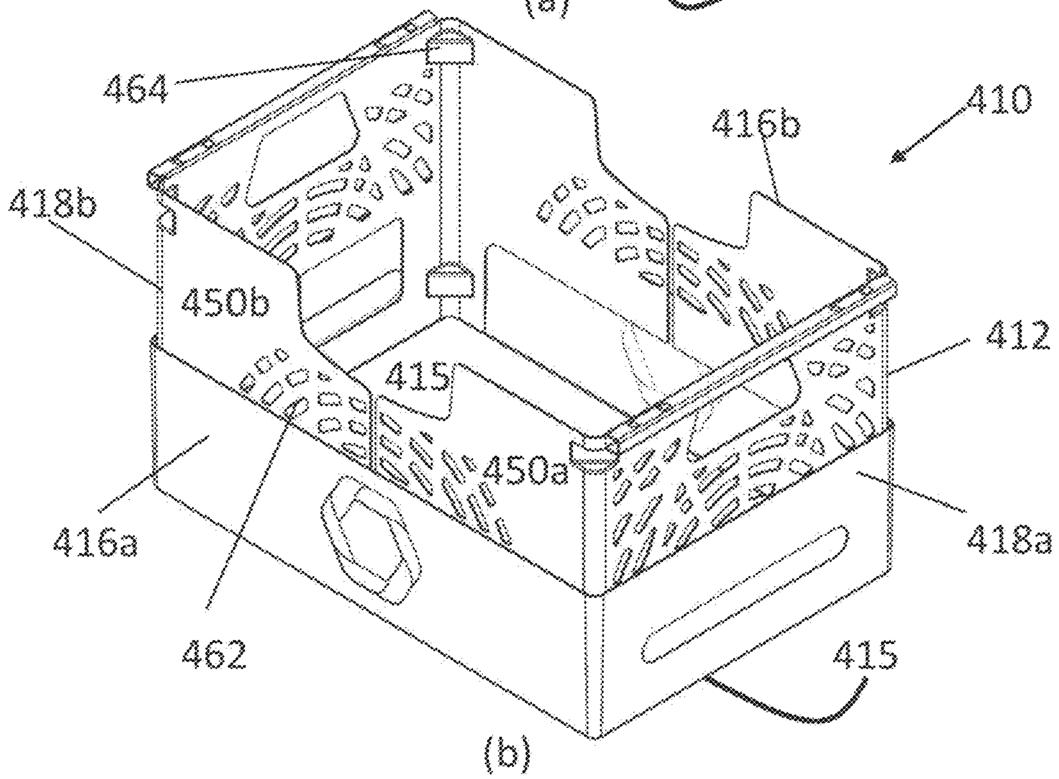

The metallic container body of the first, second and third embodiment of the present invention is formed from a full deep drawn sheet metal blank. In other words, the entirety of the metallic container body can be deep drawn from a unitary sheet metal blank. The formed deep drawn structure can be fettled or cut to size to form the metallic container body. Examples of fettling include but are not limited to cutting and/or filing the edges of the deep drawn structure. The full deep drawn process suffers from the problem of being a bulky product, since the storage container occupies a relatively large portion of storage space when being transported. Considering that thousands of storage containers are needed in a typical storage system, transporting and storing the bulky product is costly and uneconomical. A storage container comprising a metal container body is thus required that does not represent a bulk product when being transported or stored for use. In comparison to forming the metallic body of the storage container by a full deep drawn process as discussed with reference to FIGS. 8 to 10 (a and b), the metallic container body as shown in FIGS. 11 (a and b) to 16 can be fabricated by a two stage forming process comprising a combination of a deep drawn process in combination with erecting one or more blanks comprising foldable sidewalls. In the exemplary embodiments shown in FIGS. 11 (a and b) to 20, the metallic container body comprises a lower portion, otherwise known as a base portion, and an upper portion. The terms lower portion and base portion are used interchangeably in this patent application. The lower portion comprises a deep drawn base comprising the container bottom wall and opposing sidewalls and end walls forming a shallow base or tray. The deep drawn process for forming the lower portion enables the base portion of the metallic container body to be leak proof. The upper portion of the metallic container body is collapsible in the sense that the upper portion can be erected from a folded sheet metal blank or cast into plates that are pivotally connected together. The sheet metal blank can comprise one or more fold lines to assist with the folding of the sheet metal blank to define the sidewall and end wall of the metallic container body. The advantage of forming the metallic container body by a two stage forming process is that storage of the metallic container body comprising an upper and lower portion for transport makes an efficient use of storage space. For example, multiple bases can be stacked together for transport. Similarly multiple sheet metal blanks or plates can be flat packed together and then erected at the point of use.

FIG. 11 (*a* and *b*) is an exemplary embodiment of a metallic container body 412 formed by the two stage forming process according to a fourth embodiment of the present invention. FIG. 11(*a*) shows the metallic container 410 formed from two parts, a lower part 444 and an upper part 442, and FIG. 11(*b*) shows the separate parts 444, 442 being brought together to form the box-like structure of the metallic container body 412 according to an exemplary embodiment of the present invention, i.e. the lower part 444 forms a base portion and the upper part 442 forms the upper portion of the metallic container body. The lower part 444 is formed by deep drawing or stamping a sheet metal blank to form a shallow base or tray 444 comprising the container bottom wall 415 and upwardly standing opposing base sidewalls 446 (*a* and *b*) and end walls 448 (*a* and *b*). The upper part 442 is formed from two separate sheet metal blanks 450 (*a* and *b*) that are folded to form the opposing upper sidewalls 452 (*a* and *b*) and end walls 454 (*a* and *b*) of the metallic container body 412. A first sheet metal blank 450*a* is folded to form one upper end wall 454*a* of the metallic container body and a portion of the pair of opposing upper side walls of the metallic container body. A second sheet metal blank 450*b* is folded to form the other upper end wall 454*b* of the metallic container body and a portion of the pair of opposing upper side walls of the metallic body. The opposing upper sidewall portions are pivotally attached to their respective upper end walls 454 (*a* and *b*) of the first and second sheet metal blank 450 (*a* and *b*) by a living hinge 460 or other suitable pivotable connection. The first and second sheet metal blanks 450 (*a* and *b*) comprise one or more fold lines to assist with the folding of the respective sheet metal blanks to form the upper sidewalls and end walls of the metallic container body. As a result, the first and second sheet metal blanks are folded to form two respective C shaped folds such that when erected and assembled or brought together as shown in FIG. 11(*b*), each of the opposing upper side wall portions from the respective first 450*a* and second 450*b* sheet metal blanks lie in substantially parallel vertical planes. In other words, the C shaped folds are brought together to form a tubular like structure forming the upper portion of the metallic container body. The tubular like structure is offered up to the lower or base shaped part 444 where it is inserted within the shallow base of the lower part 444 of the metallic container body 412 to form a box-like structure with an open end or mouth as shown in FIG. 11(*b*). When assembled together, the opposing sidewalls 416 (*a* and *b*) of the metallic container body 412 comprise an upper sidewall part and a lower sidewall part. Similarly, the opposing end walls 418 (*a* and *b*) of the metallic container body 412 comprise an upper end wall part and a lower end wall part. The opposing sidewalls 446 (*a* and *b*) and end walls 448 (*a* and *b*) of the shallow part of the metallic container body respectively form the lower sidewall parts and lower end wall parts of the metallic container body. The opposing sidewalls and end walls of the upper portion of the metallic container body 412 form the upper sidewall parts and upper end wall parts of the metallic body. The combination of the deep drawn shallow base and the C shaped folds allows at least a portion of the metallic container body to be collapsible for ease of transport. The collapsible portion of the metallic container body comprising the sheet metal blanks can also include a plurality of vent holes 462 stamped into the sheet metal blanks to assist with the circulation of fluid, e.g. air, within the interior space of the metallic container body. The thickness of the sheet metal blank for forming the lower portion and/or upper portion can be in the range 0.5 mm to 1 mm thick and composed of stainless steel but other metals such as aluminium can be used in the fabrication of the metallic container body. The opposing sidewalls and end walls of the lower portion can be outwardly inclined from the container bottom wall 415 such that the walls 446 (*a* and *b*), 448 (*a* and *b*) of the shallow base 444 are slightly tapered. This allows multiple shallow bases or trays 444 to be conveniently stacked together as demonstrated in FIG. 21.

Also shown in FIGS. 11(*a* and *b*) are one or more stops 464 at the corners of the metallic container body 412 that are spaced apart and configured to allow vertically adjacent storage containers to be stacked one on top of the other. The stops 464 at the corners are spaced apart above the container bottom wall 415 so as to prevent the container bottom wall of an adjacent storage container above in a stack from crushing the contents of the storage container below. In the particular embodiment shown in FIG. 11 (*a* and *b*), the one or more stops 464 are formed by stamping depressions at the corners of the metallic container body, but other means to form the stops are applicable in the present invention. The top edge of at least one of the opposing walls at the rim of the metallic container body is outwardly turned to form a lip 466 for a grabber device of a load handling device to releasably engage and pick the storage container comprising the metallic container body from a stack.

Figure 12:
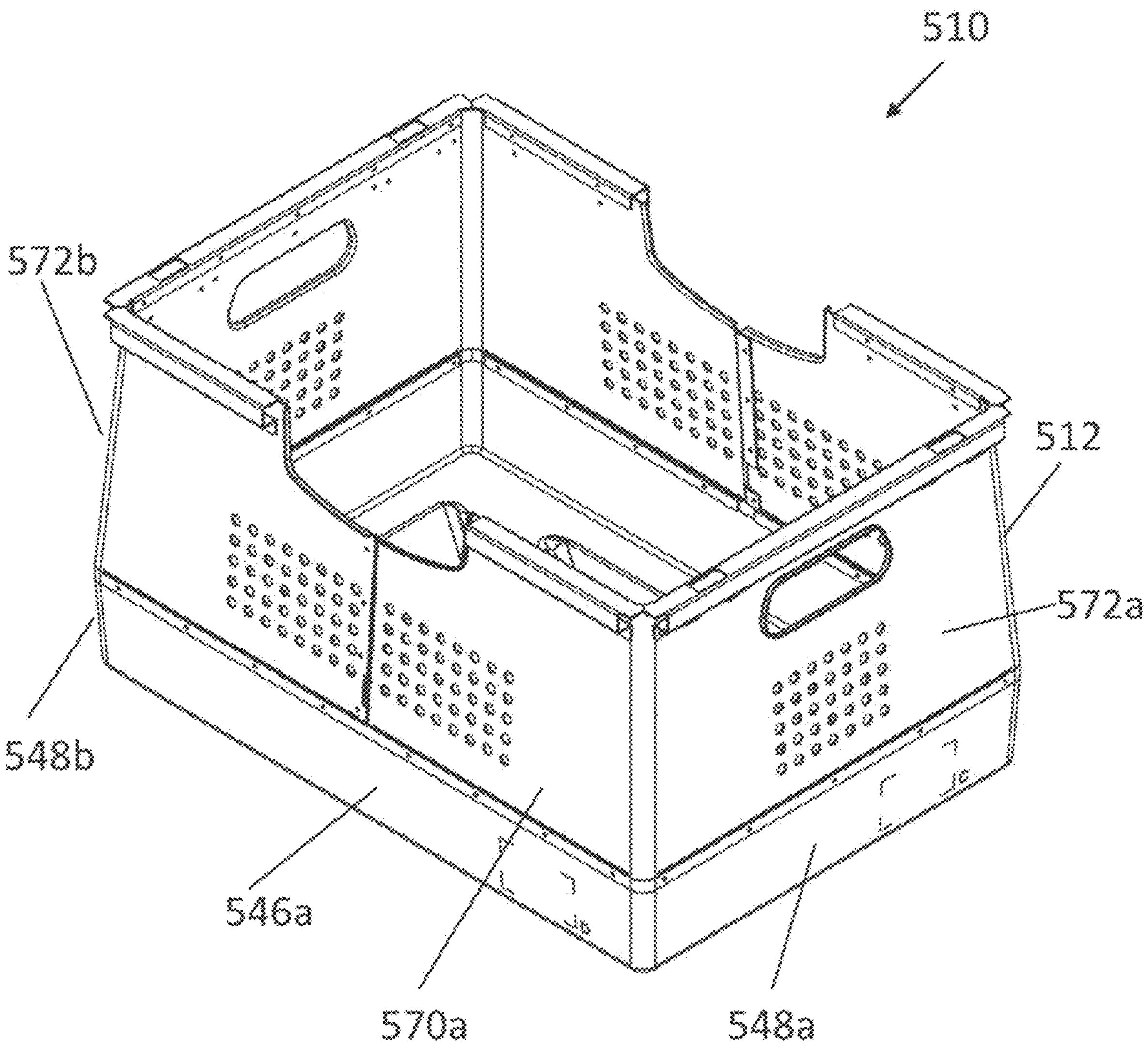
FIG. 12 is a schematic view of a storage container partially formed by a deep drawn process according to a fifth embodiment of the present invention.

Instead of the upper portion of the metallic container body being supported by the shallow base of the lower portion by inserting the C-shaped folds into the shallow base as shown in FIG. 11 (*a* and *b*), in a fifth exemplary embodiment of the present invention shown in FIG. 12, the upper sidewall parts 570 (*a* and *b*) and end wall 572 (*a* and *b*) parts can be fixedly connected to the respective lower sidewall parts (or upwardly standing base sidewalls) 546 (*a* and *b*) and end wall parts (or upwardly standing end wall parts) 548(*a* and *b*) of the shallow base to form a box like structure, e.g. by riveting or welding. Equally, the ends of the C-shaped folds are fixedly connected together to form the upper portion of the metallic container body, which in turn is fixedly connected to the lower portion of the metallic container body 512. Specifically, the ends of the C-shaped folds are connected together by overlapping one end over another end. The ends are fixedly connected together by, for example, welding or riveting the ends together or by using an adhesive.

Figure 13:
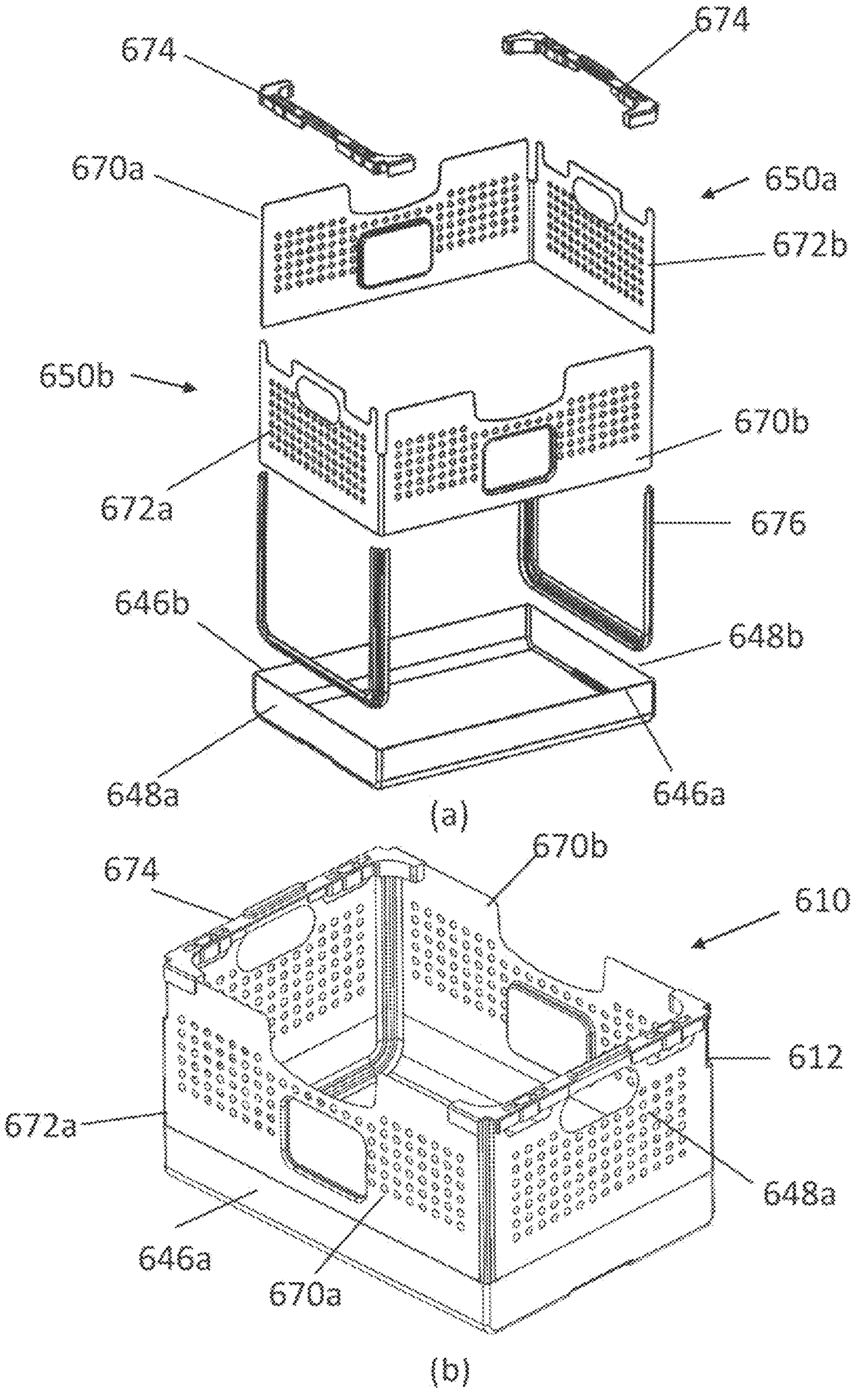
FIGS. 13(*a* and *b*) are schematic perspective view of a storage container partially formed by a deep drawn process and showing (a) a pre-assembled view of the storage container; and (b) the assembled storage container according to a sixth embodiment of the present invention.
Figure 14A:
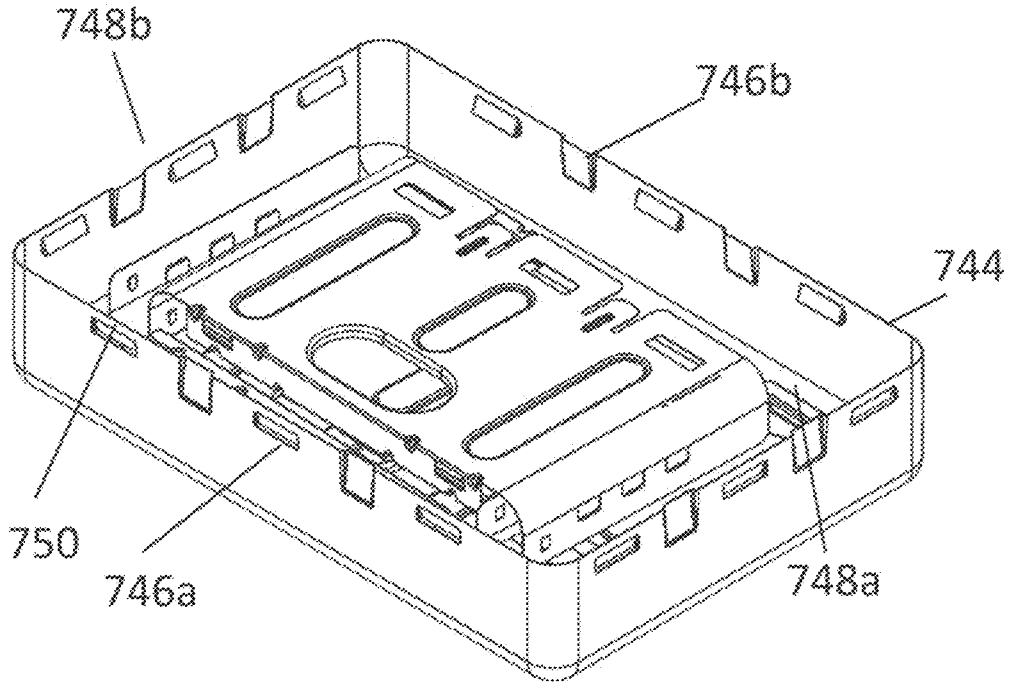
FIGS. 14(*a*) and 14(*b*) are schematic perspective view of a storage container partially formed by a deep drawn process and showing 14(*a*) a pre-assembled view of the storage container; and 14(*b*) the assembled storage container according to a seventh embodiment of the present invention.
Figure 14B:
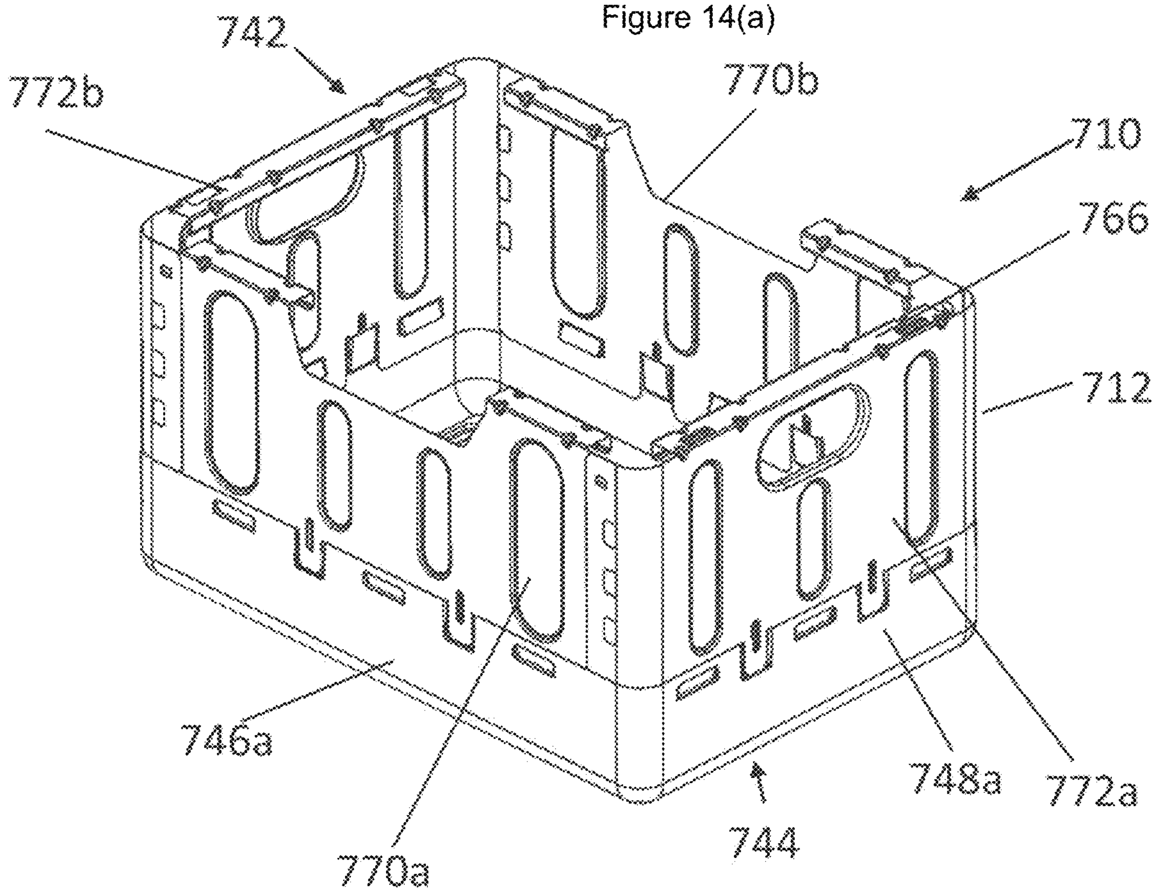
Figure 14C:
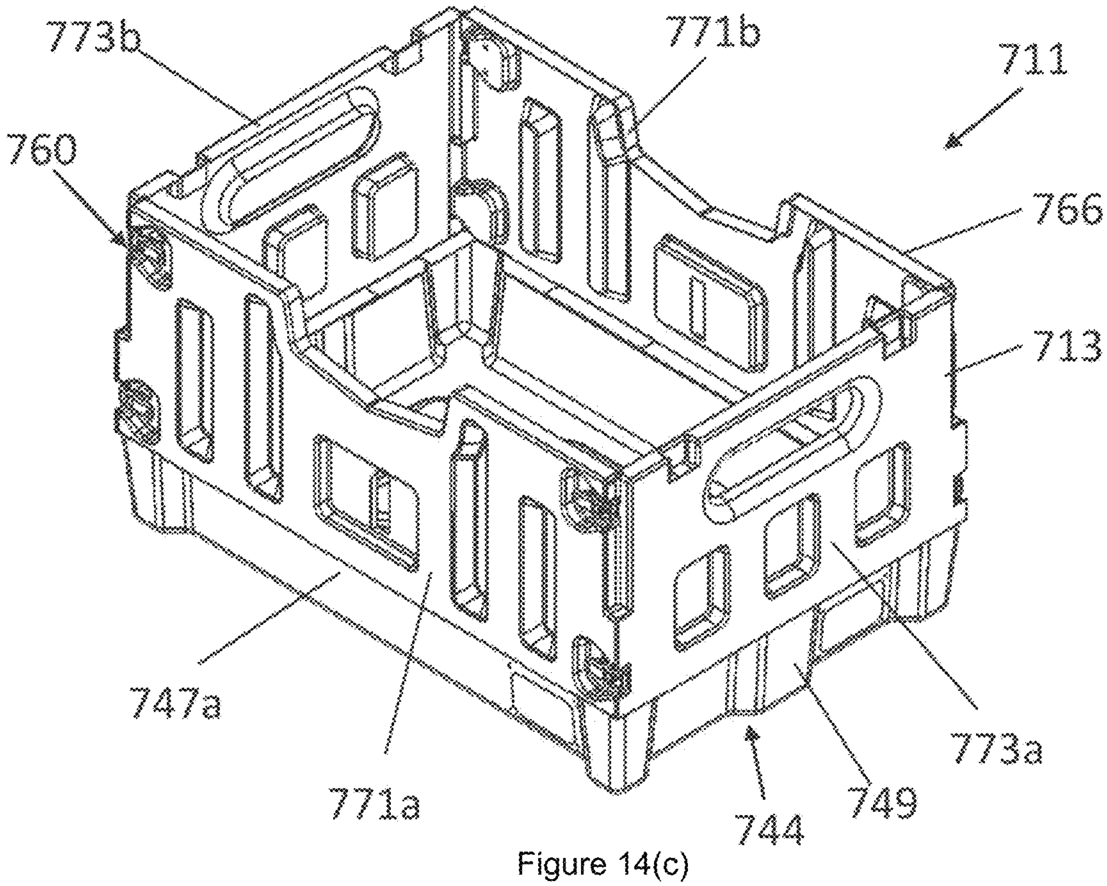
Figure 14D:
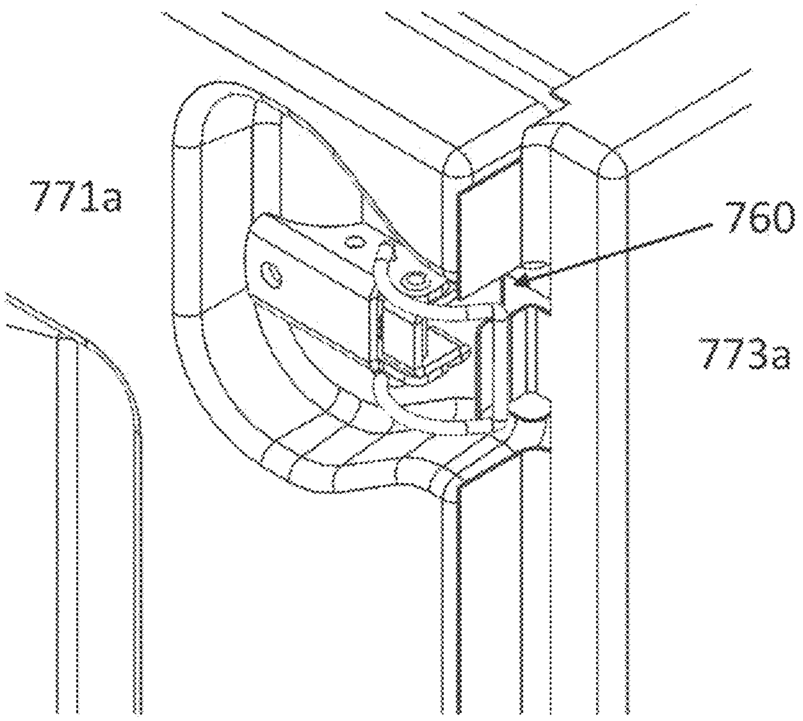
Figure 14E:
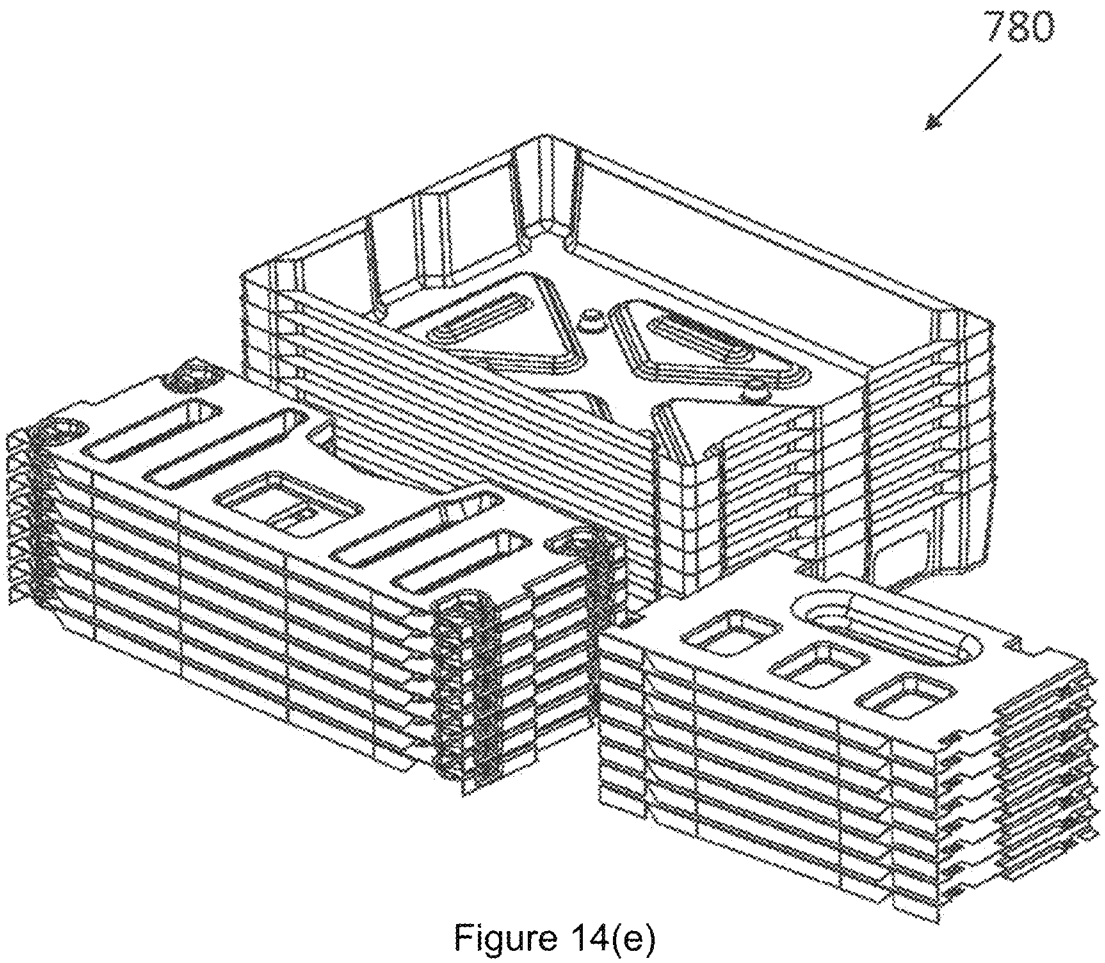
Figure 15A:
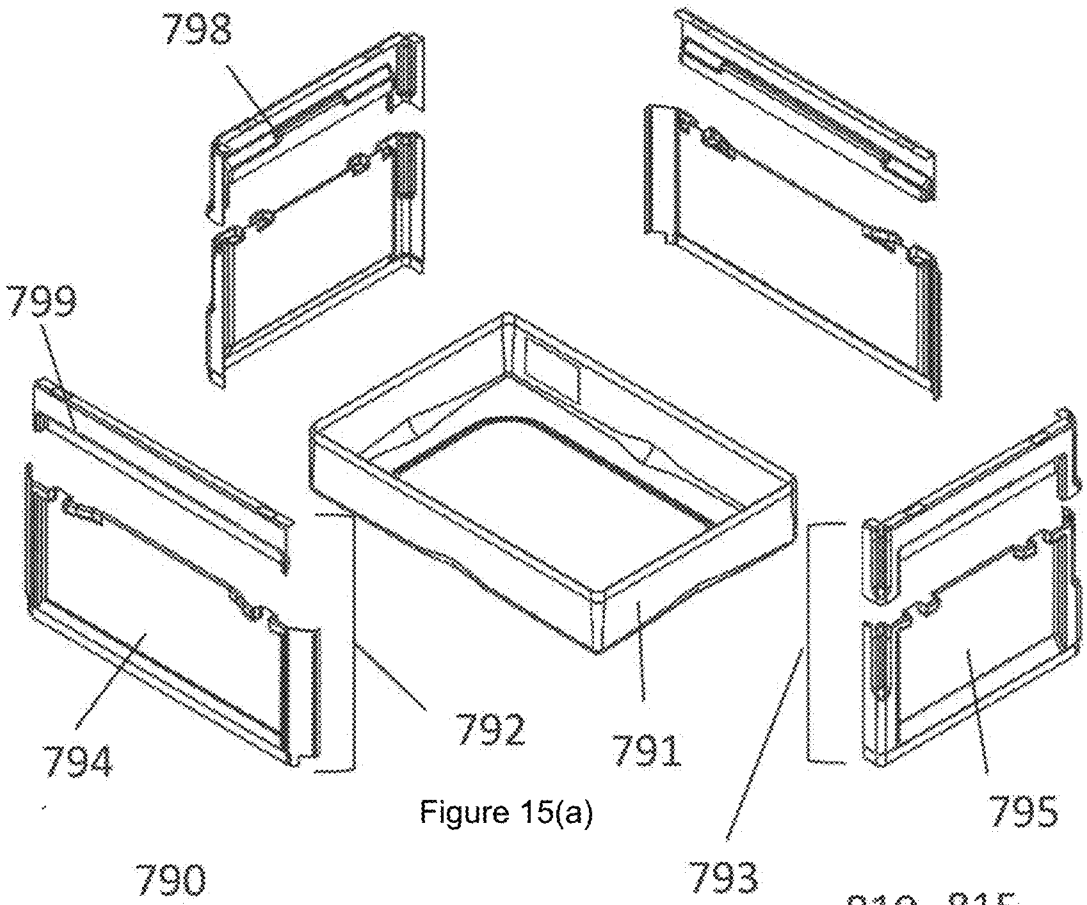
FIGS. 15(*a*) and 15(*b*) are schematic perspective view of a storage container partially formed by a deep drawn process and showing 15(*a*) a pre-assembled view of the storage container; and 15(*b*) the assembled storage container according to an eighth embodiment of the present invention.
Figure 15B:
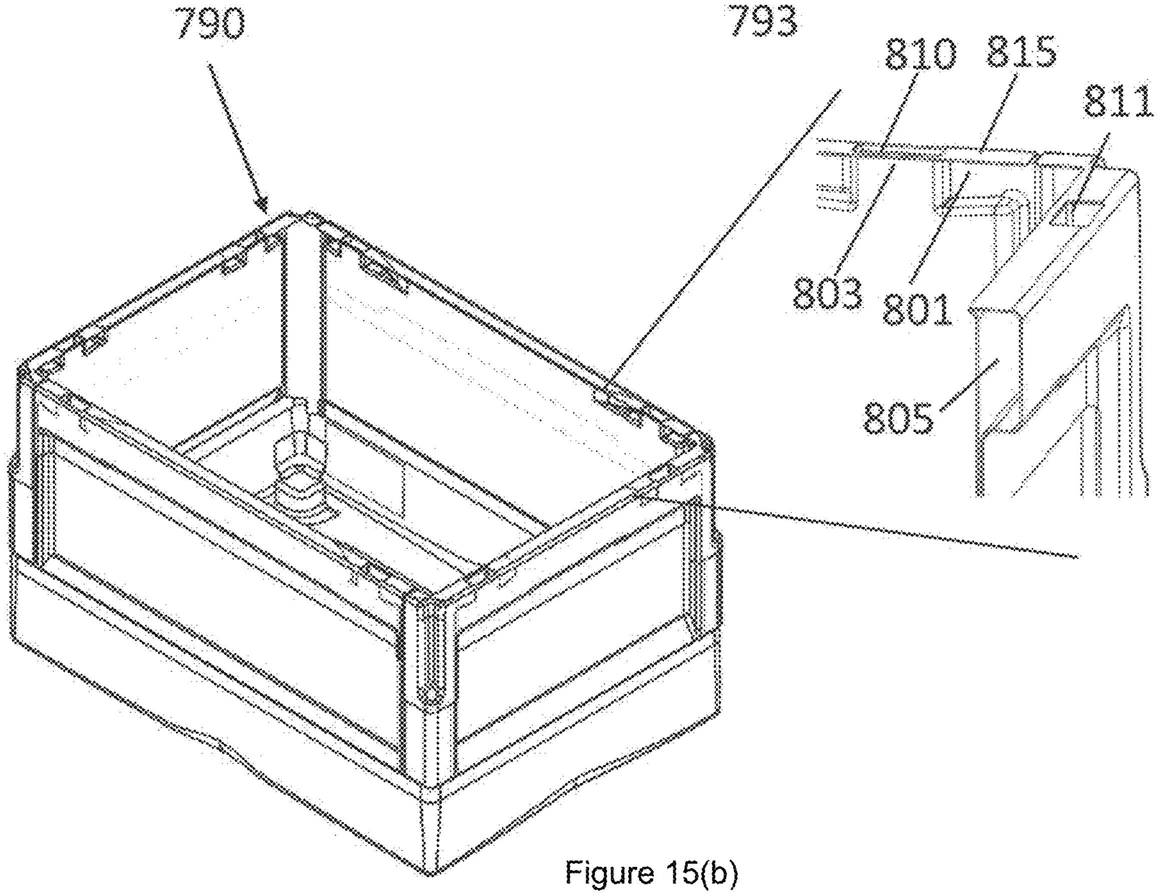
Figure 15C:
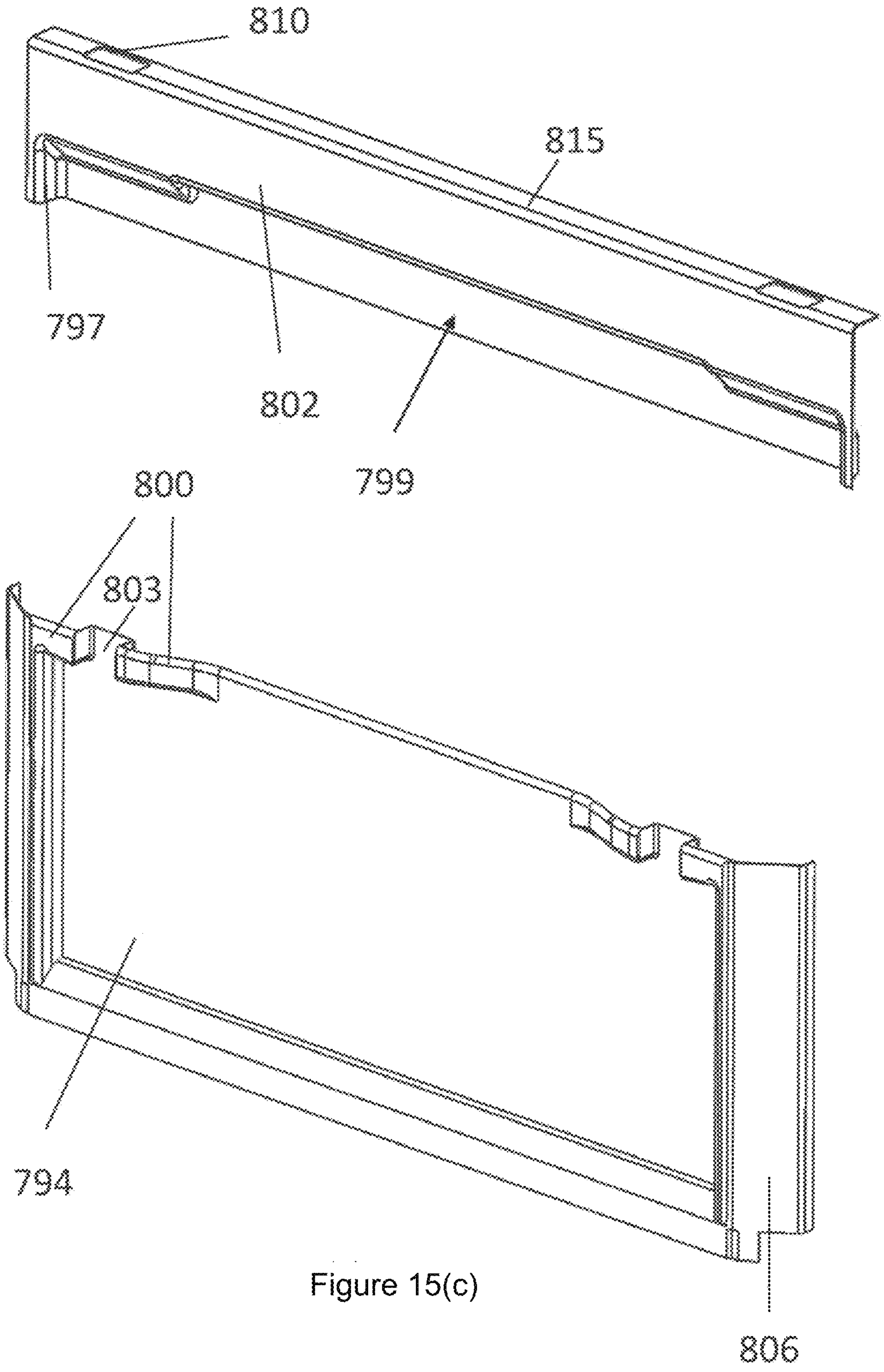
Figure 15D:
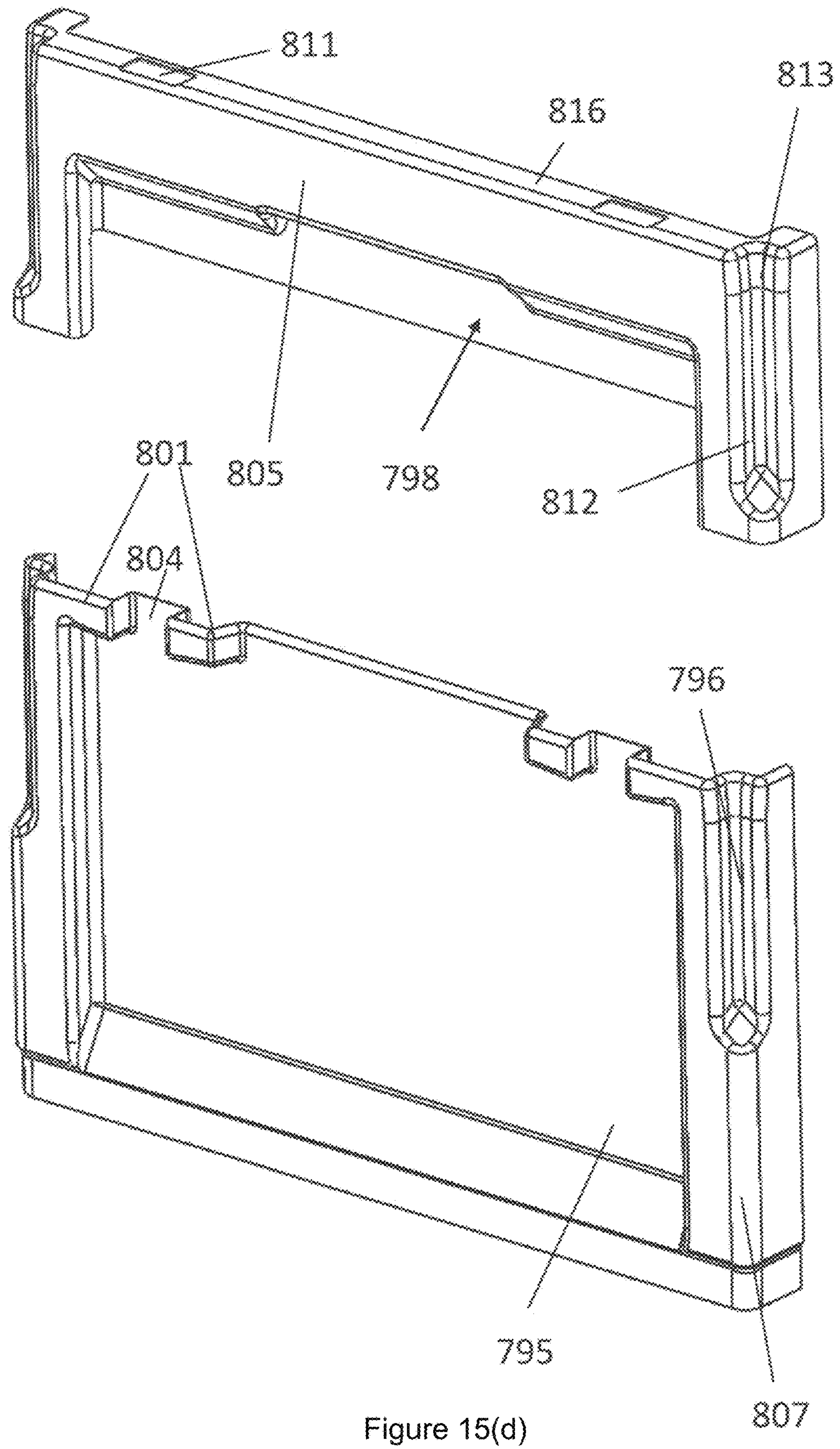
Figure 15E:
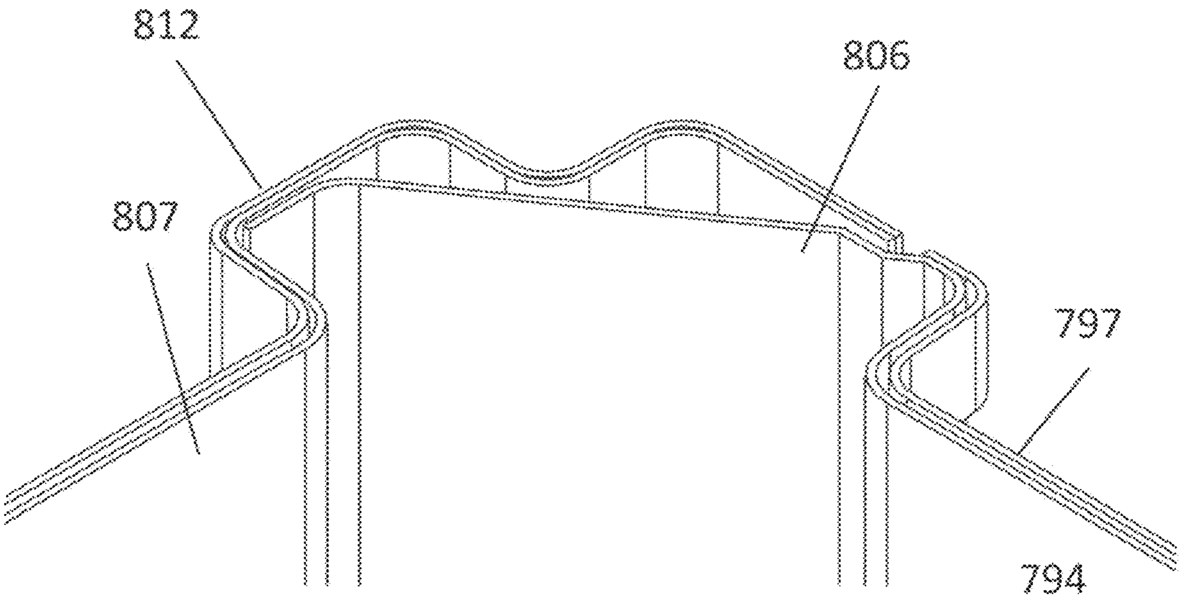

An alternative to the embodiment of the metallic container body shown in FIG. 11 (*a* and *b*) and 12, is the embodiment shown in FIG. 13 (*a* and *b*) where the sidewalls 670 (*a* and *b*) and end walls 672 (*a* and *b*) in the upper portion of the metallic container body 612 are held together by one or more retainers 674, 676. As with the other embodiments shown in FIG. 11 (*a* and *b*) and 12, the upper portion of the metallic container body is collapsible in the sense that the upper portion is erected from a folded sheet metal blank. Two sheet metal blanks 650 (*a* and *b*) are shown wherein each of the two sheet metal blanks 650 (*a* and *b*) is foldable to define the sidewall 670 (*a* and *b*) and end wall 672 (*a* and *b*) having a length extending along the length of the respective side wall and end wall of the metallic container body 612. In other words, each of the two sheet metal blanks 650 (*a* and *b*) is foldable to define a substantially L shaped structure. The two L shaped structures are brought together to create a tubular structure that is configured to be mounted to the shallow base of the lower portion. One or more retainers 676 are used to secure the folded sheet metal blanks 650 (*a* and *b*) together within the walls 646 (*a* and *b*). 648 (*a* and *b*) of the shallow base In the particular embodiment shown in FIG. 13(*a*), the one or more retainers comprises C-shaped channel tubing 676 at the opposing ends of the metallic container body for securing the folded sheet metal blanks together. During assembly of the metallic container body as shown in FIG. 13(*b*), the folded sheet metal blanks 650 (*a* and *b*) are received within the C-shaped channel tubing 676. To provide further strength to the metallic container body 612, the one or more retainers comprises separate rim portions 674 that are configured to be mounted to the upper edge of the folded sheet metal blanks 650 (*a* and *b*) to define the rim of the metallic container body 612. The separate rim portion provides a dual purpose of securing the folded sheet metal blanks together and providing an engaging surface for a grabber device of a load handling device to engage with the rim of the metallic container body. The one or more retainers 674, 676 can be cast to increase the strength of the metallic container body. The upper portion can be cast metal plates rather than being formed from a foldable sheet metal blank that are pivotably connected together.

In the embodiments shown in FIG. 11 (*a* and *b*), FIG. 12, and FIG. 13 (*a* and *b*), the upper sidewalls parts are pivotally connected to their respective end wall parts, e.g. by a living hinge. Instead of having a sheet metal blank comprising a sidewall part pivotally connected to its respective end wall part, the opposing sidewalls 770 (*a* and *b*) and end walls 772 (*a* and *b*) of the metallic container body 712 can be formed as separate parts that are assembled together. In a seventh exemplary embodiment of the present invention in FIG. 14 (*a* and *b*) the walls 770 (*a* and *b*), 772 (*a* and *b*) of the upper portion are formed as separate parts, e.g. by stamping, and are subsequently fixedly connected together to form the upper sidewall parts and upper end wall parts. Connection of the separate wall parts of the upper portion can be by a snap fit joint. The separate parts of the upper portion are also fixedly connected to the lower opposing sidewall parts 746 (*a* and *b*) and lower end wall parts 748 (*a* and *b*) of the lower portion. In the collapsed or dismantled state as shown in FIG. 14(*a*), the separate parts of the upper portion can be conveniently placed in a collapsed state within the shallow base 744 of the lower portion, and therefore the storage container occupies less storage space for transport. The separate upper sidewall 770 (*a* and *b*) and end wall 772 (*a* and *b*) parts can be stamped from a sheet metal blank and typically have a thickness in the range 0.5 mm to 1 mm. As with the other embodiments of the present invention shown in FIGS. 11 (*a* and *b*) to 13, the lower portion is formed by a deep drawn process or stamped from a sheet metal blank. At the point of use, the separate sidewall parts 770 (*a* and *b*) and end wall parts 772 (*a* and *b*) of the upper portion can be connected to the lower portion, e.g. by a snap fitting joint, to create a box-like structure as shown in FIG. 14(*b*). The upper edge of the shallow base comprises engaging portions 750 that snap fit with corresponding engaging portions of the upper sidewall and end wall parts. In the particular embodiment shown in FIG. 14 (*a* and *b*), the engagement portions are integrally formed within the sidewall parts and end wall parts of the lower and upper portion of the metallic container body. The upper edge of the upper portion is inwardly turned to form a lip 766 having one or more apertures or openings at the rim of the metallic container body for engagement with a grabber device of a load handling device. In use, the separate walls comprising the sidewall parts 770 (*a* and *b*) and end wall parts 772 (*a* and *b*) can be individually fixed to the walls of the shallow base 744 such that each of the opposing sidewalls of the metallic container body comprises a lower sidewall part and an upper sidewall part. Similarly, each of the opposing end walls of the metallic container body comprises a lower end wall part and an upper end wall part.

In yet a further exemplary modification of the seventh embodiment of the present invention shown in FIG. 14(*c*), the separate upper sidewall parts 771 (*a* and *b*) and upper end wall parts 773 (*a* and *b*) can be releasably connected together by a releasable latch mechanism so as to enable quick assembly and disassembly of the of the metallic container body 711 from the shallow base 744. The separate parts of the upper portion are also fixedly connected to the lower opposing sidewall parts 747 (*a* and *b*) and lower end wall parts 749(*a* and *b*) of the lower portion 744. In the particular embodiment shown in FIG. 14(*c*) and more clearly shown in FIG. 14(*d*), the upper sidewall parts 771 (*a* and *b*) and upper end wall parts 773 (*a* and *b*) are releasably connected together by cooperation of a toggle latch 760 with a hook at the respective distal or opposing ends of the upper sidewall parts and upper end wall parts. As shown in FIG. 14(*c*), the opposing ends of the upper sidewall parts 771 (*a* and *b*) comprise one or more toggle latches 760 that are configured to cooperate with hooks at the opposing ends of the upper end wall parts 773 (*a* and *b*). Two toggle latches 760 are shown spaced apart at the opposing ends of the upper sidewall parts 771 (*a* and *b*). Assembly of the metallic container body involves offering up the ends of the upper sidewall and end wall parts together and fixedly connecting them together by the toggle latches. The present invention is not limited to two toggle latches at the opposing ends of the upper sidewall parts and any number of toggle latches can be incorporated at the opposing ends of the upper sidewall parts. Equally, the toggle latches does not necessarily need to be at the opposing ends of the upper sidewall parts and can be at the opposing ends of the upper end wall parts. The advantage of the releasable latch is that it allows quick assembly and disassembly of the metallic container body 711. The individual walls parts 771 (*a* and *b*). 773 (*a* and *b*) can be formed from a sheet metal blank, e.g. stamp, or cast as metal plates.

In the different examples of the metallic container body shown in FIG. 14 (*a* to *d*), the separate walls parts of the metallic container body can be stacked for storage or transit. In the particular embodiment shown in FIG. 14(*e*), the separate parts of multiple metallic container bodies can be conveniently stacked 780 so taking up less storage space in comparison to them being in an assembled state. Additionally, by having separate parts that are assembled together at the point of use allows anyone of the separate parts to be easily replaced or changed should they become damaged, i.e. allows the provision of spare parts of the metallic container body.

In yet a further adaption of the metallic container body, shown in FIG. 15 (*a* to *e*), the metallic container body 790 is formed by a two stage forming process comprising a deep drawn process in combination with separate opposing sidewalls and end walls. Similarly to the embodiments shown in FIG. 14 (*a* to *e*), the walls of the upper portion of the metallic container body are formed as separate parts, e.g. by stamping, and are subsequently fixedly connected together to form the upper sidewall parts 794 and upper end wall parts 795. Like the other embodiments of the present invention shown in FIG. 14 (a toe), the separate opposing sidewalls 794 and opposing end walls 795 are reinforced to mitigate twisting of the metallic container body 790 when assembled together. Similarly to the embodiment shown in FIG. 13 (*a* and *b*), one or more separate rim portions 798, 799 are mounted to the upper edge of the upper sidewall parts and upper end wall parts 794, 795 to define the rim of the metallic container body 790. However, unlike the embodiment shown in FIG. 13 (*a* and *b*), separate rim portions 798, 799 are mounted to each of the upper side wall parts 794 and the upper end wall parts 795. The rim portions 798, 799 comprise one or more openings or apertures 810, 811 for engagement with a grabber device of a load handling device. The profile of the rim portions 798, 799 cooperates with the upper sidewall parts 794 and/or end wall parts 795 to form an elongated hollow portion 802, 805. The elongated hollow portion 802, 805 is located beneath one or more openings or apertures 810, 811 in the rim portion and the elongated hollow portion is arranged such that it extends across the full length of the rim portions 798, 799 and is able to accommodate the gripper elements of a grabber device. In detail and as shown in FIG. 15 (*c* and *d*), the upper sidewall 794 and end wall parts 795 of the metallic container body 790 are formed from a single skin or sheet of a metal blank and can optionally be formed by stamping a sheet metal blank. The rim portions 798, 799 can equally be formed from a single skin or sheet metal blank. The upper edge of the rim portions 798, 799 is inwardly turned to form a lip 815, 816 having one or more apertures or openings 810, 811 for engagement with a grabber device of a load handling device. The elongated hollow portion 802, 805 of the rim portions 798, 799 is located beneath the lip 815, 816. As shown in FIG. 15 (*c* and *d*), one or more depressions or bends 803, 804 are formed in the upper edge of the upper sidewall parts 794 and/or upper end wall parts 795 which are positioned to cooperate with the one or more apertures or openings 810, 811 in the rim portions 798, 799 when the rim portions are mounted to the upper sidewall 794 and/or upper end wall parts 795 to define a cavity for receiving the gripper elements of the grabber device as shown in FIGS. 5 and 6. Further, the depressions or bends 803, 804 are positioned between a pair of protrusions 800, 801 formed in the upper edge of the upper sidewall parts 794 and or/upper end wall parts 795. Specifically, the depressions or bends 803, 804 and the pair of protrusions 800, 801 of the upper edge of the upper sidewall parts 794 and/or upper end wall parts 795 are designed to fit within the elongated hollow portion 802, 805 of the rim portions 794, 795, as shown in FIG. 15(*b*). Further, the rim portions 798, 799 are configured such that they clip onto or snap fit onto the exterior of the upper side wall 794 and/or upper end wall parts 795. As shown in FIG. 15 (*c* and *d*), there are two depressions or bends 803, 804 and two pairs of protrusions 800, 801 in the upper edge of the upper sidewall parts 794 and/or upper end wall parts 795 positioned adjacent to each corner of the metallic container body 790. Similarly, there are two apertures or openings 810, 811 positioned on the rim portion 798, 799 shown in FIG. 15 (*c* and *d*) and these are positioned adjacent to each corner of the metallic container 790 and in vertical alignment with the two depressions or bends 803, 804 in the upper sidewall parts 794 and/or upper end wall parts 795. This arrangement ensures that there is good connection between the rim portion 798, 799 and the upper side wall part 794 and/or upper end wall part 795 across the length of the upper side wall part 794 and/or upper end wall part 795, and particularly around the area that interacts with the gripper device. To improve the structural integrity of the box-like structure of the metallic container body and to enable the upper sidewall and end wall parts to be fixed together, one or more flanges 806, 807 are formed at opposing ends of the upper sidewall parts 794 and the upper end wall parts 795. The flanges 807 of the upper end wall parts 795 are configured to overlay adjacent flanges 806 of the upper sidewall parts 794 when they brought together with the lower portion 791 of the metallic container body to form the box-like structure. For example, a flange 807 of the upper end wall parts 795 is configured to overlay an adjacent flange 806 from an upper sidewall part 794. This is shown in FIG. 15(*e*). Each of the flanges of an adjacent upper sidewall part or upper end wall part extends across a corner of the metallic container body to strength the corner. Various fasteners known in the art can be used to fix the upper sidewall 794 and end wall parts 795 together at the corners of the metallic container body using their respective flanges. These include but are not limited to welding, e.g. spot welding, riveting, and/or use of an adhesive. In the particular embodiment of the present invention, the flanges 806, 807 of the upper sidewall 794 and end wall parts 795 are fixed or connected together by a process called mechanical clinching. Clinching is similar to riveting but without the need for a separate rivet and involves plastically deforming the metal sheets by the use of a special punch and die to create a physical interlock between the sheet metal layers. To further improve the structural integrity of the box-like structure, the rim portion 798 mounted on the upper end wall parts 795 also comprises a rim flange 812 at each corner which overlays each flange 807 of the upper end wall part 795.

To enable the gripper elements of the grabber device to properly align with the apertures or openings 810, 811 in the rim portion of the storage container, the metallic container body comprises a guide 796 at each of the corners of the box-like structure of the metallic container body 790 that extends vertically from the upper edge to at least partially along the height of the box-like structure for accommodating the guiding pins or locating pins of the grabber device. As discussed above with reference to FIG. 6, the guides 796 are shaped to cooperate with the guiding pins or location pins of the grabber device so as to properly align the gripper elements 62 with the openings 810, 811 in the rim portion 798, 799 of the storage container. The guides 796 at the corners of the metallic container body are formed by elongated vertical depressions in the flanges 807 of the upper sidewall and/or end wall parts 794, 795. The elongated vertical depressions 796 can be formed by one or more bends in the sheet metal of the upper side wall 794 and/or upper end wall parts 795. In the particular embodiment of the present invention, the elongated vertical depressions 796 are formed in the flanges 807 of the upper end wall parts 795 as shown in FIG. 15(*d*). Corresponding elongated depressions 813 are formed in the rim portions 798 mounted to the upper end wall parts 795 and which are shaped to cooperate with the elongated vertical depressions 796 formed in the flanges 807 of the upper end wall parts 795 as shown in FIG. 15(*d*). The elongated vertical depressions 796 in the flanges 807 of the upper end wall parts 795 are configured to overlay the flanges 806 of the upper sidewall parts 794 at the corners of the box-like structure of metallic container body 790 when the upper sidewall parts 794 and upper end wall parts 795 are brought together as shown in FIG. 15(*e*). The overlaying flanges 806, 807 of the upper sidewall parts 794 and upper end wall parts 795 together with the overlaying elongated vertical depression 813 on the flange 812 of the rim portion 798 provide the corners of the metallic container body 790 with three overlapping layers. This is in turn reinforces the corners of the metallic container body 790 for bearing the load from one or more storage containers being placed on top, particularly when the storage container comprising the metallic container body is placed in a stack of storage containers. Thus there is rigidity through the corners of the metallic storage container 790 from the three-part corner structure shown in FIG. 15(*e*). The edge 797 of the rim portion at the corner portion of the metallic container body is profiled to wrap around the flange 806 of the upper sidewall part so improving the connection of the rim portion to the upper sidewall part.

Figure 16:
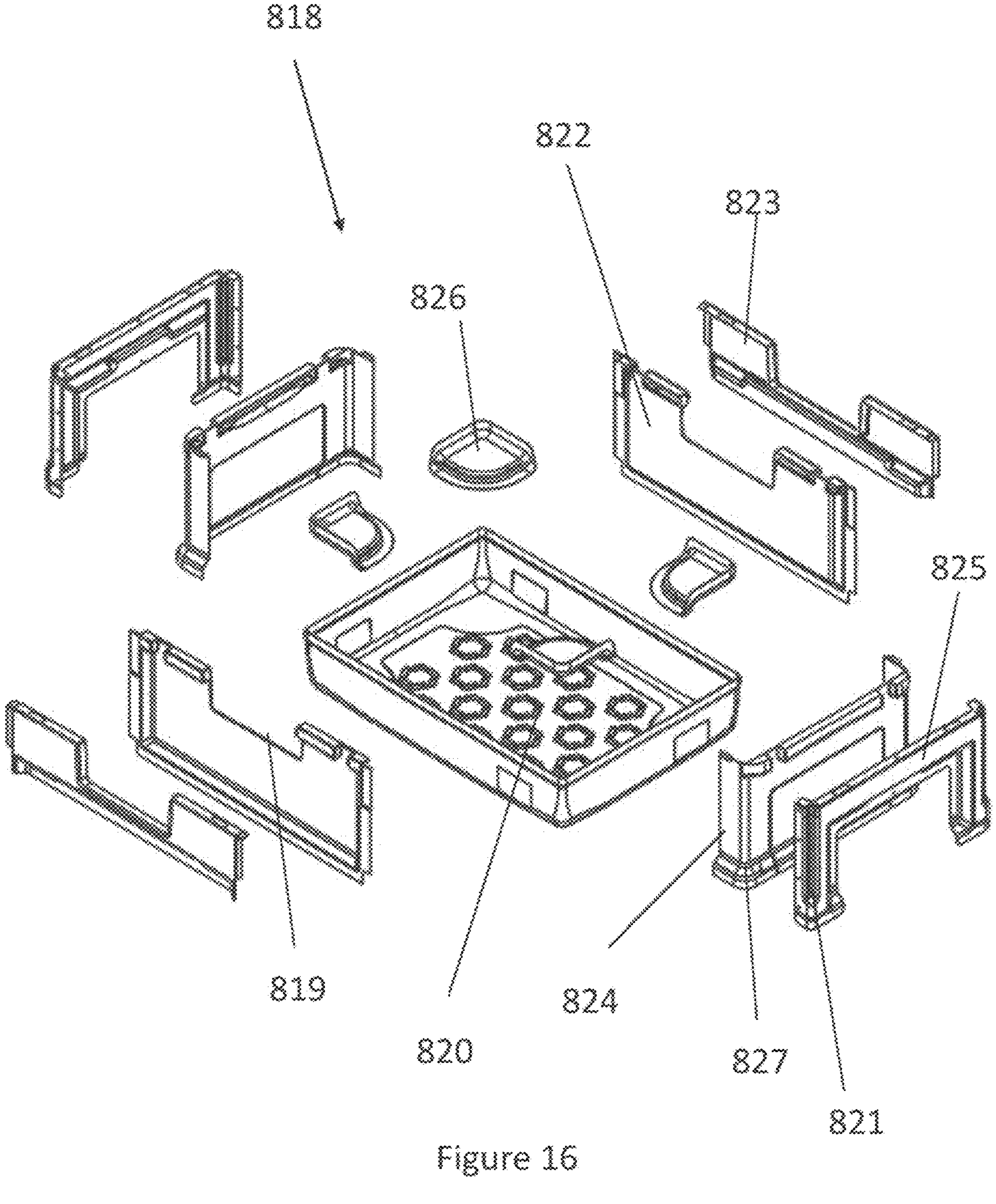
FIG. 16 is a schematic perspective view of a storage container partially formed by a deep drawn process showing a ninth embodiment of the present invention.
Figure 17:
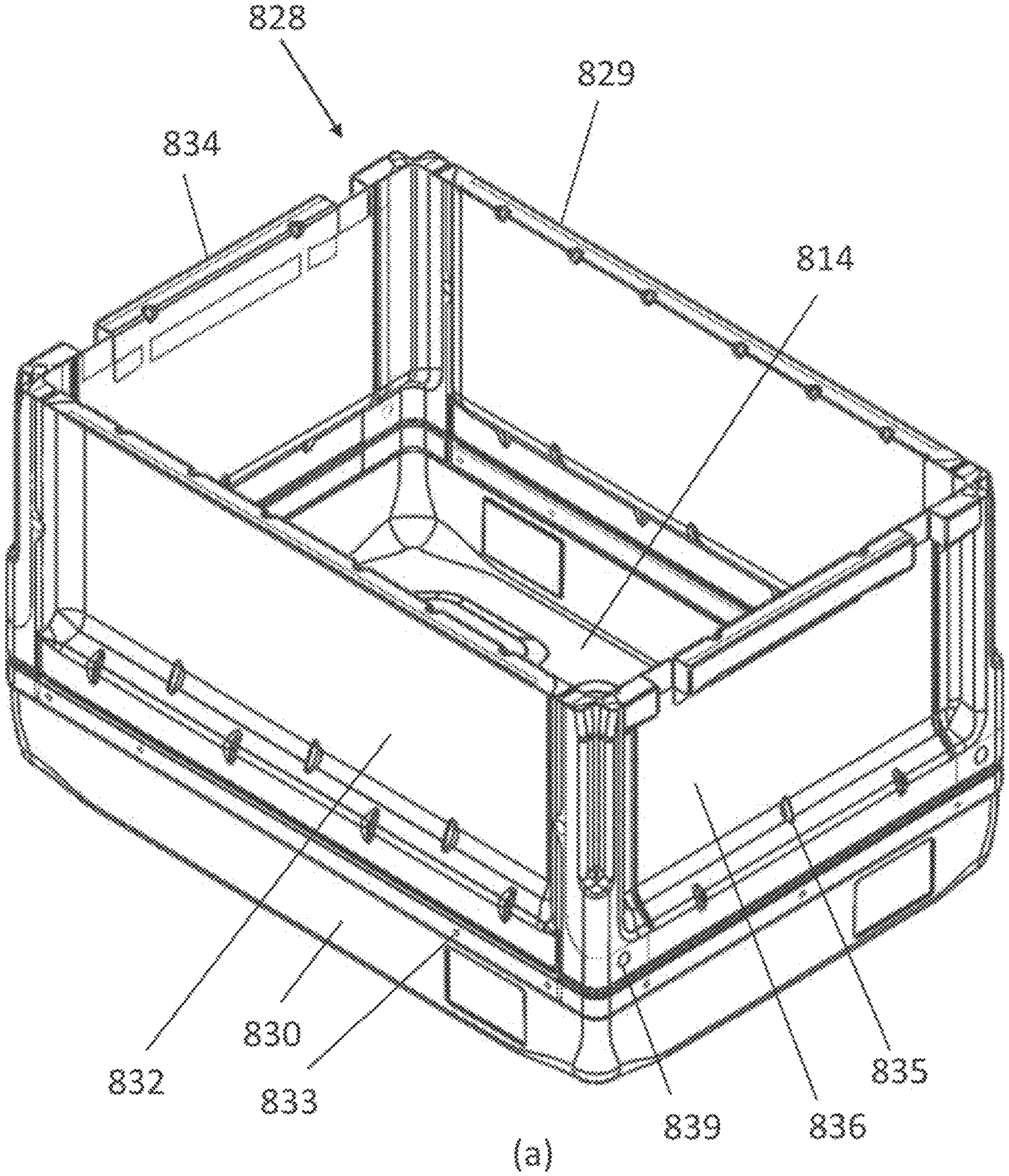
FIG. 17(*a* to *e*) are schematic perspective view of a storage container partially formed by a deep drawn process showing (a) an assembled view of a storage container according to a tenth embodiment of the present invention, (b) a pre-assembled view of the storage container according to a tenth embodiment of the present invention, (c) a rim portion of the storage container according to the tenth embodiment of the present invention, (d) a schematic perspective view of a corner of an upper portion of a storage container according to the tenth embodiment of the present invention, (e) a schematic perspective view of an interface between an upper portion and a base portion of the storage container according to the tenth embodiment of the present invention.
Figure 17:
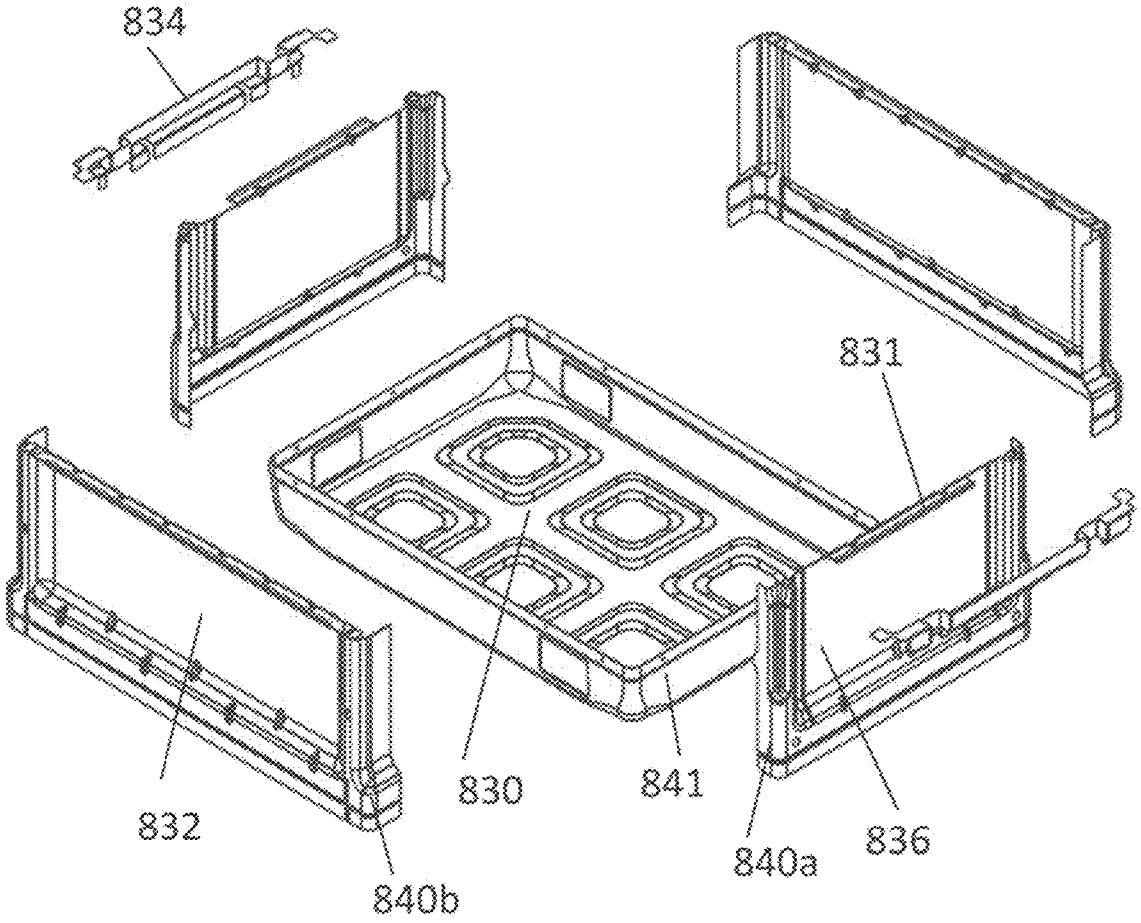
Figure 17:
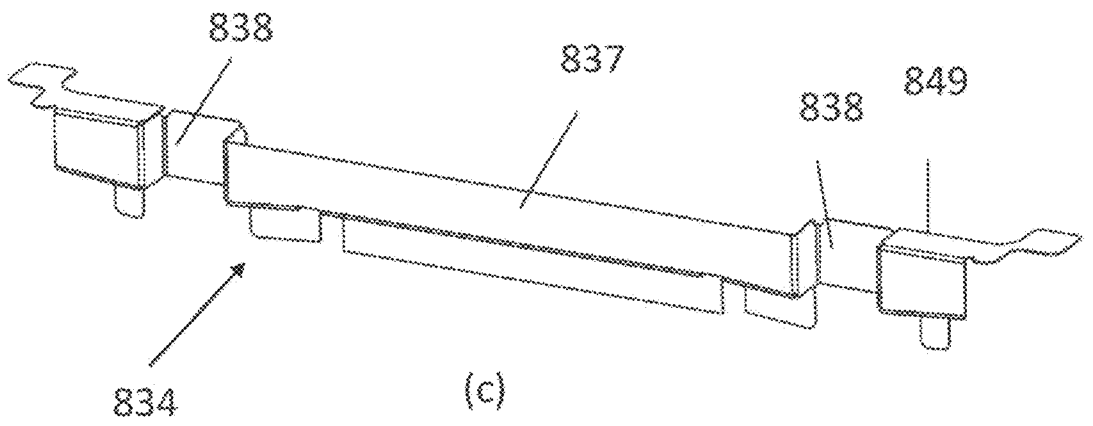
Figure 17:
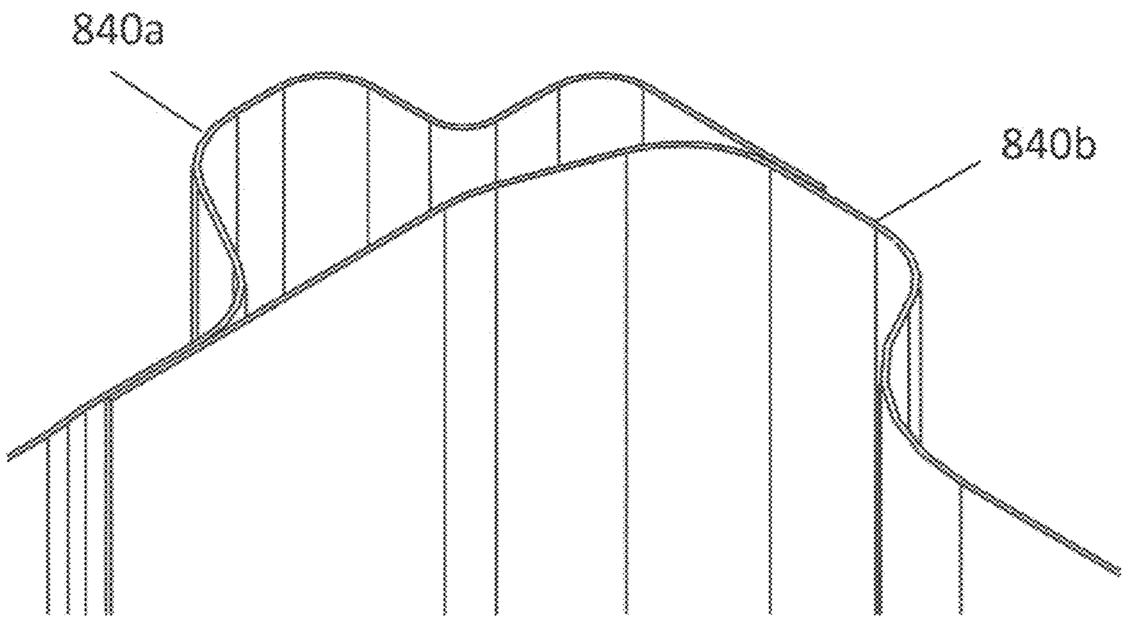
Figure 17:
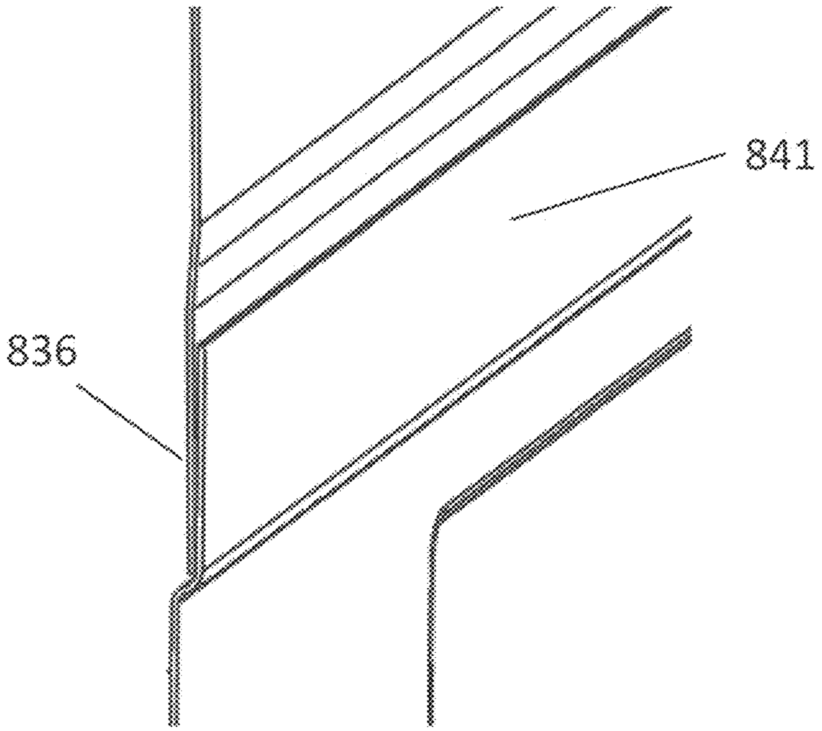

In a ninth embodiment of the metallic container, shown in FIG. 16, the metallic container body 818 comprises a deep drawn base portion 820 and upper sidewall parts 822 and upper end wall parts 824. Onto each upper sidewall part 822 and upper end wall part 824 is mounted a rim portion 823, 825. The deep drawn base portion 820 comprises a pattern embossed within the container bottom wall to increase the rigidity of the base portion and increase the grip on the underlying rollers in a conveying system. In FIG. 16, the embossed surface comprises a hexagonal patterning, but any kind of pattern may be used, such as square patterning as shown in FIG. 17(*b*). In contrast to the metallic container body shown in FIG. 15, in the present embodiment the flanges 821 of the rim portions 825 mounted on the upper end wall parts 824 extend vertically from the top of the corner of the metallic container body 818 to the deep drawn base portion 820. As shown in FIG. 16, this means that both the flange 821 of the rim portion 825 and the flange 827 of the upper end wall part 824 provide increased rigidity along the full vertical length of the corners of the metallic container body 818. FIG. 16 also shows that the metallic container comprises a cut-out 819 on each of the upper sidewall parts 822. The cut-out 819 is surrounded and reinforced by the rim portion 823 to provide increased rigidity and the rim portion 823 extends down on either side of the cut-out 819 such that the rim portion 823 has a vertical height greater than the height of the cut-out 819. By having a cut-out 819 in each of the upper sidewall parts 822, the metallic container body 818 can be used to hold a delivery tote.

The metallic container shown in FIG. 16 also comprises corner pieces or feet 826 which slot into the corners of the deep drawn base portion 820. The corner pieces 826 allow a delivery tote to sit within the metallic container body 818 at a height suitable for a delivery tote machine.

In contrast to the metallic storage container shown in FIGS. 15 and 16 which comprises four rim portions, the metal storage container 828 shown in FIG. 17 comprises two rim portions 834 and these are mounted on each of the upper end wall parts 836. The rim portions 834 are shown in more detail in FIG. 17(*c*) and comprise an elongate central portion 837 and two depressions 838 on either side of the elongate central portion. The two depressions 838 allow a gripper device to engage with the metallic storage container 828. The rim portion 834 extends into a projecting lip 849 such that when the rim portion 834 is mounted on the upper end wall parts 836, the projecting lip 839 helps to support a container bottom wall of a base portion 830 of an adjacent storage container above in a stack. Such an adjacent storage container is also supported by a top edge return 831 at an upper edge of the upper end wall parts, which will shortly be discussed. The rim portion 834 is shown as one component in FIG. 17(*c*), but equally might be formed as two components joined in the middle of the elongate central portion 837 and spot welded together.

The rim portions 834 are configured to fit onto a top edge return 831 at an upper edge of the upper end wall parts 836. The top edge return 831 is approximately 20 mm in width and configured such that it engages with the elongate central portion 837 of the rim portion 834 and allows access for the gripper device to engage with the metallic storage body 828 through the depressions 838 of the rim portion 834. The rim portion 834 is fitted and fixed onto the top edge return 831 using spot welding. Spot welding is also used for fixing other parts of the metallic storage body together, for example and as shown in FIG. 17(*a*), the upper end wall part 836 is attached to the base portion 830 by three spot welds 833, and the upper side wall part 832 is attached to the base portion 830 by four spot welds, however the upper side and/or end walls may be connected by any number of spot welds, for example 2, 5, 6, 7, 8, or 9 spot welds per side. Specifically, the upper end wall parts 836 and upper side wall portions 832 are attached to the upwardly standing base sidewalls and end wall parts of the base portion.

The upper side wall parts 832 and upper end wall parts 836 comprise ribs or beaks 835 formed from shaping the metal. The ribs or beaks 835 are located near the base of the upper sidewall parts 832 and end wall parts 836. The ribs or beaks 835 increase the stiffness of the upper end and side wall portions 832, 836. As shown in FIG. 17(*a*), the ribs or beaks 835 are symmetrically placed along the length of the upper sidewall parts 832 and the upper end wall parts 835. The ribs or beaks 835 minimise movement of the upper sidewall parts 832 and end wall parts 836 when assembled in a box-like structure. As shown in FIG. 17(*a*), there are three ribs or beaks 835 positioned on the upper end wall part 836 and seven ribs or beaks positioned on the upper side wall part 832. There can be any number of ribs or beaks in the upper sidewall parts 832 and upper end wall parts 836, for example, 4, 5, 6, 8 or 9) ribs or peaks on each upper sidewall part 832 and/or end wall part 836.

Each upper sidewall part 832 and upper end wall part 836 of the metallic container body 828 comprises a flange 840*a*, 840*b* at each corner. Each flange 840*a*, 840*b* over or underlaps with another adjacent flange when the upper sidewall parts 832 and upper end wall parts 836 are positioned within the base portion 830 to form the box-like structure 828, as shown in FIG. 17(*d*). FIG. 17(*d*) specifically shows the flange 840*b* of the upper sidewall part 832 positioned inside the flange 840*a* of the upper end wall part 836. This structure in which one flange overlays the other reinforces the corners to provides greater vertical structural rigidity. In contrast to the corner shown in FIG. 15(*e*), the corner in the present embodiment comprises two pieces, rather than three. This provides a cost advantage over the embodiment shown in FIG. 15. The upper sidewall part 832 and upper end wall part 836 are connected to the base portion 830 by placing the upper sidewall 832 or upper end wall 836 inside a base sidewall or end wall 841, as shown in FIG. 17(*e*) and spot welding the two respective walls together.

Additionally the metallic storage container 828 comprises a hole in one more flanges of the upper sidewall or end wall parts. As shown in FIG. 17(*a*), a hole 839 is located in each of the flanges 840*a* of the upper end wall parts 836. Alternatively, or additionally, one or more holes may also be located in each of the flanges 840*b* of the upper sidewall parts 832. The one or more holes 839 can be used as positioning tools such that the metallic storage container 828 can be positioned accurately and repeatedly in the same location if required.

The present embodiment uses a bar code (not shown) located on the exterior of the metallic storage container to help identify the position and alignment of the container in, for example, a delivery tote machine. This is an alternative to using corner pieces or feet as used in the embodiment of FIG. 16.

Figure 18:
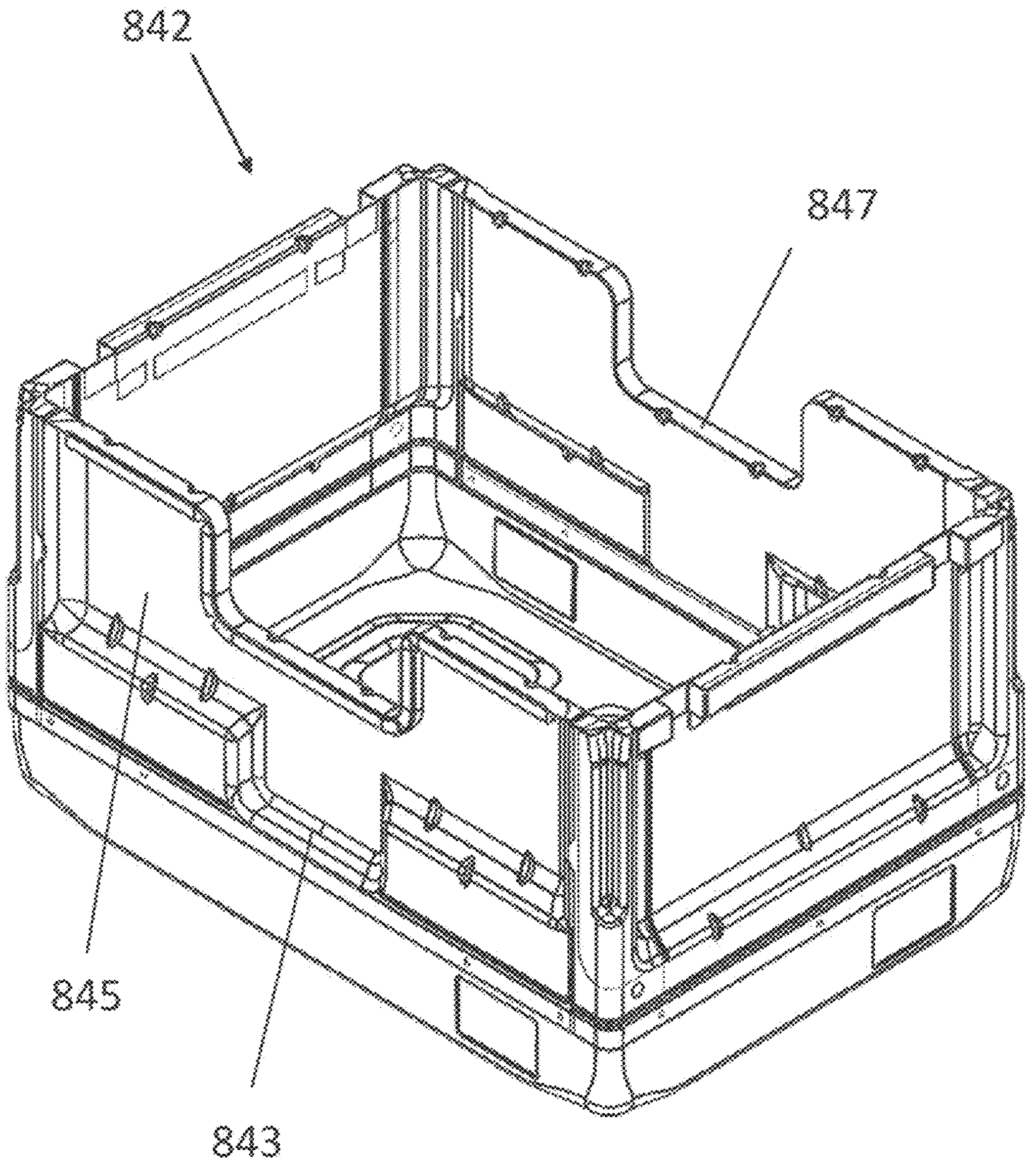
FIG. 18 is a schematic perspective view of a storage container similar to FIG. 17 and partially formed by a deep drawn process showing an assembled view of a storage container according to an eleventh embodiment of the present invention.

The eleventh embodiment of the metallic storage container 842 shown in FIG. 18 is similar to the embodiment of FIG. 17. However the embodiment shown in FIG. 18 further comprises a recess 843 positioned on each upper sidewall part 845. The recess 843 is C-shaped and sized and shaped such that an alignment tool can slot into the recess 843 and therefore ensures accurate alignment of the metallic storage container in, for example, a delivery tote machine. Similar to the embodiment shown in FIG. 16, the metallic storage container 842 of the eleventh embodiment also comprises a cut-out 847 in each of the upper sidewall parts 845. By having a cut-out 847 in each of the upper sidewall parts 845, the metallic container body 842 can be used to hold a delivery tote.

Figure 19:
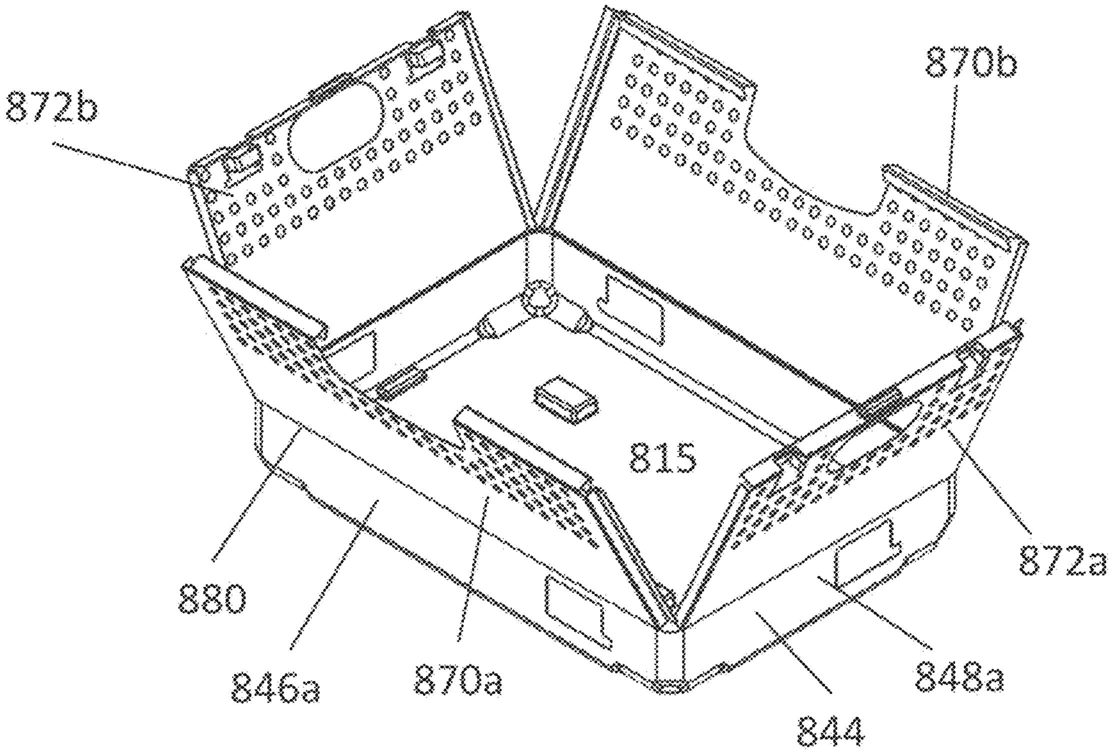
FIGS. 19(*a* and *b*) are schematic perspective of a storage container partially formed by a deep drawn process and showing (a) a pre-assembled view of the storage container: and (b) the assembled storage container according to a twelfth embodiment of the present invention.
Figure 19:
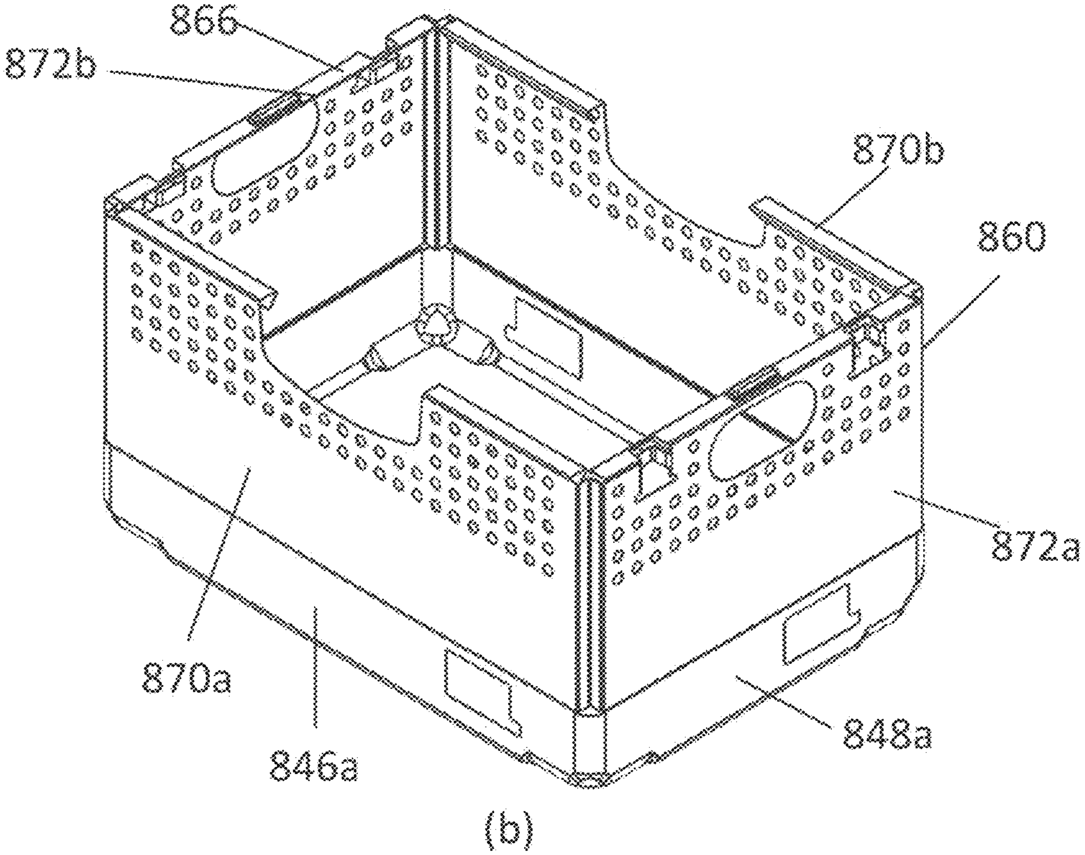

FIGS. 14 to 18 show different embodiments of a metallic storage having upper side and end wall parts which are separate to the base portion. Alternatively, the upper sidewall parts 870 (*a* and *b*) and end wall parts 872 (*a* and *b*) of the metallic container body 860 can be pivotally attached to the corresponding lower sidewall parts 846 (*a* and *b*) and end wall parts 848 (*a* and *b*) of the shallow base or tray 844 by a hinge 880, e.g. living hinge, as shown in an exemplary twelfth embodiment of the present invention in FIG. 19 (*a* and *b*). At the point of use, the upper sidewall parts 870 (*a* and *b*) and end wall parts 872 (*a* and *b*) are rotated about their respective pivotable connection 880 as shown in FIG. 19(*b*) such that adjacent ends of the upper sidewall parts 870 (*a* and *b*) and end wall parts 872 (*a* and *b*) join to form a box-like structure. The joint between the adjacent ends of the upper sidewall parts 870 (*a* and *b*) and end wall parts 872 (*a* and *b*) can be by a snap fitting joint, welding, riveting or even the use of an adhesive. As with the other embodiments of the present invention discussed above, the upper edge of the sidewalls and end walls at the rim of the metallic container body are inwardly turned to form a lip or flange 866 for releasable engagement with a grabber device.

Figure 20:
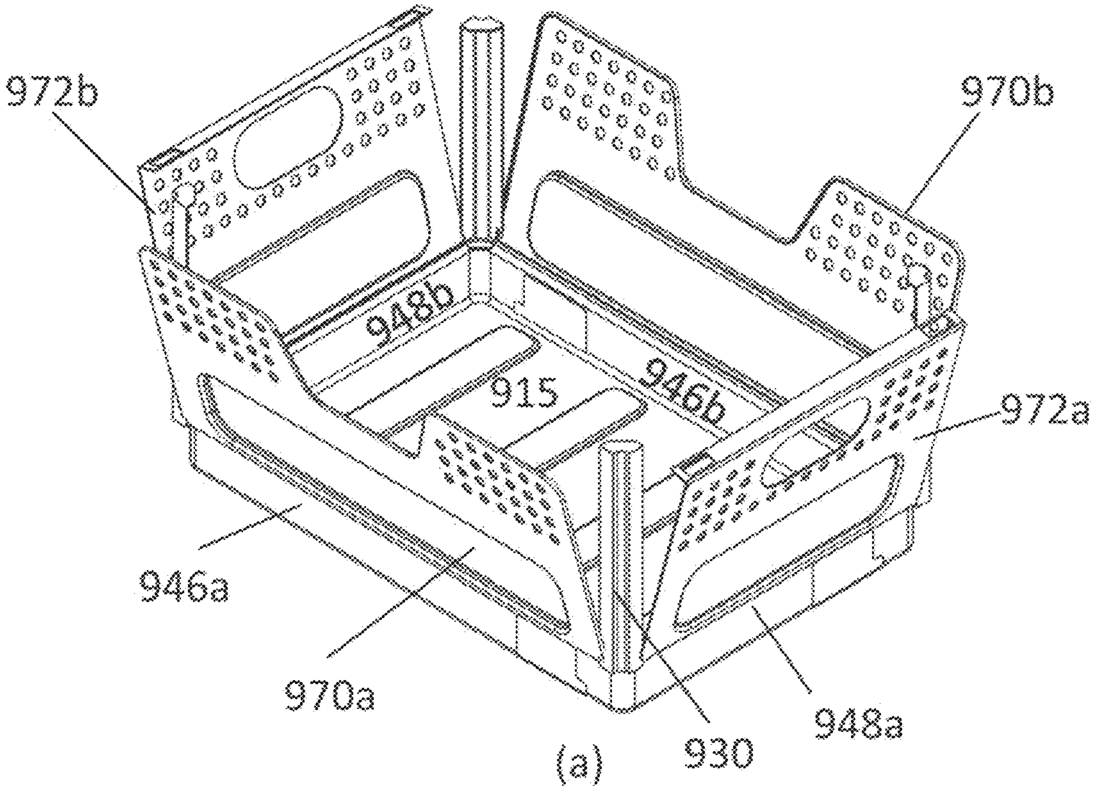
FIGS. 20(*a* and *b*) are schematic perspective of a storage container partially formed by a deep drawn process and showing (a) a pre-assembled view of the storage container; and (b) the assembled storage container according to a thirteenth embodiment of the present invention.
Figure 20:
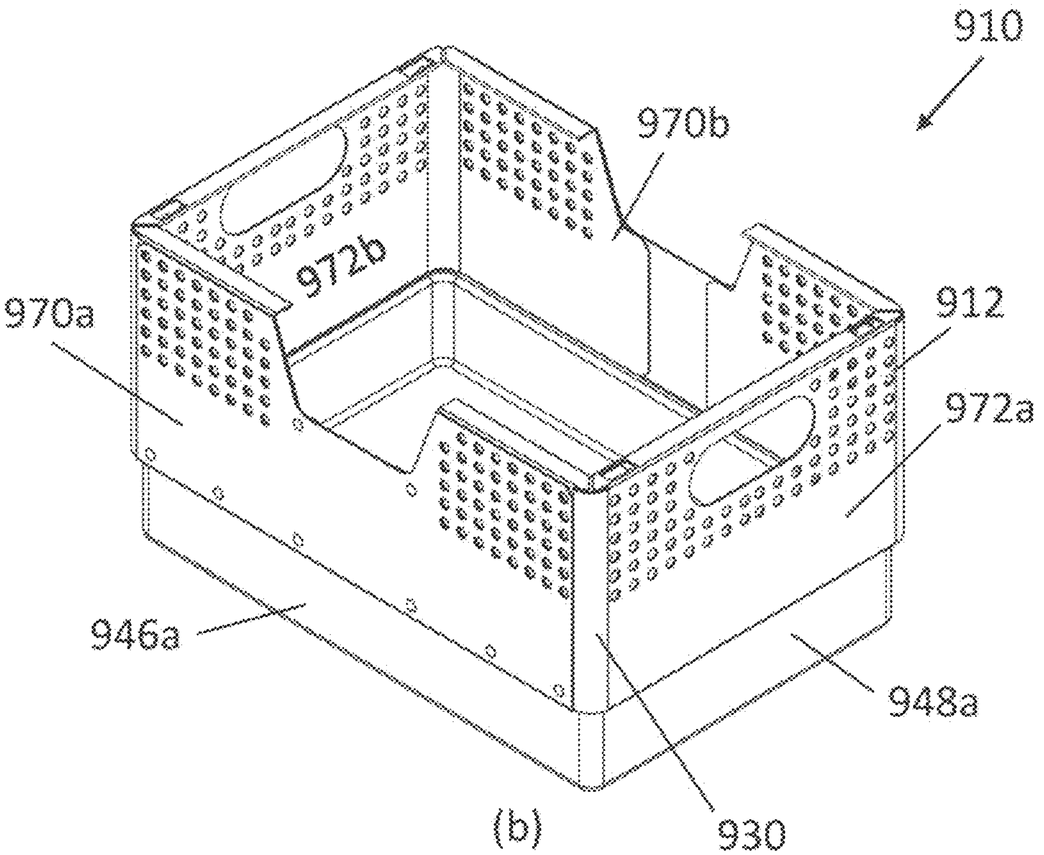

Alternatively, opposing ends of the upper sidewall parts 970 (*a* and *b*) and end wall parts 972 (*a* and *b*) can be joined together at the corners of the metallic container body 912 by one or more corner posts 930 as shown in a thirteenth exemplary embodiment of the present invention in FIG. 20 (*a* and *b*). The corner post 930, which can be cast, offers structural integrity to the walls of the metallic container body 912 from buckling when stacked with other storage containers in the grid framework structure. In the assembled state as shown in FIG. 20(*b*), the sidewalls of the metallic container body 912 comprise lower sidewall parts 946 (*a* and *b*) and upper sidewall parts 970 (*a* and *b*). Similarly, the end walls of the metallic container body 912 comprise lower end wall parts 948 (*a* and *b*) and upper end wall parts 972 (*a* and *b*).

Figure 21:
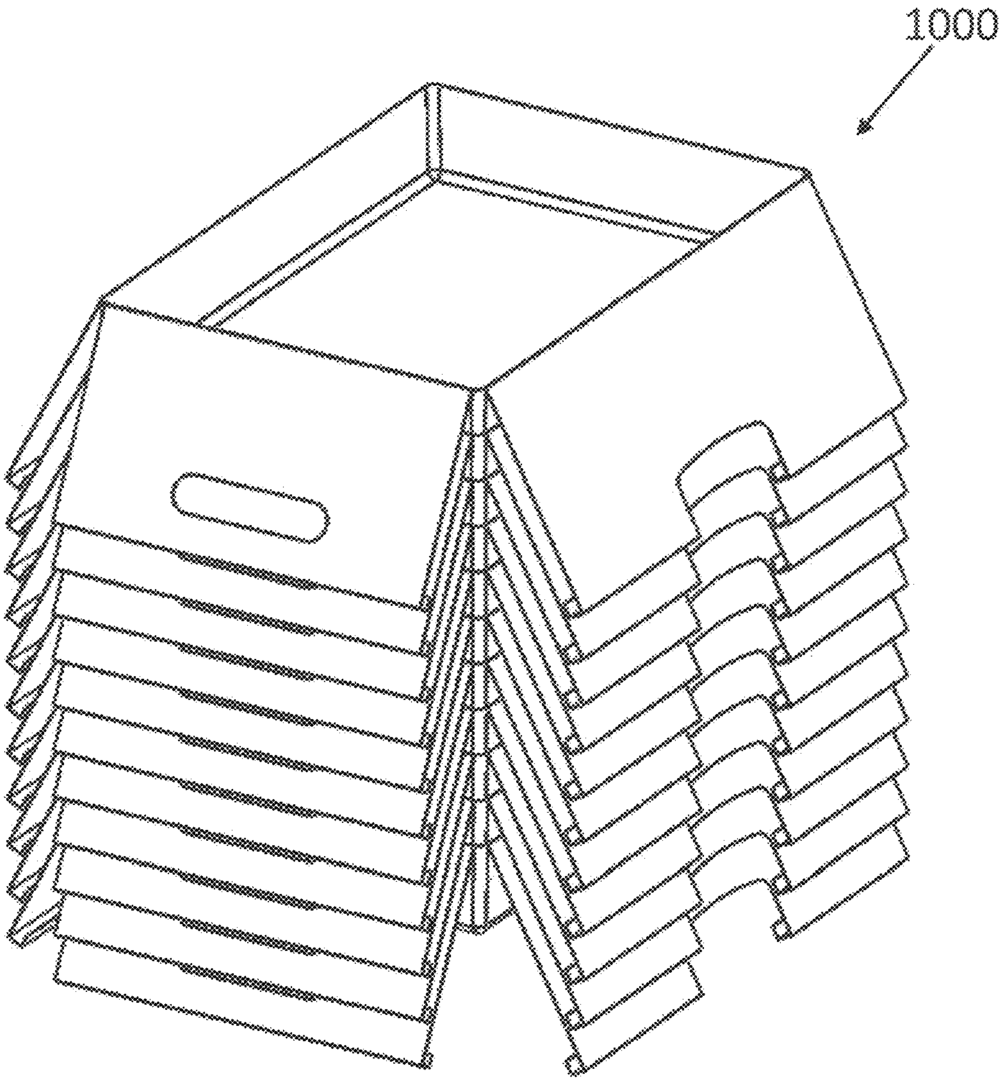
FIG. 21 is a schematic view of a stack of the pre-assembled storage container of FIG. 19 or FIG. 20.

As with the other embodiments of the present invention shown in FIG. 14 (*a* and *b*) to FIGS. 20, the base sidewall parts and base end wall parts of the shallow base are outwardly inclined from the container bottom wall so that multiple metallic container bodies can be stacked on top of one another for ease of transport as shown in FIG. 21. Having the upper sidewall parts and upper end wall parts being pivotally attached to their respective lower sidewall parts and lower end wall parts of the shallow base in the twelfth and thirteenth embodiments shown in FIGS. 19 and 20 prevents any of the parts of the metallic container body from being lost during transit and allows easy assembly of the metallic container at the point of use.

Figure 22:
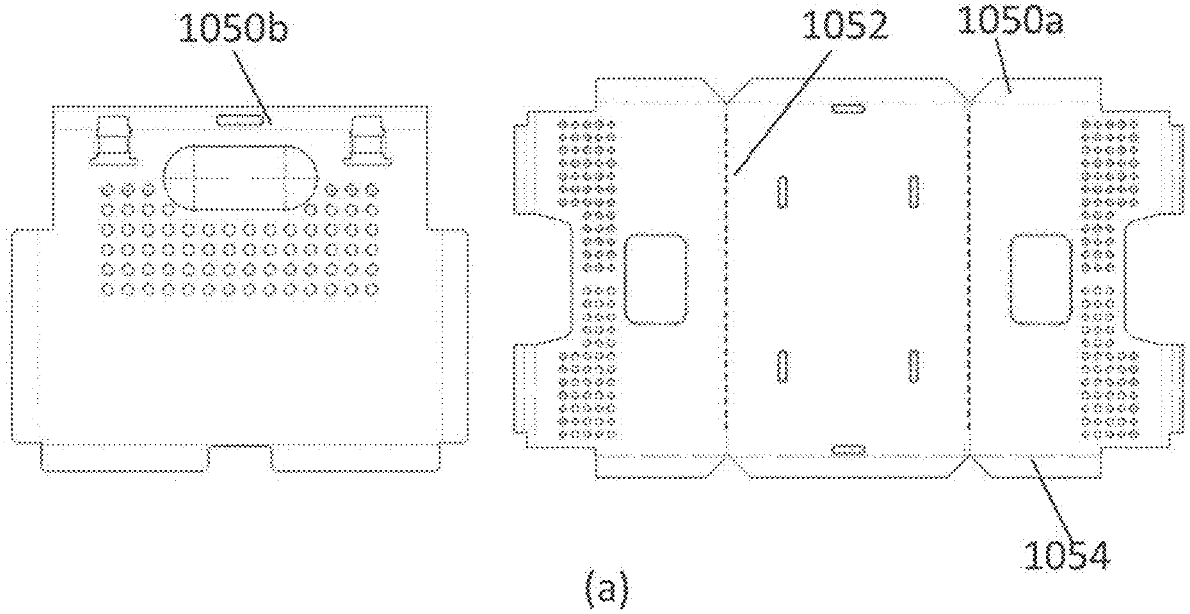
FIGS. 22(*a* and *b*) are schematic perspective view of (a) the blanks of foldable metal sheet; and (b) erected metallic container body from the blanks according to a fourteenth embodiment of the present invention.
Figure 22:
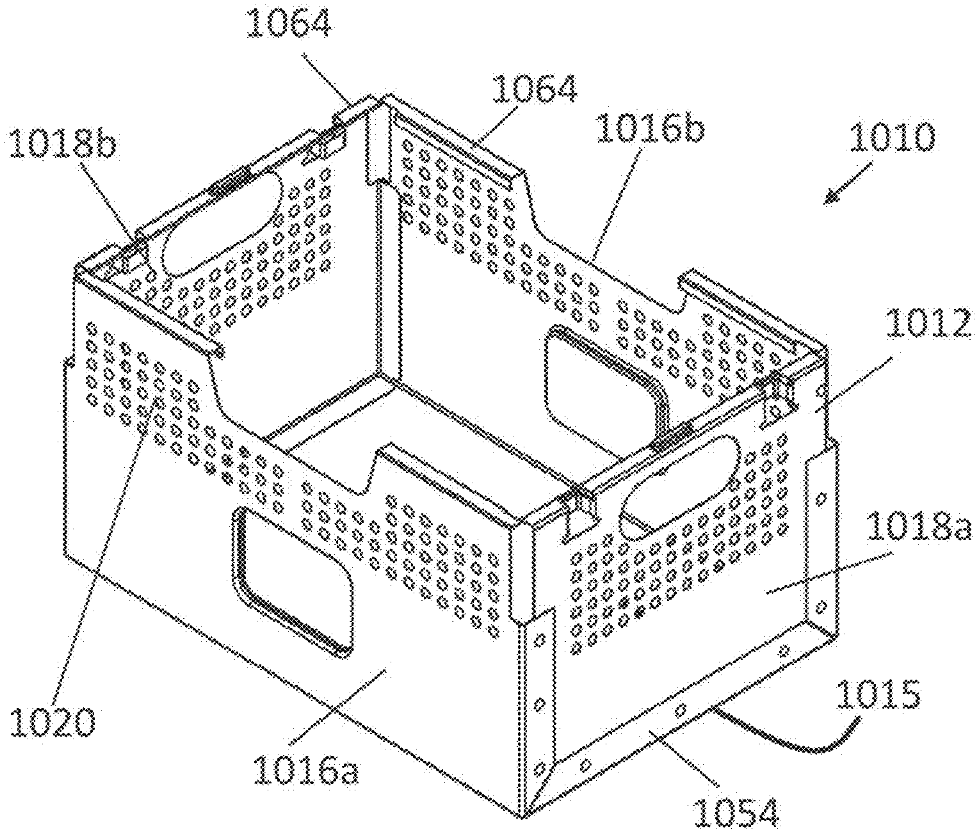
Figure 23:
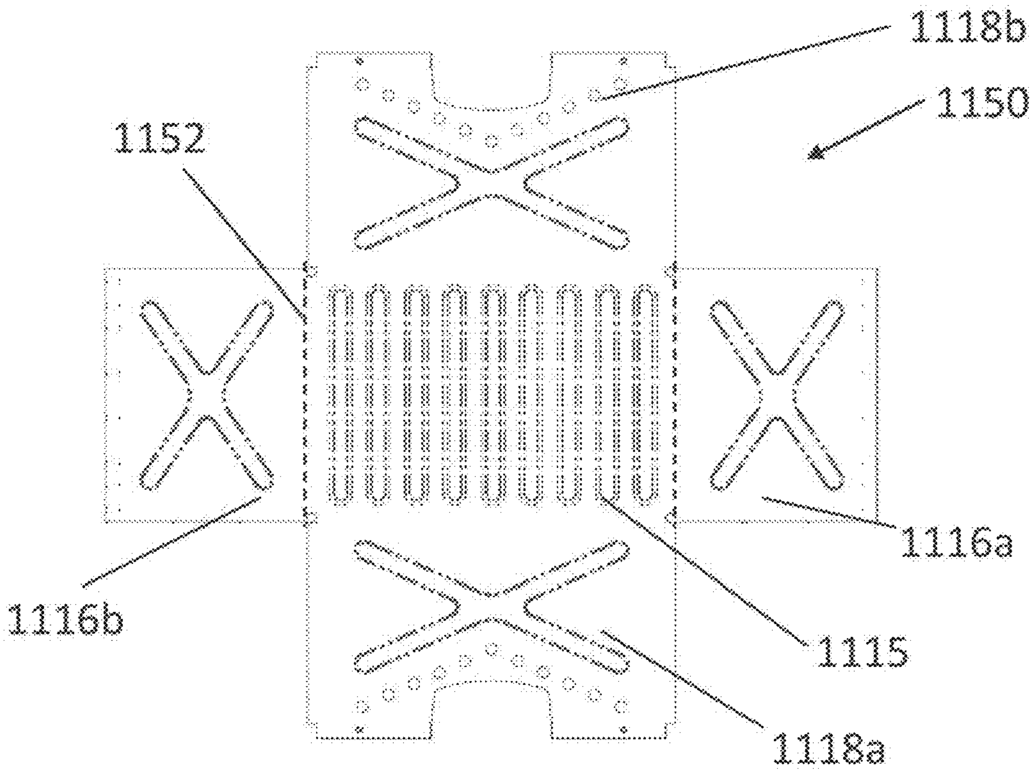
FIGS. 23(*a* and *b*) are schematic perspective view of (a) a unitary blank of foldable metal sheet; and (b) erected metallic container body from the unitary blank according to an fifteenth embodiment of the present invention.
Figure 23:
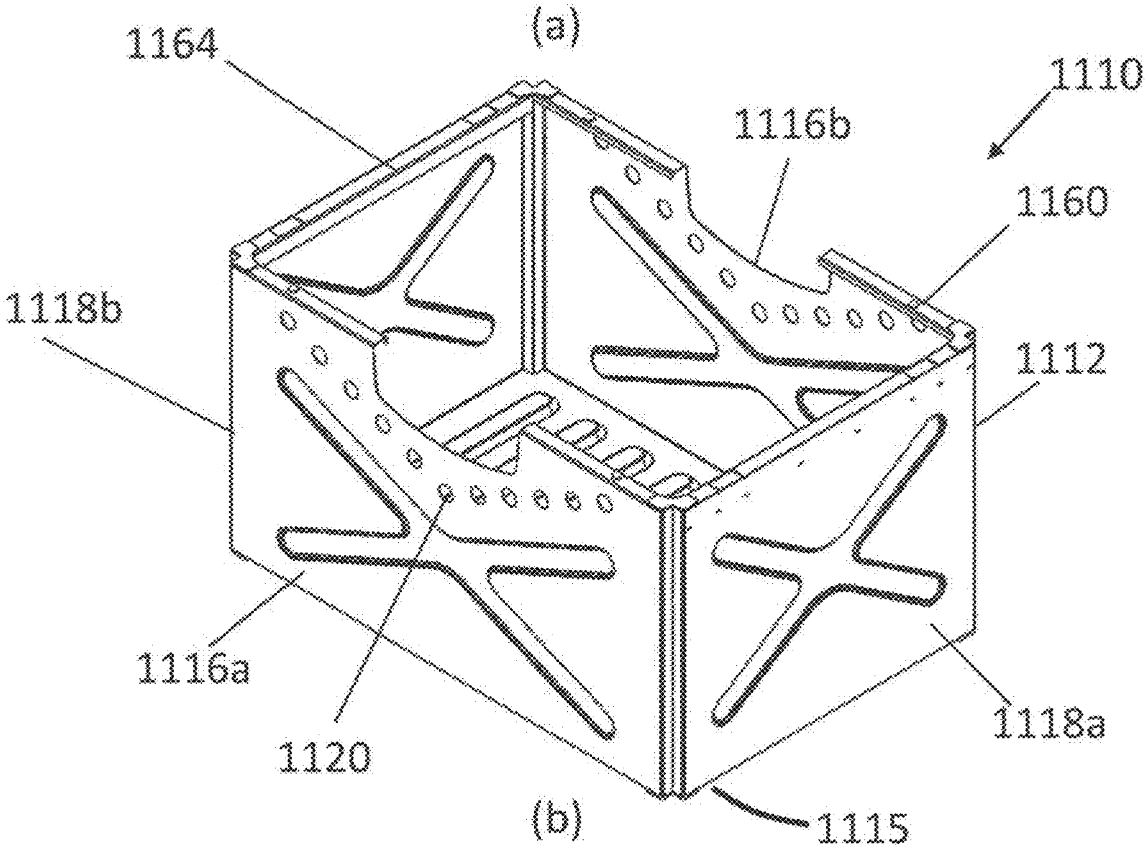
Figure 24:
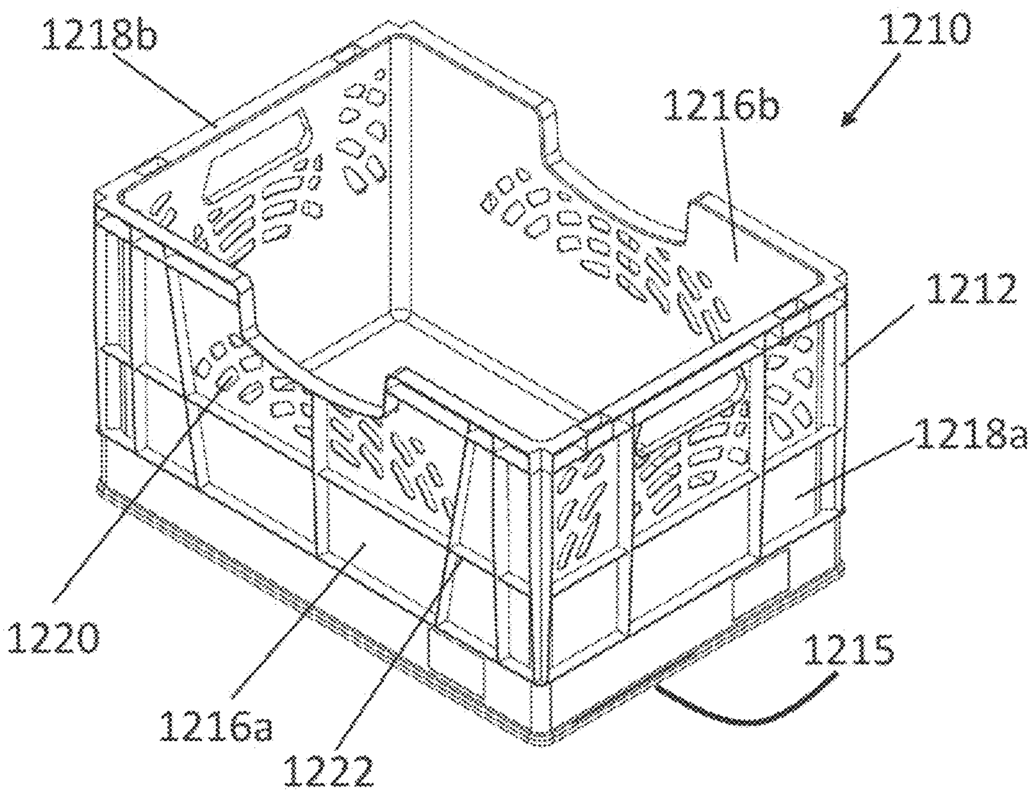
FIG. 24 is a schematic perspective of a cast storage container according to a sixteenth embodiment of the present invention.
Figure 25:
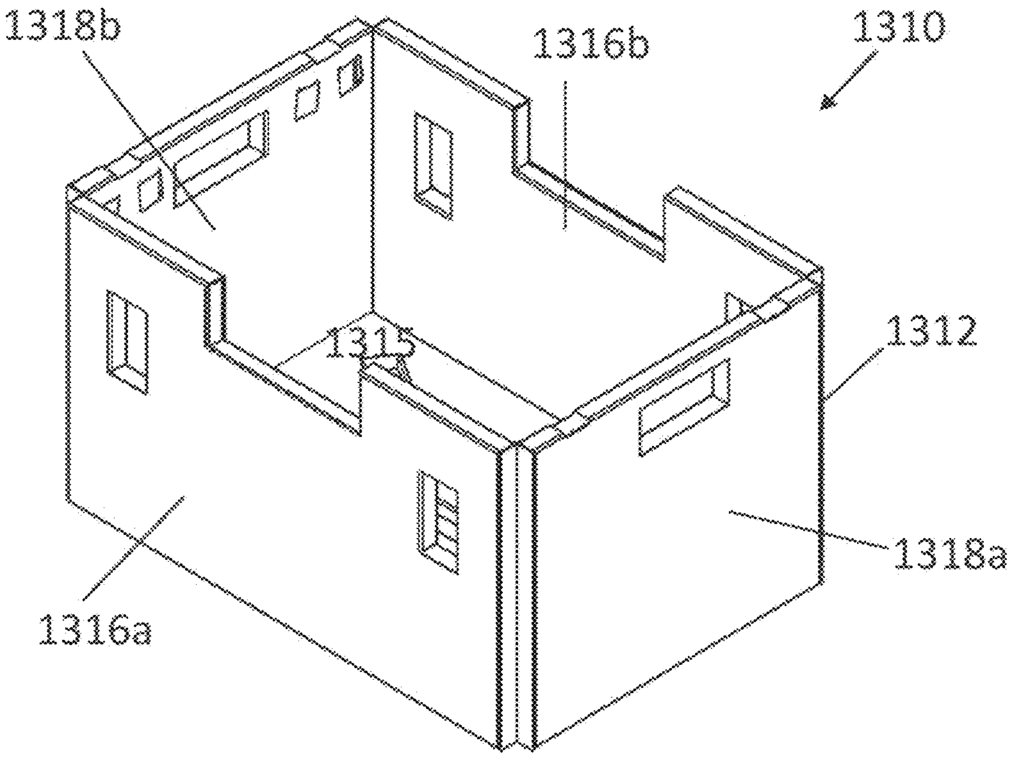
FIG. 25 is a schematic perspective of a storage container comprising hollow walls according to a seventeenth embodiment of the present invention.

In contrast to forming the metallic container body from a deep drawn base and one or more folded sheet metal blanks, the base and upper portion of the metallic container body can be formed from one or more patterned sheet metal blanks as shown in the fourteenth and fifteenth exemplary embodiments of the present invention shown in FIGS. 22 and 23. For storage of grocery items, one or more flanges can be bent or folded at the edges of the sheet metal blank so that when erected, the flanges help to retain the sidewalls and end walls together in an upright position and to seal the joints between adjacent sidewalls and end walls of the metallic container body so as to prevent fluid escaping from the metallic container body. Alternatively or in combination with providing flanges at the joints between adjacent walls (sidewall and end wall) of the metallic container body, the interior space within the metallic container body can comprise a polymeric liner or an inner container to contain any leakage escaping from the contents of the storage container.

In a fourteenth exemplary embodiment of the present invention shown in FIG. 22 (*a* and *b*), the metallic container body 1012 is formed from two sheet metal blanks 1050 (*a* and *b*) that are erected to form the container bottom wall 1015, the sidewalls 1016 (*a* and *b*) and end walls 1018 (*a* and *b*) of the metallic container body 1012. Erecting the metallic container body 1012 from one or more sheet metal blanks 1050 (*a* and *b*) has the advantage that the metallic container body can be flat packed for ease of transport and storage. In the particular embodiment shown in FIG. 22 (*a*), the metallic container body 1012 is formed from a main section 1050*a* forming the container bottom wall 1015 and the opposing side walls 1016 (*a* and *b*) of the metallic container body 1012, and separate end plates 1050*b* forming the end walls 1018 (*a* and *b*) of the metallic container body 1012. The main section 1050*a* of the sheet metal blank comprises fold lines 1052, shown as dashed lines, running perpendicular to the longitudinal direction of the main section 1050*a*. At the point of use, the main section 1050*a* of the sheet metal blank is folded along the fold lines 1052 to create the container bottom wall 1015 and the opposing sidewalls 1016 (*a* and *b*) of the metallic container body 1012 having opposing open ends, i.e. folded so that the opposing side walls are substantially at right angles to the container bottom wall. End plates 1050*b* are then used to cover the opposing open ends to form a box-like structure as shown in FIG. 22(*b*). The edge or distal ends of the main section 1050*a* and/or the end plates 1050*b* can be folded to create flanges 1054 for fixing the end plates 1050*b* to the folded main section 1050*a* of the sheet metal blank, i.e. fixing the end plate 1050*b* to the sidewalls 1016 (*a* and *b*). In the particular embodiment of the present invention shown in FIG. 22, the opposing edges of the main section of the sheet metal blank is extended to form the flange 1054. Fixing the end plates 1050*b* to the flange 1054 of the sheet metal blank 1050*a* can be by welding, the use of an adhesive or other fixing means. In the particular embodiment shown in FIG. 22 (*b*), the end plates 1050*b* are fixedly attached to the flange 1054 of the sheet metal blank 1050*a* by riveting. As with the other embodiments of the present invention described above, the main section 1050*a* and/or the end plates 1050*b* can comprise one or more vent holes 1020 which can be stamped into their respective sheet metal blank 1050*a* or end plates 1050*b* to create vent holes 1020 and/or handles. At least one edge or end of the main section of the sheet metal blank and the end plates can be inwardly or outwardly turned to create a lip 1064 at the rim around the periphery of the assembled box-like structure as shown in FIG. 22 (*b*). As with the other embodiments of the present invention, the lip 1064 at the rim enables a grabber device of a load handling device to engage with the metallic container body when lifting a storage container from a stack.

Alternatively, the metallic container body 1112 can be formed from a single part, more specifically from a single sheet metal blank 1150 as in an fifteenth exemplary embodiment shown in FIG. 23 (*a* and *b*). As shown in FIG. 23 (*a*), the sheet metal blank 1150 comprises a central section forming the container bottom wall 1115 and opposing sidewall 1116 (*a* and *b*) and end wall 1118 (*a* and *b*) sections attached to the central section 1115, e.g. by a living hinge. Erection of the container metallic body comprises folding the opposing sidewall and end wall sections 1116 (*a* and *b*) at substantially right angles to the container bottom wall section 1115 to create a box-like structure as shown in FIG. 23 (*b*). The sheet metal blank 1150 can comprise fold lines 1152 to assist with the folding of the opposing sidewall and end wall sections. The edges of the sidewall and/or end wall and/or container bottom wall portions can be folded to create a flange for joining the walls of the metallic container body together and to provide a leak proof container body. Alternatively, the interior space within the metallic container body can comprise a polymeric liner or an inner container to contain any leakage from the storage container. One or more retainers can be used to hold the opposing sidewalls and end walls in the upright position. Equally, the upper edges or ends of the opposing sidewalls and end walls can be turned, e.g. inwardly or outwardly, to form a lip 1164 at the rim of the box-like structure. The rim comprises one or more openings 1160 to enable a grabber device to engage with the metallic container body. As with the other embodiments of the metallic container body, one or more vent holes 1120 can be cut out in the sheet metal blank, e.g. by stamping or other means, to allow air to circulate within the metallic container body.

In all of the embodiments utilising a sheet metal blank to fabricate the metallic container body, e.g. by a deep drawn process or folding a sheet metal blank, described with reference to FIGS. 8 to 23, the sheet metal blank can be coated with a polymeric lining in a laminated construction. This is particularly important where the contents of the storage container comprises food items so as to prevent contamination of the food items from exposure to the metallic container body. Additionally, the sheet metal blank can be corrugated by forming one or more ribs in the sheet metal blank, e.g. stamping, to improve the structural integrity of the erected metallic container body.

In another exemplary embodiment of the present invention, the metallic container body 1212 comprising the container bottom wall 1215, opposing sidewalls 1216 (*a* and *b*) and end walls 1218 (*a* and *b*) can be cast as a single unitary body. For example, the metallic container can be die cast or alternatively, cast by an investment casting process. In a sixteenth exemplary embodiment of the present invention shown in FIG. 24, the metallic container body 1212 is die cast as a single unitary body. Whilst not providing a collapsible storage container as with the other embodiments discussed above, casting the metallic container body as a single unitary body offers improved strength in a single part to prevent buckling of the walls of the metallic container body when placed in a stack. The metallic container body can be cast from aluminium having a wall thickness of about 1 to 1.5 mm. However, other lightweight metals can be used to cast the metallic container body. Another advantage of casting the metallic container body is the provision of a leak proof container to prevent escape of fluid from the storage container.

Vent holes 1220 can be formed in-situ when casting the metal container body or alternatively, the vent holes can be machined into the walls of the metallic container body once cast. The vent holes 1220 can be located a predetermined height above the container bottom wall to provide a leak proof base for capturing any spillage. Optionally, one or more ribs 1222 can be cast into the walls (sidewalls and end walls) of the metallic container body 1212 to improve the structural integrity of the metallic container body to withstand a load when in a stack.

Figure 26:
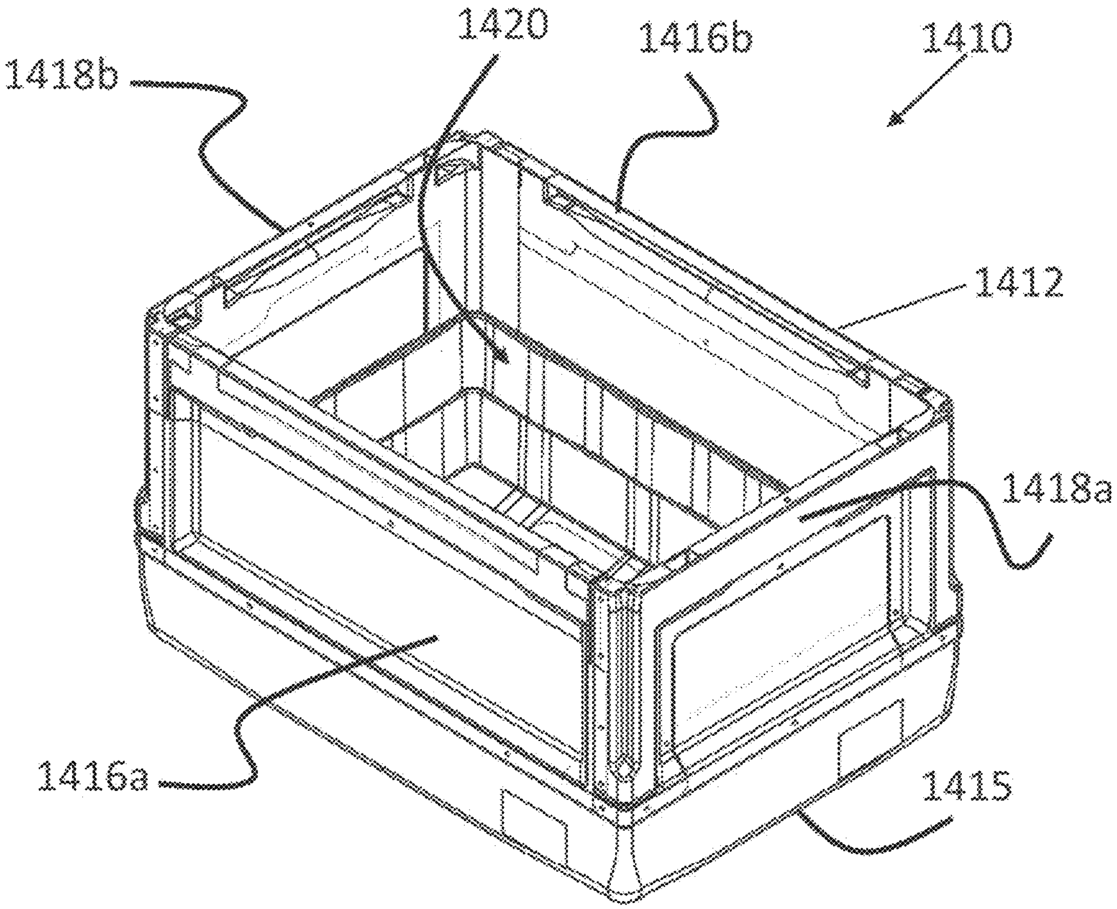
FIG. 26 is a schematic view of a storage container comprising a fire resistant body forming a non-combustible enclosure and a partial liner.
Figure 27:
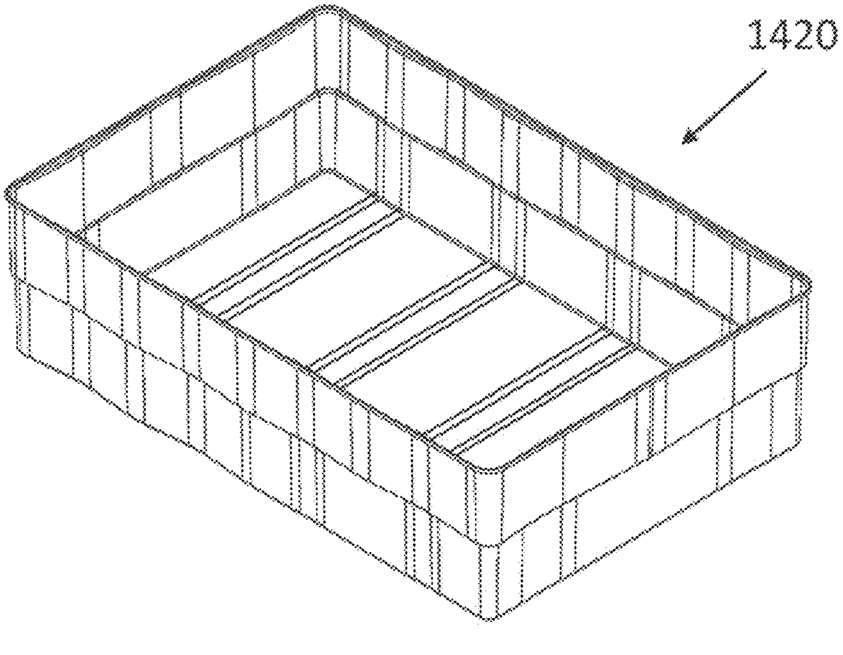
FIG. 27 is a schematic view of the partial liner of the fire resistant body shown in FIG. 26.
Figure 28:
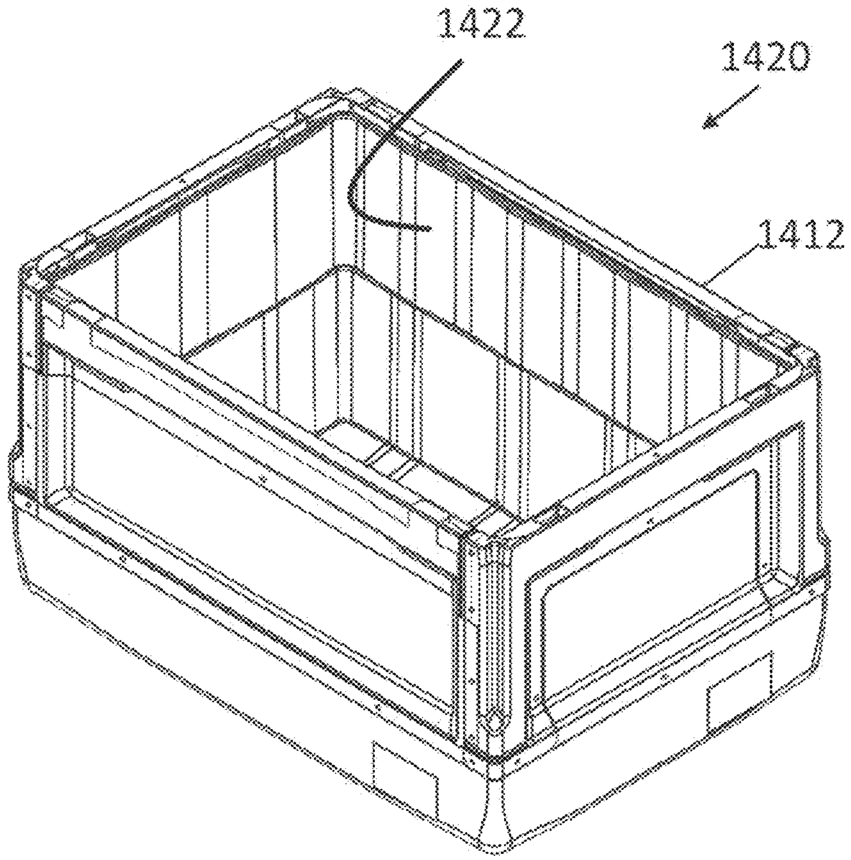
FIG. 28 is a schematic view of a storage container comprising a fire resistant body forming a non-combustible enclosure and a full height liner.
Figure 29:
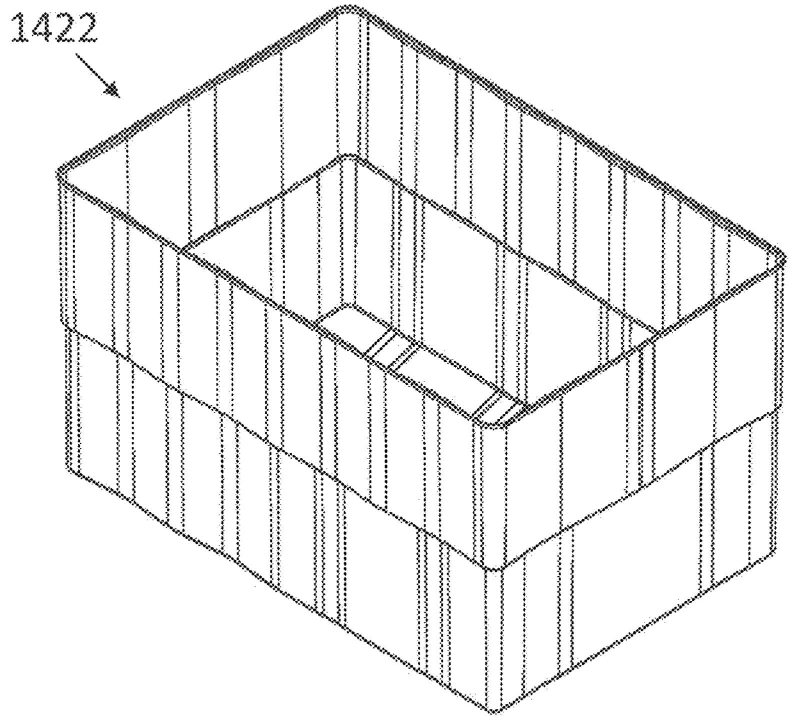
FIG. 29 is a schematic view of the full height liner of the fire resistant body shown in FIG. 28.

In the different embodiments of the present invention described above, the walls of the metallic container body are generally solid in the sense of being composed of a solid material and can comprise a coating or be laminated to ensure that the interior surface of the metallic container body is food safe. One or more wall stiffeners and/or inserts and/or corner posts can be incorporated into the metallic container body to improve the structural integrity of the storage container. In a yet further exemplary embodiment of the present invention, the walls of the metallic container body can be made hollow for the incorporation of a secondary filler material. In a seventeenth exemplary embodiment of the present invention shown in FIG. 25, the opposing sidewalls 1316 (*a* and *b*) and end walls 1318 (*a* and *b*) and optionally, the container bottom wall 1315 are hollow. The hollow space within the walls of the metallic container body can be filled with a filler material to improve the properties of the metallic container body 1312. For example, the filler material can be a polymeric foam that provides sound proofing acoustic properties to the storage container. Optionally, the filler material can be fireproof. Typical fireproof materials that are lightweight and fireproof include but are not limited to vermiculite. The filler material can also improve the structural properties of the storage container to withstand loads when held in a stack. Whilst not shown in FIG. 25, one or more ribs can be formed into the walls of the storage container to improve the structural integrity of the storage containers. The joint between adjacent sidewalls and end walls can be fixed together by welding, use of an adhesive, or rivets, or simply a tongue and groove joint. The container bottom wall, sidewalls and end walls can be separate parts that are assembled together at the point of use for ease of transport.

Where the contents of the storage containers are grocery items, it is essential that the grocery items are stored in containers that comply with food safety standards. There are limited types of metals that can be used in the fabrication of the metal container body that would comply with food safety standards. These include various stainless steel materials such as 304 stainless steel. However, fabricating the metal container body from stainless steel suffers from the problem that the metal is of a lower density than other type of metals such as lower grade steel or aluminium and is generally expensive. As a result, the walls of the metal container body would be relatively thin compared to its counterpart plastic variant of a similar weight in the industry. The areas of the storage container that are susceptible to fire are the exterior surface of the storage container. As the metal container body is fire resistant, the metal container body can function as a fire resistant body forming a non-combustible enclosure so as to prevent or limit the ingress of fire into the interior space of the storage container. Since the metal container body can function as a non-combustible enclosure and to comply with food safety standards for the storage of grocery items, the fire resistant body can comprise a liner that is formed from food grade material. Examples of food grade materials include but are not limited to various food grade plastic material, cellulose based materials such as paper or cardboard. To make the liner moisture resistant, the paper or cardboard liner can be impregnated with or coated a food safe wax. At least a portion of the interior surface of the fire resistant body comprises a liner 1420, 1422 formed from a food safe or grade material in the sense that the height of the liner 1420 partially extends the full height of the metal container body 1412 as shown in FIGS. 26 and 27 or the full height liner 1422 of the metal container body 1412 as shown in FIGS. 28 and 29. The use of a liner 1420, 1422 that is compliant to storing grocery items allows different materials to be used for the fire resistant body. Whilst in the particular embodiments described above, the first resistant body 1412 can comprise metal or other fire resistant materials can be used in the fabrication of the fire resistant body including various ceramic materials and various fire resistant plastic materials, e.g. plastic materials comprising a fire resistant additive. This fire resistant body can comprise lower density material but possess the same structural integrity and load bearing capacity as the current plastic based storage containers. As a result, the walls of the fire resistant body can be made thicker so giving the walls of the storage container sufficient load bearing capacity to support the weight of multiple storage containers in a stack.

In the particular embodiment of the present invention shown in FIG. 26, the fire resistant body comprises a metal container body 1412 comprising a bottom wall 1415, and upwardly standing opposing sidewalls 1416*a*, 1416*b* and end walls 1418*a*, 1418*b*. The metal container body 1412 is partially lined with a liner 1420. In the particular embodiment of the present invention shown in FIG. 27, the liner 1420 is a tray or a shallow base formed as an insert in the metal container body 1412. The tray 1420 is formed from a food grade material and is leak proof to prevent leakage of juices from the grocery items such as meat. There are various examples of forming a leak proof liner. These include but are not limited to blow moulding, thermoforming a signal piece liner where the liner comprises a food grade plastic material. In the case where the liner comprises a cellulose base material such as paper or cardboard, the liner can be formed from a foldable sheet blank that is impregnated or coated with a wax material. The height of the liner does need to extend the full height of the metal container body and can partially extend the full height of the metal container body. In the example shown in FIG. 27, the height of the tray 1420 extends half the height of the metal container body 1412. This is considered acceptable where the grocery items stored in the storage container only contacts the bottom wall and partially along the opposing sidewalls and end walls of the storage container and/or is only required to prevent leakage of juices of the grocery items contaminating other grocery items in nearby storage containers. However, this is not to say that the liner can extend the full height of the metal container body. FIGS. 28 and 29 shows an example where the liner 1422 extends the full height of the metal container body 1412. Again, the liner 1422 functions as an insert that be placed inside the metal container body as shown in FIG. 28.

Having a liner based on paper or cardboard allows the liner to be disposable allowing different types of grocery items to be stored in the metal container body and limits the need to continually wash the interior surface of the storage container. In the case, where the storage container comprises a metal container body, particularly low grade steel, the use of water to wash the storage container has the tendency to corrode or rust the metal container body making the metal container body unusable for storage of grocery items. The use of a liner composed of a food grade material removes the need to wash the metal container body and thereby, prolongs the life of the metal container body. Whilst the preferred embodiments of the present invention have been described in detail above, it should be understood that various modifications of the storage container encompassing different features described above, and different combinations of features described in relation to different embodiments, are applicable within the scope of the present invention as defined in the claims.

Further features of the invention may be described with reference to the following numbered clauses:

Clause 1. A storage container for the storage of one or more items in a storage and retrieval system comprising a track system comprising a first set of parallel rails or track and a second set of parallel rails or tracks running transversely to the first set of parallel tracks in a substantially horizontal plane to form a grid pattern comprising a plurality of grid spaces or grid cells and a plurality of stacks of storage containers located beneath the track system and wherein each stack of the plurality of stacks of storage containers occupies a single grid space or grid cell, the first retardant storage container comprising a container bottom wall and an upwardly standing opposing sidewalls and end walls arranged in a box-like structure with an open end for receiving one or more items within the box-like structure, characterised in that the storage container comprises a fire resistant container body forming a non-combustible enclosure and at least a portion of an interior surface of the fire resistance body comprises a liner formed from a food grade material.

Clause 2. The storage container of clause 1, wherein the fire resistant container body is a ceramic container body.

Clause 3. The storage container of clause 1, wherein the fire resistant container body is a plastic container body.

Clause 4. The storage container of any preceding clause, wherein at least one of the upwardly standing opposing sidewalls and/or end walls are separable.

Clause 5. The storage container of any preceding clause, wherein the liner comprises a food grade plastic material and/or cellulose base material.

Clause 6. The storage container of clause 5, wherein the cellulose base material is coated or impregnated with a wax material.

Clause 7. The storage container of clause 6, wherein the cellulose based material is paper or cardboard.

Clause 8. The storage container of clause 7, wherein the liner is formed from a folded paper or cardboard blank.

Clause 9. The storage container of any preceding clause, wherein the liner is disposable.

Clause 10. The storage container of any preceding clause, wherein the liner is a shallow base or tray.

Clause 11. The storage container of any preceding clause, wherein the liner is a leak proof container.

Clause 12. The storage container of clause 11, wherein the leak proof container is a one piece thermoformed container.

The invention claimed is:

1. A storage container for storage of one or more items in a storage and retrieval system containing a track system which includes a first set of parallel rails or tracks and a second set of parallel rails or tracks running transversely to the first set of parallel tracks in a substantially horizontal plane to form a grid pattern including a plurality of grid spaces or grid cells and a plurality of stacks of storage containers located beneath the track system and wherein each stack of the plurality of stacks of storage containers is configured with storage containers to occupy a single grid space or grid cell, the storage container comprising a metallic container body including:

a base portion formed as a single unitary body and having a container bottom wall and upwardly standing base sidewall parts and end wall parts to define a tray;

a separate upper portion having upper sidewall parts and end wall parts upwardly extending from and connected to respective base sidewall parts and end wall parts of the base portion to form a box-like structure with an open end for receiving the one or more items within the box-like structure; and a rim portion extending around at least a portion of a periphery of the open end of the box-like structure, the rim portion including one or more openings or depressions configured for engagement with a grabber device of a load handling device;

wherein the storage container comprises an elongated vertical depression at each of the corners of the box-like structure for accommodating guide or locating pins of the grabber device so as to align the grabber device with the one or more openings or depressions of the rim.

2. The storage container of claim 1, wherein the base portion of the metallic container body is formed from a deep drawn sheet metal blank.

3. The storage container of claim 1, wherein the rim portion comprises:

an inwardly or outwardly turned projecting lip from the upper sidewall and/or the end wall parts configured for supporting a storage container bottom wall of an adjacent storage container when situated above in a stack.

4. The storage container of claim 3, wherein the rim portion is separately connected to the upper sidewall and/or the end wall parts.

5. The storage container of claim 3, wherein the rim portion and the upper sidewall parts and/or the end wall parts cooperate to define an elongated hollow portion located beneath the one or more openings or depressions of the rim portion, the elongated hollow portion being configured to accommodate one or more gripper elements of the grabber device.

6. The storage container of claim 1, wherein the upper sidewall parts are separately fixed to the end wall parts.

7. The storage container of claim 6, wherein the upper sidewall parts and/or the upper end wall parts each comprise:

at least one flange for fixedly connecting the upper sidewall parts to the upper end wall parts.

8. The storage container of claim 7, wherein each flange is configured to either overlay or underlay an adjacent flange to which it connects.

9. The storage container of claim 1, wherein the elongated vertical depressions are disposed in flanges of the upper sidewall parts and/or end wall parts.

10. The storage container according to claim 1, wherein the base portion comprises:

one or more patterns embossed within the container bottom wall.

11. The storage container according to claim 1, wherein the storage container comprises:

a liner formed from a food grade material.

12. The storage container according to claim 11, wherein the liner comprises:

a food grade plastic material and/or cellulose base material.

13. The storage container according to claim 12, wherein the liner is disposable.

14. The storage container according to claim 13, wherein the liner is a shallow base or tray.

15. The storage container according to claim 14, wherein the liner is a leak proof container.

16. A kit for assembling the storage container of claim 1, the kit comprising:

the base portion formed as a single unitary body and having the container bottom wall and the upwardly standing base sidewall parts and end wall parts to define a tray;

the separate upper portion including the upper sidewall parts and upper end wall parts; and the rim portion including the one or more openings or depressions configured for engagement with a grabber device of a load handling device.

17. The kit of claim 16, wherein the kit comprises:

two or more rim portions configured to be separately connectable to the upper sidewall part and/or the end wall parts.

18. A storage and retrieval system in combination with at least one storage container according to claim 1, the storage and retrieval system comprising:

the track system including a first set of parallel rails or tracks, and the second set of parallel rails or tracks running transversely to the first set of parallel tracks, in a substantially horizontal plane to form a grid pattern including the plurality of grid spaces or grid cells;

the plurality of stacks of storage containers located beneath the track system, and wherein each stack of the plurality of stacks of storage containers occupies a single grid space or grid cell; and the plurality of load handling devices being supported and guided by the parallel rails, each of the load handling devices including a container-receiving space and a lifting mechanism, the lifting mechanism being configured to lift at least one storage container from the plurality of stacks of storage containers into the container receiving space;

wherein one or more of the storage containers within the plurality of stack of storage containers is a storage container according to claim 1.

19. A storage and retrieval system according to claim 18, wherein the plurality of stacks comprises:

plastic storage containers.

20. A storage and retrieval system according to claim 19, wherein the storage and retrieval system comprises:

one or more flame resistant barrier walls which contain the plurality of stacks of metallic storage containers.

21. A storage and retrieval system according to claim 20, wherein the one or more flame resistant barrier walls surround a plurality of stacks of plastic containers.

* * * * *